United States Patent
Lowery et al.

(10) Patent No.: US 11,725,586 B2
(45) Date of Patent: Aug. 15, 2023

(54) JET ENGINE WITH PLASMA-ASSISTED COMBUSTION

(71) Applicant: West Virginia University Board of Governors on Behalf of West Virginia University, Morgantown, WV (US)

(72) Inventors: Andrew D. Lowery, Morgantown, WV (US); James E. Smith, Bruceton Mills, WV (US)

(*) Notice: Subject to any disclaimer, the term of this patent is extended or adjusted under 35 U.S.C. 154(b) by 0 days.

(21) Appl. No.: 16/517,090

(22) Filed: Jul. 19, 2019

(65) Prior Publication Data

US 2019/0368422 A1 Dec. 5, 2019

Related U.S. Application Data

(63) Continuation of application No. 15/848,005, filed on Dec. 20, 2017, now abandoned.

(51) Int. Cl.
*F02C 7/266* (2006.01)
*F23R 3/00* (2006.01)
(Continued)

(52) U.S. Cl.
CPC .............. *F02C 7/266* (2013.01); *F23R 3/002* (2013.01); *F23R 3/28* (2013.01); *H01P 7/04* (2013.01);
(Continued)

(58) Field of Classification Search
CPC .. F23R 2900/00008; F23R 2900/00009; F05D 2270/172; F05D 2260/99;
(Continued)

(56) References Cited

U.S. PATENT DOCUMENTS

| 1,953,953 A | 4/1934 | Carr |
| 2,652,475 A | 9/1953 | Spencer |
| (Continued) | | |

FOREIGN PATENT DOCUMENTS

| FR | 2962105 A1 | 1/2010 |
| WO | WO2011112786 | 9/2011 |
| (Continued) | | |

OTHER PUBLICATIONS

Wikipedia FADEC (Year: 2016).*
(Continued)

*Primary Examiner* — Arun Goyal
*Assistant Examiner* — William L Breazeal
(74) *Attorney, Agent, or Firm* — Thomas | Horstemeyer, LLP

(57) ABSTRACT

An example system and corresponding method can include a combustion chamber of jet engine, a radio-frequency power source, and a resonator. The combustion chamber can include a liner defining a combustion zone, and include a fuel inlet configured to introduce fuel into the combustion zone. The resonator can have a resonant wavelength and include: a first conductor, a second conductor, a dielectric, and an electrode coupled to the first conductor. The resonator can be configured such that, when the resonator is excited by the radio-frequency power source with a signal having a wavelength proximate to an odd-integer multiple of one-quarter (¼) of the resonant wavelength, the resonator provides a plasma corona in the combustion zone. The controller can be configured to cause the radio-frequency power source to excite the resonator with the signal so as to provide the plasma corona.

19 Claims, 22 Drawing Sheets

(51) Int. Cl.
*F23R 3/28* (2006.01)
*H01P 7/04* (2006.01)
*H01P 7/06* (2006.01)
*H05H 1/46* (2006.01)
*H01Q 1/44* (2006.01)
*H01Q 13/08* (2006.01)
*H05H 1/24* (2006.01)

(52) U.S. Cl.
CPC ............... *H01P 7/06* (2013.01); *H01Q 1/44* (2013.01); *H01Q 13/08* (2013.01); *H05H 1/2441* (2021.05); *H05H 1/46* (2013.01); *F05D 2240/35* (2013.01); *F05D 2260/99* (2013.01); *F23R 2900/00008* (2013.01); *F23R 2900/00009* (2013.01); *H05H 1/463* (2021.05); *H05H 1/4645* (2021.05); *H05H 1/47* (2021.05)

(58) Field of Classification Search
CPC ...... F05D 2240/35; F02C 7/264; F02C 7/266; F02K 3/10; H05H 2001/3431; H05H 1/34; H01T 13/20; B01J 19/126; B01J 19/129; C10G 15/08
See application file for complete search history.

(56) References Cited

U.S. PATENT DOCUMENTS

| | | | |
|---|---|---|---|
| 2,765,423 A | 10/1956 | Crapuchettes | |
| 2,790,855 A | 4/1957 | Mer | |
| 2,820,924 A | 1/1958 | Litton | |
| 2,944,399 A | 7/1960 | McCardle et al. | |
| 2,948,858 A | 8/1960 | Stameson | |
| 3,472,480 A | 10/1969 | Williams | |
| 3,473,879 A | 10/1969 | Berberich | |
| 3,487,636 A * | 1/1970 | Scott | H01T 13/08 60/39.827 |
| 3,934,566 A | 1/1976 | Ward | |
| 3,961,609 A | 6/1976 | Gerry | |
| 4,064,961 A | 12/1977 | Tseo | |
| 4,184,123 A | 1/1980 | Grill et al. | |
| 4,292,610 A | 9/1981 | Makimoto et al. | |
| 4,370,621 A | 1/1983 | Sprangle et al. | |
| 4,416,226 A | 11/1983 | Nishida et al. | |
| 4,446,826 A | 5/1984 | Kimura et al. | |
| 4,523,552 A | 6/1985 | Mukainakano et al. | |
| 4,561,406 A | 12/1985 | Ward | |
| 4,611,108 A | 9/1986 | Leprince et al. | |
| 4,728,910 A | 3/1988 | Owens | |
| 4,760,820 A | 8/1988 | Tozzi | |
| 4,774,914 A | 10/1988 | Ward | |
| 4,852,529 A | 8/1989 | Vowles | |
| 5,076,223 A | 12/1991 | Harden et al. | |
| 5,211,142 A | 5/1993 | Matthews et al. | |
| 5,361,737 A * | 11/1994 | Smith | F02P 9/007 123/143 B |
| 5,515,681 A | 5/1996 | DeFreitas | |
| 5,549,795 A | 8/1996 | Gregoire et al. | |
| 5,565,118 A * | 10/1996 | Asquith | F02C 7/262 219/121.48 |
| 5,617,717 A * | 4/1997 | Asquith | F02C 7/262 219/121.48 |
| 5,649,507 A | 7/1997 | Gregoire et al. | |
| 5,673,554 A | 10/1997 | DeFreitas et al. | |
| 5,677,631 A | 10/1997 | Reittinger et al. | |
| 5,689,949 A | 11/1997 | Defreitas et al. | |
| 5,706,847 A | 1/1998 | Strait et al. | |
| 5,734,353 A | 3/1998 | Van Voorhies | |
| 5,845,480 A | 12/1998 | DeFreitas et al. | |
| 6,131,542 A | 10/2000 | Suckewer et al. | |
| 6,321,733 B1 | 11/2001 | Suckewer et al. | |
| 6,356,241 B1 | 3/2002 | Jaeger et al. | |
| 6,553,981 B1 | 4/2003 | Suckewer et al. | |
| 6,745,744 B2 | 6/2004 | Suckewer et al. | |
| 6,819,052 B2 | 11/2004 | Kitamura | |
| 6,913,006 B2 | 7/2005 | Schleupen et al. | |
| 7,151,497 B2 | 12/2006 | Crystal | |
| 7,189,939 B2 | 3/2007 | Lee et al. | |
| 7,271,363 B2 | 9/2007 | Lee et al. | |
| 7,328,677 B2 | 2/2008 | Hagiwara et al. | |
| 7,467,612 B2 | 12/2008 | Suckewer et al. | |
| 7,513,921 B1 | 4/2009 | Phelps et al. | |
| 7,721,692 B2 | 5/2010 | Smith et al. | |
| 7,721,697 B2 | 5/2010 | Smith et al. | |
| 7,963,262 B2 | 6/2011 | Heise | |
| 8,278,807 B2 | 10/2012 | Agneray et al. | |
| 8,418,668 B2 | 4/2013 | Shimizu | |
| 8,468,992 B2 | 6/2013 | Ruan et al. | |
| 8,578,879 B2 | 11/2013 | Ramaswamy et al. | |
| 8,641,916 B2 | 2/2014 | Yatsuda et al. | |
| 8,746,218 B2 | 6/2014 | Freen | |
| 8,783,220 B2 | 7/2014 | Smith et al. | |
| 8,887,683 B2 | 11/2014 | Smith et al. | |
| 9,377,002 B2 | 6/2016 | Singleton et al. | |
| 9,525,272 B2 | 12/2016 | Bohne et al. | |
| 9,551,315 B2 | 1/2017 | Smith et al. | |
| 9,624,898 B2 | 4/2017 | Smith et al. | |
| 9,638,157 B2 | 5/2017 | Smith et al. | |
| 2002/0105390 A1 | 8/2002 | Kobayashi | |
| 2004/0129241 A1 | 7/2004 | Freen | |
| 2006/0013683 A1* | 1/2006 | Martindale | F01D 25/24 415/191 |
| 2006/0048732 A1 | 3/2006 | Schmidt et al. | |
| 2007/0235417 A1 | 10/2007 | Kuo | |
| 2009/0114178 A1 | 5/2009 | Coates et al. | |
| 2009/0120394 A1 | 5/2009 | Heise | |
| 2009/0194051 A1 | 8/2009 | Smith et al. | |
| 2009/0257927 A1 | 10/2009 | Ramaswamy et al. | |
| 2009/0266325 A1 | 10/2009 | Kumar et al. | |
| 2010/0282197 A1 | 11/2010 | Permuy et al. | |
| 2011/0048117 A1 | 3/2011 | Kell et al. | |
| 2011/0146607 A1 | 6/2011 | Smith et al. | |
| 2011/0175691 A1 | 7/2011 | Smith et al. | |
| 2011/0297116 A1 | 12/2011 | Ruan et al. | |
| 2012/0043023 A1 | 2/2012 | Ramaswamy et al. | |
| 2012/0192825 A1 | 8/2012 | Trump | |
| 2012/0235569 A1 | 9/2012 | Lee et al. | |
| 2012/0258016 A1 | 10/2012 | Makita et al. | |
| 2013/0111914 A1 | 5/2013 | Kempinski | |
| 2013/0199508 A1 | 8/2013 | Toedter et al. | |
| 2014/0123924 A1 | 5/2014 | McAlister | |
| 2014/0283780 A1 | 9/2014 | Smith et al. | |
| 2014/0283781 A1 | 9/2014 | Smith et al. | |
| 2014/0327357 A1 | 11/2014 | Smith et al. | |
| 2015/0040575 A1 | 2/2015 | Martinez Fabre et al. | |
| 2015/0287574 A1 | 10/2015 | Spencer et al. | |
| 2016/0017755 A1 | 1/2016 | Low et al. | |
| 2016/0025656 A1* | 1/2016 | Jevtic | H01J 37/3244 324/633 |
| 2016/0276134 A1 | 9/2016 | Collins et al. | |
| 2017/0082083 A1 | 3/2017 | Lowery et al. | |
| 2017/0085060 A1 | 3/2017 | Smith et al. | |
| 2017/0175697 A1 | 6/2017 | Smith et al. | |
| 2017/0175698 A1 | 6/2017 | Smith et al. | |

FOREIGN PATENT DOCUMENTS

| | | |
|---|---|---|
| WO | WO2011127298 A1 | 10/2011 |
| WO | WO2012103112 A2 | 8/2012 |
| WO | WO2015157294 A1 | 10/2015 |
| WO | WO2015176073 A1 | 11/2015 |

OTHER PUBLICATIONS

Abdallah "Microwave sources based on high quality factor resonators modeling optimization and metrology" (Year: 2016).*
Amir "Cylindrical Gaussian Eigenmodes of a Rectangular Waveguide Resonator Three dimensional Numerical Calculation of Gain per Mode" (Year: 1984).*
Pozar Exerpts from "Microwave Engineering" (Year: 2004).*
Guillon "Chapter3: Dielectric Rod Waveguides" (Year: 1998).*
Sathiya "Combustion Chamber Classification Aero Notes" (Year: 2016).*

(56) References Cited

OTHER PUBLICATIONS

Quadtech "Characteristic Cable Impedance" (Year: 2003).*
Abdallah; "Microwave sources based on high quality factor resonators modeling optimization and metrology"; 2016.
Amir; "Cylindrical Gaussian Eigenmodes of a Rectangular Waveguide Resonator Three dimensional Numerical Calculation of Gain per Mode"; 1984.
Goulding; "Investigation of High Voltage Breakdown and Arc Localization in RF Structures"; 1999.
Guillon; "Chapter 3: Dielectric Rod Waveguides"; 1998.
Pozar Exerpts from "Microwave Engineering"; 2004.
Sathiya; "Combustion Chamber Classification Aero Notes"; 2016.
Wikipedia "FADEC"; 2016.
Evans, John; Release The Lasers; Engine Technology international. com; Sep. 2015; pp. 52-53 and 55-56.
Sloop, John; National Aeronautics and Space Administration; Liquid Hydrogen as a Propulsion Fuel; 1945-1959; 1978.
International Search Report (ISR) for PCT/US2011/027850 dated Apr. 25, 2011; pp. 1-2.
Written Opinion of the International Searching Authority for PCT/US2011/027850 dated Apr. 25, 2011; pp. 1-7.
International Search Report (ISR) for PCT/US2011/031600 dated Jun. 14, 2011; pp. 1-3.
Written Opinion of the International Searching Authority for PCT/US2011/031600 dated Jun. 14, 2011, pp. 1-5.
International Search Report (ISR) for PCT/US2015/024727 dated Aug. 10, 2015, pp. 1-4.
Written Opinion of the International Searching Authority for PCT/US2015/024727 dated Aug. 10, 2015, pp. 1-7.
International Search Report (ISR) for PCT/US2015/031451 dated Jul. 27, 2015, pp. 1-2.
Written Opinion of the International Searching Authority for PCT/US2015/031451 dated Jul. 27, 2015, pp. 1-7.
Andrew D. Lowery, et al., "Experimental Investigation of Dielectrics for Use in Quarter Wave Coaxial Resonators", SAE Technical Paper Series 2007-01-0256, 2007 World Congress, Apr. 16-19, 2007, 8 pages.
Dustin L. McIntyre, et al., "The Coaxial Cavity Resonator as a RF IC Engine Ignition Source", SAE Technical Paper Series, 2001-01-0987, SAE 2001 World Congress, Mar. 5-8, 2010, 14 pages, The Engineering Society for Advancing Mobility Land Sea Air and Space International, U.S.A.
F.A. Pertl, et al., "Electromagnetic design of a novel microwave internal combustion engine ignition source, the quarter wave coaxial cavity igniter," Jun. 12, 2009. 14 pages, Proc. IMechE vol. 223 Part D: J_ Automobile Engineering, U.S.A.
Franz A. Pertl, et al., "High-Level Modeling of an RF Pulsed Quarter Wave Coaxial Resonator with Potential use as a SI Engine Ignition Source", SAE Technical Paper Series 2008-1-0089, 2008 World Congress, Apr. 14-17, 2008, 7 pages, SAE International.
Jay P. Wilhelm, et al., "Ignition Energy Testing of the Quarter Wave Coaxial Cavity Resonator with Air-Liquefied-Petroleum-Gas Mixtures", Article, American Institute of Aeronautics and Astronautics 2008-3775, 10 pages.
Hunsucker III, James F. "In-cylinder diagnostics using feedback from resonant cavity ignition sources" Thesis submitted to Benjamin M. Statler College of Engineering at West Virginia University (Jun. 18, 2016), pp. 1-98.
Pertl et al., "Investigation of Wire Grid Modeling in NEC Applied to Determine Resonant Cavity Quality Factors," pplied Computational Electromagnetics Society Journal, vol. 22, No. 3, pp. 420-423, University of Mississippi, University, Mississippi, Nov. 2007.
Pertl et al., "Design of a Compact Quarter Wave Coaxial Cavity Resonator for Plasma Ignition Applications," nternational Journal of Microwave and Wireless Technologies, Aug. 2011, DO1:10.1017/S17590787110000493, vol. 3, Issue 4, Cambridge University Press, Edinburgh Building, Shaftesbury Road, Cambridge, United Kingdom, 17 pages.
Stevens et al., Comparative Testing of a Novel Microwave Ignition Source, the Quarter Wave Coaxial Cavity gniteC Proceedings of the Institution of Mechanical Engineers, Part D, Journal of Automobile Engineering, vol. 25, No. 12, pp. 1633-1640, May 4, 2011.
Hunsucker, III et al., "Plasma Igniter, The Next Gen Ignition System", International Journal of Engineering Research and Development (IJERD), ISSN: 2278-067X, pp. 47-57, vol. 12, No. 9, Sep. 2016.
Nash et al; "A Quarter-Wave Coaxial Cavity Resonator as a Power Processing Element,"; Proceedings of the 3rd International New Energy Technology Symposium/Exhibition, Jun. 25-Jun. 28, 1988, Hull/Ottawa, Canada, 35 pages.
Vanvoorhies et al., "Analysis of RF Corona Discharge Plasma Ignition," Technology for Energy Efficiency in the e1st Century, Proceedings of the 27th Intersociety Energy Conversion Engineering Conference, P-259, SAE (929502). pp. 4.327-4.334, Aug. 3-7, 1992, San Diego, California.
Bonazza et al., "RF Plasma Ignition System Concept for Lean Burn Internal Combustion Engines," Technology for the Energy Efficiency in the 21st Century, Proceedings of the 27th Intersociety Energy Conversion Engineering Conference, P-259, SAE (929416), pp. 4.315-4.319, Aug. 3-7, 1992, San Diego, California.
Stiles et al., "Investigation of a Radio Frequency Plasma Ignitor for Possible Internal Combustion Engine Use," SAE Technical Paper Series No. (970071), SAE International Congress and Exposition, Feb. 1997, Detroit, Michigan, 5 Pages.
Stiles et al., "Modeling the Radio Frequency Coaxial Cavity Piasma Igniter as an Internal Combustion Engine Ignitor System," SAE Technical Paper Series No. (980168), (SP-1356), SAE International Congress and Exposition, February e3, 1998, Detroit, Michigan, 5 pages.
McIntyre et al., "The Coaxial Cavity Resonator as a RF IC Engine Ignition Source,", SAE Technical Paper Series No. (2001-01-0987), SAE International Congress and Exposition, Mar. 3-8, 2001, Detroit, Michigan, 12 pages.
"Pertl et al., "Numerical Investigation of the Quarter Wave Coaxial Cavity Resonator Quality Factor Through Wire Grid Modeling in NEC,"" 2006 ACES Conference on Applied Computational Electromagnetics, 22nd Annual Review of Progress in Applied Computational Electro-magnetics, (Paper No. 906716), pp. 659-663, Mar. 12-16. Miami, Florida.
Pertl et al., "Numerical Wire Grid Modeling of Cavity Resonators to Determine Quality Factors," ISCA 21st nternational Conference on Computers and Their Applications {CATA 2006), (Paper No. CATA2006-174), pp. rn8-191, Mar. 23-25, 2006, Seattle, Washington.
Pertl et al., "Feasibility of Pulsed Microwave Plasma Ignition for use in Internal Combustion Engines," ASME-CEF2007-1776, Proceedings of the ASME Internal Combustion Engine Division 2007 Fall Technical Conference, Oct. 14-17, 2007, Charleston, South Carolina, 5 pages.
Wildfire et al., "Investigation of Cold Start Capability of a Briggs and Stratton Engine Using Jet A Fuel and Microwave Plasma Ignition," SAE Technical Paper No. 2009-01-1057, SAE World Congress & Exhibition, April e0-23, 2009, Detroit, Michigan, 6 pages.
Owery et al., "Finite Element Analysis of a QWCCR with Dielectric Siugs", A. D. Lowery, et al., 27th Annual Review pf Progress in Applied Computational Electromagnetics, Paper No. ACES2011-1067, Williamsburg, VA, Mar. 27-31, eo11, 6 pages.
"Guan et al., ""Design and Experiments of Plasma Jet Igniter for Aeroengine""; Propulsion and Power Research, vol. Issue 3, pp. 188-193; Sep. 2013".
Orfanidis, Sophocles J., "Electromagnetic Waves and Antennas: Chapter 11"; retrieved from URL: eceweb1.rutgers.edu/-orfanidi/ewa/ch11.pdf; retrieved on Oct. 5, 2017, 30 pages.
"Coaxial Cable—Wikipedia"; retrieved from https://en.wikipedia.org/wiki/Coaxial_cable; retrieved on Oct. 5, 2017, 3 pages.
Starikovskiy et al.; "Plasma-assisted Ignition and Combustion"; Progress in Energy and Combustion Science, vol. 9. pp. 61-110; 2013.
"Signal Generator—Wikipedia"; retrieved from https://en.wikipedia.org/wiki/Signal_generator; retrieved on Oct. 9, eo17, 5 pages.

(56) References Cited

OTHER PUBLICATIONS

Video entitled "TPS—Megawatts in Nanoseconds"; pasted at URL: https://vimeo.com/132940613 (screenshots and description included); video uploaded on Jul. 8, 2015, 5 pages.

"A Timely Transportation Breakthrough: The Dual Signal, Radio Frequency Plasma Igniter System"; Plasma Igniter LLC; distributed to individuals at the SAE World Congress 2017, Apr. 4-6, 2017, Detroit, MI, 8 pages.

"Plasma Igniter, LLC—The Next Gen Ignition System"; Plasma Igniter LLC; distributed to individuals at the SAE World Congress 2015, Apr. 21-23, 2015, Detroit, MI, 4 pages.

Lowery et al.; "High Level Modelling and Verification of In-cylinder Diagnostics using a Dual Signal Piasma Igniter" presented during the 5th International Conference and Exhibition on Mechanical & Aerospace Engineering, October e-4, 2017, 8 pages.

\* cited by examiner

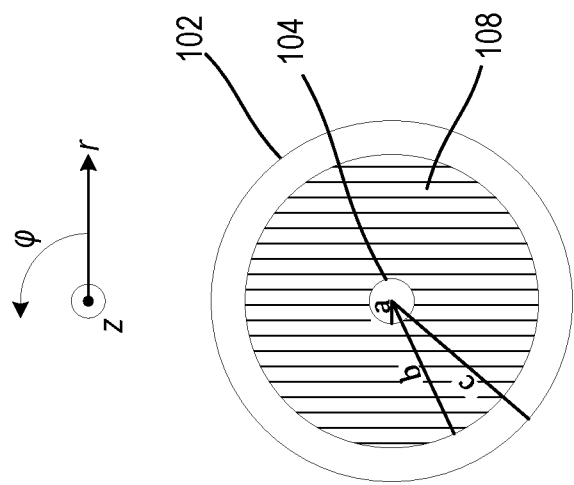
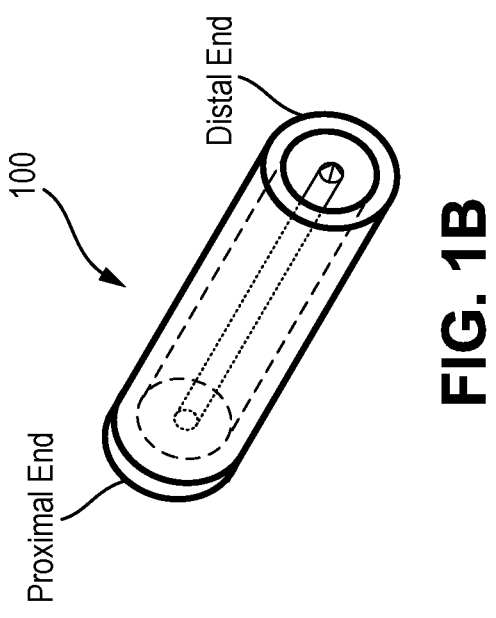
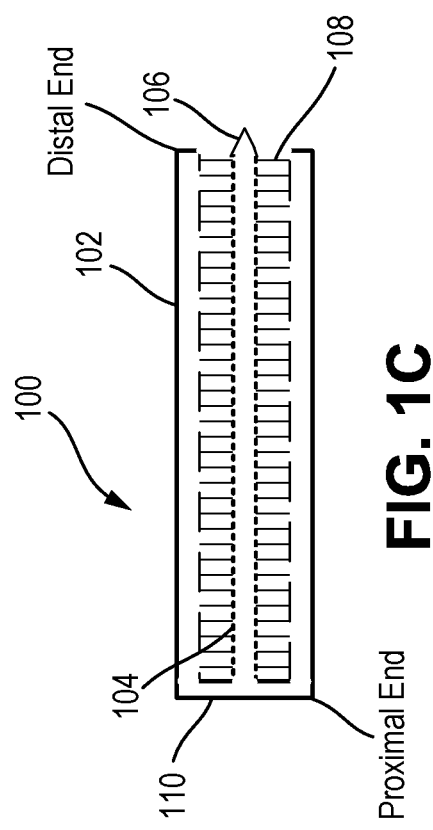
FIG. 1B
FIG. 1C
FIG. 1D

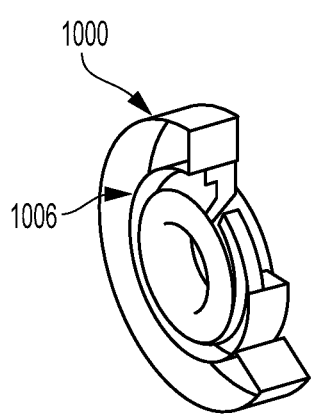
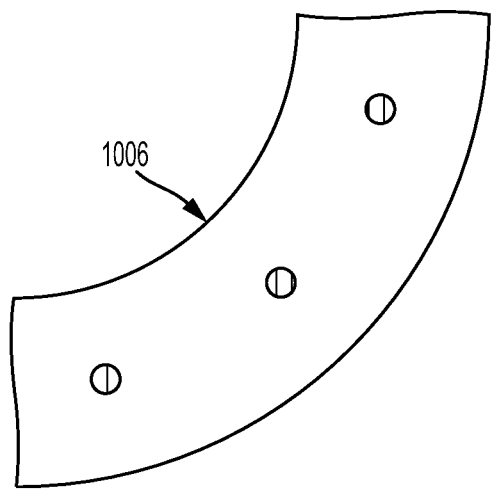
FIG. 10A  FIG. 10B
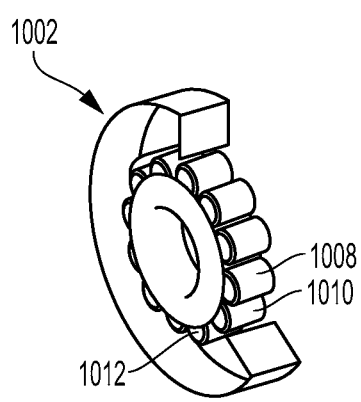
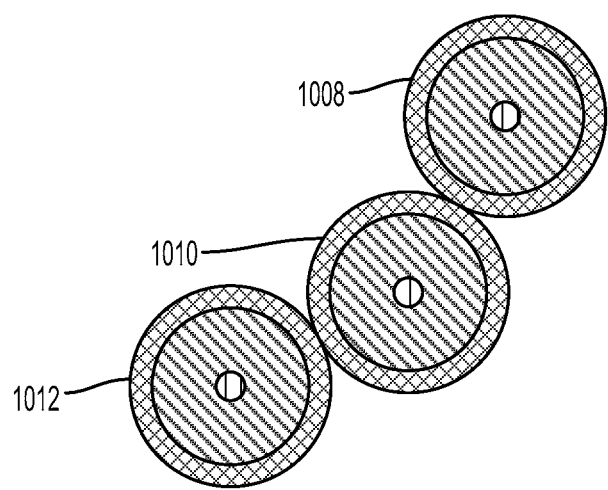
FIG. 10C  FIG. 10D

JET ENGINE WITH PLASMA-ASSISTED COMBUSTION

CROSS-REFERENCE TO RELATED APPLICATIONS

This application claims priority to and is a continuation application of U.S. Ser. No. 15/848,005, filed Dec. 20, 2017. In addition, the present application hereby incorporates by reference U.S. Pat. Nos. 5,361,737; 7,721,697; 8,783,220; 8,887,683; 9,551,315; 9,624,898; and 9,638,157. The present application also hereby incorporates by reference U.S. Patent Application Pub. Nos. 2009/0194051; 2011/0146607; 2011/0175691; 2014/0283780; 2014/0283781; 2014/0327357; 2015/0287574; 2017/0082083; 2017/0085060; 2017/0175697; and 2017/0175698. In addition, the present application hereby incorporates by reference International Patent Application Pub. Nos. WO 2011/112786; WO 2011/127298; WO 2015/157294; and WO 2015/176073. Further, the present application hereby incorporates by reference the following U.S. patent applications, each filed on the same date as the present application: "Plasma-Distributing Structure in a Resonator System," which has U.S. Ser. No. 15/848,311 and filed on Dec. 20, 2017; "Magnetic Direction of a Plasma Corona Provided Proximate to a Resonator," which has U.S. Ser. No. 15/848,574 and filed on Dec. 20, 2017; "Fuel Injection Using a Dielectric of a Resonator," which has U.S. Ser. No. 15/848,323 and filed on Dec. 20, 2017; "Jet Engine Including Resonator-based Diagnostics," which has U.S. Ser. No. 15/848,411 and filed on Dec. 20, 2017; "Power-generation Turbine Including Resonator-based Diagnostics," which has Ser. No. 15/848,467 and filed on Dec. 20, 2017; "Electromagnetic Wave Modification of Fuel in a Jet Engine," which has Ser. No. 15/848,497 and filed on Dec. 20, 2017; "Electromagnetic Wave Modification of Fuel in a Power-generation Turbine," which has Ser. No. 15/848,539 and filed on Dec. 20, 2017; "Jet Engine with Fuel Injection Using a Conductor of a Resonator," which has Ser. No. 15/848,010 and filed on Dec. 20, 2017; "Jet Engine with Fuel Injection Using a Dielectric of a Resonator," which has Ser. No. 15/848,323 and filed on Dec. 20, 2017; "Jet Engine with Fuel Injection Using a Conductor of At Least One of Multiple Resonators," which has Ser. No. 15/848,018 and filed on Dec. 20, 2017; "Jet Engine with Fuel Injection Using a Dielectric of At Least One of Multiple Resonators," which has Ser. No. 15/848,021 and filed on Dec. 20, 2017; "Power-generation Gas Turbine with Plasma-assisted Combustion," which has Ser. No. [insert] and filed on Dec. 20, 2017; "Power-generation Gas Turbine with Fuel Injection Using a Conductor of a Resonator," which has Ser. No. [insert] and filed on Dec. 20, 2017; "Power-generation Gas Turbine with Fuel Injection Using a Dielectric of a Resonator," which has Ser. No. 15/848,032 and filed on Dec. 20, 2017; "Power-generation Gas Turbine with Plasma-assisted Combustion Using Multiple Resonators," which has Ser. No. and filed on Dec. 20, 2017; "Plasma-Distributing Structure in a Power Generation Turbine," which has Ser. No. 15/848,259 and filed on Dec. 20, 2017; "Jet Engine with Plasma-assisted Combustion and Directed Flame Path," which has Ser. No. 15/848,454 and filed on Dec. 20, 2017; "Jet Engine with Plasma-assisted Combustion Using Multiple Resonators and a Directed Flame Path," which has Ser. No. 15/848,515 and filed on Dec. 20, 2017; "Plasma-Distributing Structure and Directed Flame Path in a Jet Engine," which has Ser. No. 15/848,229 and filed on Dec. 20, 2017; "Power-generation Gas Turbine with Plasma-assisted Combustion and Directed Flame Path," which has Ser. No. 15/848,454 and filed on Dec. 20, 2017; "Power-generation Gas Turbine with Plasma-assisted Combustion Using Multiple Resonators and a Directed Flame Path," which has Ser. No. 15/848,229 and filed on Dec. 20, 2017; "Plasma-Distributing Structure and Directed Flame Path in a Power Generation Turbine," which has Ser. No. 15/848,259 and filed on Dec. 20, 2017; "Jet engine with plasma-assisted afterburner," which has Ser. No. 15/848,176 and filed on Dec. 20, 2017; "Jet engine with plasma-assisted afterburner having Resonator with Fuel Conduit," which has Ser. No. 15/848,258 and filed on Dec. 20, 2017; "Jet engine with plasma-assisted afterburner having Ring of Resonators and Resonator with Fuel Conduit," which has Ser. No. 15/848,502 and filed on Dec. 20, 2017; and "Jet engine with plasma-assisted afterburner having Ring of Resonators and Resonator with Fuel Conduit in Dielectric," which has Ser. No. 15/848,570 and filed on Dec. 20, 2017.

BACKGROUND

Resonators are devices and/or systems that can produce a large response for a given input when excited at a resonance frequency. Resonators are used in various applications, including acoustics, optics, photonics, electromagnetics, chemistry, particle physics, etc. For example, electromagnetic resonators can be used as antennas or as energy transmission devices. Further, resonators can concentrate a large amount of energy in a relatively small location (for example, as in the electromagnetic waves radiated by a laser).

Aircraft, including jets, can be used to transport cargo and/or passengers from one location to another at high velocities. By providing thrust using a jet engine or a propeller, aircraft can generate lift based on Bernoulli's principle. One way of powering a jet engine or a propeller includes combusting hydrocarbon fuel.

SUMMARY

In a first implementation, a system is provided. The system includes a combustion chamber of a jet engine. The combustion chamber includes (i) a liner defining a combustion zone and (ii) a fuel inlet configured to introduce fuel into the combustion zone for combustion. The system also includes a radio-frequency power source. Further, the system includes a resonator electromagnetically coupled to the radio-frequency power source and having a resonant wavelength. The resonator includes (i) a first conductor, (ii) a second conductor, (iii) a dielectric between the first conductor and the second conductor, and (iv) an electrode electromagnetically coupled to the first conductor. The electrode has a distal end disposed in the combustion zone. The resonator is configured such that, when the resonator is excited by the radio-frequency power source with a signal having a wavelength proximate to an odd-integer multiple of one-quarter ($\frac{1}{4}$) of the resonant wavelength, the resonator provides a plasma corona in the combustion zone. Still further, the system includes a controller configured to cause the radio-frequency power source to excite the resonator with the signal so as to provide the plasma corona and cause combustion of the fuel.

In a second implementation, a method is provided. The method includes introducing fuel through a fuel inlet into a combustion zone of a combustion chamber of a jet engine. The method also includes exciting, by a radio-frequency power source, a resonator with a signal having a wavelength proximate to an odd-integer multiple of one-quarter ($\frac{1}{4}$) of a resonant wavelength of the resonator, where the resonator includes (i) a first conductor, (ii) a second conductor, (iii) a dielectric between the first conductor and the second conductor, and (iv) an electrode electromagnetically coupled to the first conductor. The electrode has a distal end disposed within the combustion zone. Further, the method includes, in response to exciting the resonator, providing a plasma corona in the combustion zone, thereby causing combustion of the input fuel.

Other implementations will become apparent to those of ordinary skill in the art by reading the following detailed description, with reference where appropriate to the accompanying drawings.

BRIEF DESCRIPTION OF THE FIGURES

FIG. 1B illustrates an isometric view of an example quarter-wave coaxial cavity resonator (QWCCR) structure, according to example implementations.

FIG. 1C illustrates a cutaway side view of a QWCCR structure, according to example implementations.

FIG. 1D illustrates a cross-sectional view of a QWCCR structure, according to example implementations.

FIG. 10A illustrates a combustor, according to example implementations.

FIG. 10B illustrates a combustor, according to example implementations.

FIG. 10C illustrates a combustor, according to example implementations.

FIG. 10D illustrates a combustor, according to example implementations.

DETAILED DESCRIPTION

Figure 1A:
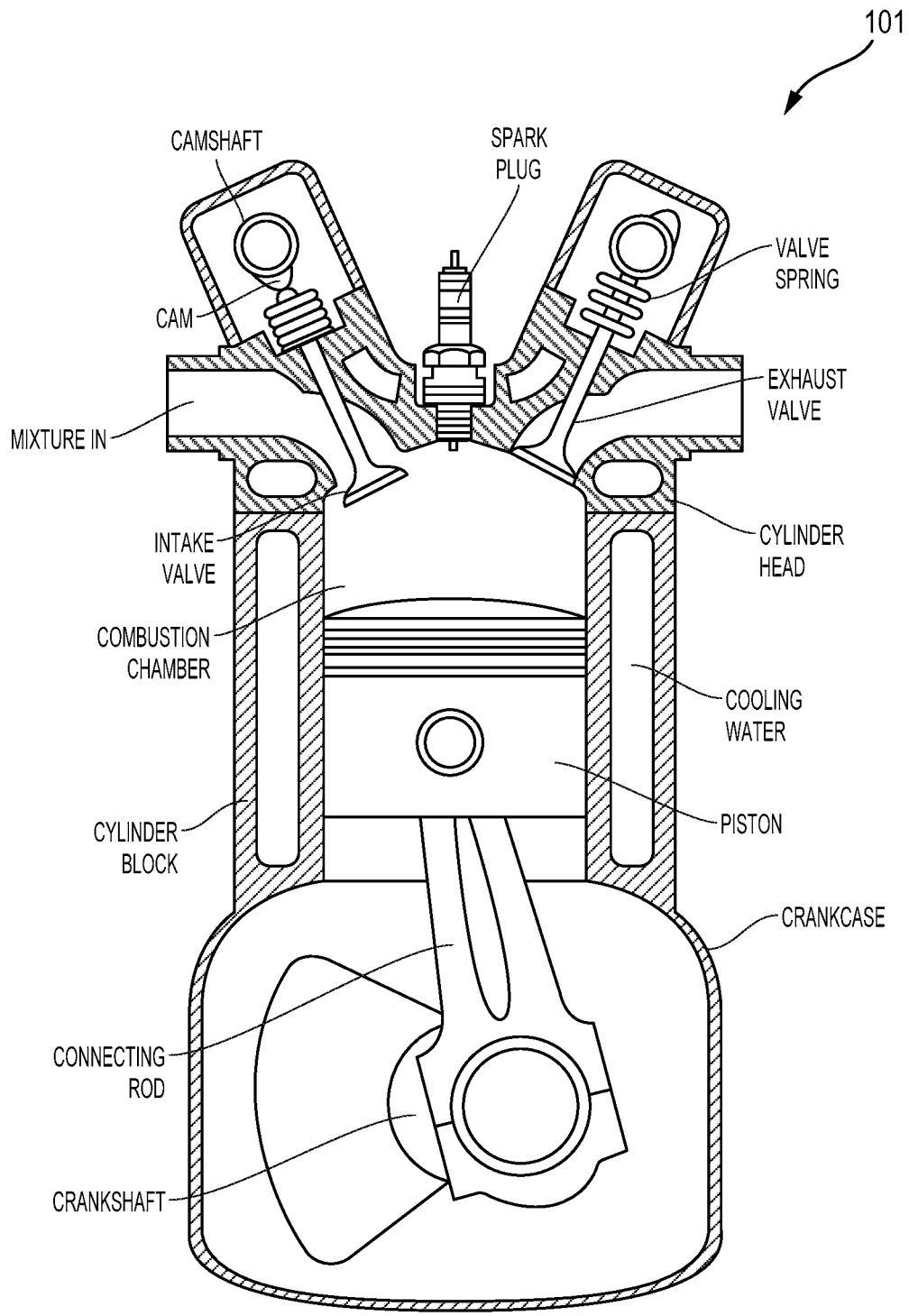
FIG. 1A illustrates a cross-sectional view of an internal combustion engine.

Example methods, devices, and systems are presently disclosed. It should be understood that the word "example" is used in the present disclosure to mean "serving as an instance or illustration." Any implementation or feature presently disclosed as being an "example" is not necessarily to be construed as preferred or advantageous over other implementations or features. Other implementations can be utilized, and other changes can be made, without departing from the scope of the subject matter presented in the present disclosure.

Thus, the example implementations presently disclosed are not meant to be limiting. Components presently disclosed and illustrated in the figures can be arranged, substituted, combined, separated, and designed in a wide variety of different configurations, all of which are contemplated in the present disclosure.

Further, unless context suggests otherwise, the features illustrated in each of the figures can be used in combination with one another. Thus, the figures should be generally viewed as components of one or more overall implementations, with the understanding that not all illustrated features are necessary for each implementation.

In the context of this disclosure, various terms can refer to locations where, as a result of a particular configuration, and under certain conditions of operation, a voltage component can be measured as close to non-existent. For example, "voltage short" can refer to any location where a voltage component can be close to non-existent under certain conditions. Similar terms can equally refer to this location of close-to-zero voltage (for example, "virtual short circuit," "virtual short location," or "voltage null"). In examples, "virtual short" can be used to indicate locations where the close-to-zero voltage is a result of a standing wave crossing zero. "Voltage null" can be used to refer to locations of close-to-zero voltage for a reason other than as result of a standing wave crossing zero (for example, voltage attenuation or cancellation). Moreover, in the context of this disclosure, each of these terms that can refer to locations of close-to-zero voltage are meant to be non-limiting.

In an effort to provide technical context for the present disclosure, the information in this section can broadly describe various components of the implementations presently disclosed. However, such information is provided solely for the benefit of the reader and, as such, does not expressly limit the claimed subject matter. Further, components shown in the figures are shown for illustrative purposes only. As such, the illustrations are not to be construed as limiting. As is understood, components can be added, removed, or rearranged without departing from the scope of this disclosure.

I. Overview

A resonator can be configured to excite plasma and/or electromagnetic radiation. An example of such a resonator can include a center conductor and a larger, surrounding conductor, which could be separated by a dielectric insulator such as a ceramic material. A resonator configured in this manner can be used as an alternative to other types of igniters in a jet engine.

Using a resonator configured in this manner in a jet engine can be advantageous in a variety of ways. For example, a resonator configured in this manner can be controlled so as to provide a plasma corona in a combustion chamber of a jet engine. The plasma corona can be physically larger (for example, in length, width, radius, and/or overall volumetric extent) than a typical spark from a gap spark plug. The larger ignition area/volume could allow a more lean fuel mixture (also known as lower fuel-to-air ratio) to be burned within a combustion zone of the combustion chamber, as compared with ignition using a gap spark plug. In addition, by using the plasma corona to ignite a fuel mixture within the combustion chamber, stoichiometric ratio fuels can be combusted more fully, as compared with ignition using a gap spark plug. Combusting stoichiometric ratio fuels more fully can, in turn, create fewer regulated pollutants (for example, creating less $NO_x$ to be expelled as exhaust) and/or leaving less unspent fuel.

Further, the above-referenced advantages can be achieved at decreased air pressures and temperatures when compared with the air pressures and temperatures in which a gap spark plug be used as an ignition source. Hence, using a resonator configured in accordance with the present disclosure to assist with ignition in a jet engine can ease the air pressure and temperature requirements for combustion within a jet engine.

II. Example Combustion

Igniters can be used to ignite a mixture of air and fuel (for example, within a combustion chamber of an internal combustion engine 101, such as that illustrated in cross-section in FIG. 1A). For example, igniters can be configured as gap spark igniters, similar to an automotive spark plug. However, gap spark igniters might not be desirable in some applications and/or under some conditions. For example, a gap spark igniter might not be capable of igniting and initiating combustion of fuel mixtures that have fuel-to-air ratios below a certain threshold. Further, lean mixtures of fuel and air might have significant environmental and economic benefits by making combustion (for example, within a combustor or an afterburner) more efficient, and thus, using a gap spark igniter might preclude achieving such benefits. In addition, higher thermal efficiencies can be achieved by operating at higher power densities and pressures. However, using more energetic or powerful gap spark igniters reduces overall ignition efficiency because the higher energy levels can be detrimental to the gap spark igniter's lifetime. Higher energy levels might also contribute to the formation of undesirable pollutants and can reduce overall engine efficiency.

While gap spark igniters are described above, other types of igniters can generally include glow plugs (for example, in diesel-fueled internal combustion engines), open flame sources (for example, cigarette lighters, friction spark devices, etc.), and other heat sources.

A variety of fuels (for example, hydrocarbon fuels) can be combusted to yield energy within an internal combustion engine, within a power-generation turbine, within a jet engine, or within various other applications. For example, kerosene (also known as paraffin or lamp oil), gasoline (also known as petrol), fractional distillates of petroleum fuel oil (for example, diesel fuel), crude oil, Fischer-Tropsch synthesized paraffinic kerosene, natural gas, and coal are all hydrocarbon fuels that, when combusted, liberate energy stored within chemical bonds of the fuel. Jet fuel, specifically, can be classified by its "jet propellant" (JP) number. The "jet propellant" (JP) number can correspond to a classification system utilized by the United States military. For example, JP-1 can be a pure kerosene fuel, JP-4 can be a 50% kerosene and 50% gasoline blend, JP-9 can be another kerosene-based fuel, JP-9 can be a gas turbine fuel (for example, including tetrahydrodimethylcyclopentadiene) specifically used in missile applications, and JP-10 can be a fuel similar to JP-9 that includes endo-tetrahydrodicyclopentadiene, exo-tetrahydrodicyclopentadiene, and adamantane. Other forms of jet fuel include zip fuel (for example, high-energy fuel that contains boron), SYNTROLEUM® FT-fuel, other kerosene-type fuels (for example, Jet A fuel and Jet A-1 fuel), and naphtha-type fuels (for example, Jet B fuel). It is understood that other fuels can be combusted as well. Further, the fuel type used can depend upon the application. For example, jet engines, internal combustion engines, and power-generation turbines may each burn different types of fuels.

When fuel (for example, hydrocarbon fuel) interacts with electromagnetic radiation, the fuel can change chemical composition. For example, when hydrocarbon fuel interacts with (for example, is irradiated by) microwaves, some of the hydrogen atoms can be ionized and/or one or more hydrogen atoms can be liberated from a hydrocarbon chain. The processes of liberating hydrogen within fuel, ionizing hydrogen within fuel, or otherwise changing the chemical composition of fuel are collectively referred to in the present disclosure as "reforming" the fuel. Reforming the fuel can include exciting the hydrocarbon fuel at one or more of its natural resonant frequencies (for example, acoustic and/or electromagnetic resonant frequencies) to break one or more of the carbon-hydrogen (or other) bonds within the hydrocarbon chain. When hydrogen within a hydrocarbon fuel becomes ionized and/or is liberated from the hydrocarbon chain, the resulting hydrocarbon fuel can require less energy to burn. Thus, a leaner fuel/air mixture that includes reformed fuel can achieve the same output power (for example, within a combustion chamber of a jet engine or a power-generation turbine) as compared to a more rich fuel/air mixture that includes non-reformed fuel, since the reformed fuel can combust more quickly and thoroughly. Analogously, when comparing equal fuel-to-air ratios, less input energy can be required to combust a mixture that includes reformed fuel when compared to a mixture that includes non-reformed fuel.

In addition to reforming fuels, electromagnetic radiation can alter an energy state of fuel and/or of a fuel mixture. In an example implementation, altering the energy state of fuel can include exciting electrons within the valence band of the hydrocarbon chain to higher energy levels. In such scenarios, raising the energy state can also include reorienting polar molecules (for example, water and/or polar hydrocarbon chains) within a fuel/air mixture due to electromagnetic fields applying a torque on polar molecules. Reorienting polar molecules can result in molecular motion, thereby increasing an effective temperature and/or kinetic energy of the molecule, which raises the energy state of fuel. By raising the energy state of fuel, the activation energy for combustion of the fuel can be reduced. When the activation energy for combustion is reduced, the energy supplied by the ignition source can also be decreased, thereby conserving energy during ignition.

Presently disclosed are ignition systems with resonators (for example, QWCCR structures) that use both RF power and DC power. The presently disclosed RF ignition systems provide an alternative to other types of igniters. For example, the QWCCR structure can be used as an igniter (for example, in place of an automotive gap spark plug) in the internal combustion engine 101. Such RF ignition systems can excite plasma (for example, within a corona). If an igniter is configured as one of the RF ignition systems presently disclosed, then more efficient, leaner, cleaner combustion can be achieved. Such increased combustion efficiency can be achieved at decreased air pressures and temperatures when compared with a gap spark igniter (for example, if the RF ignition system is used in a jet engine). Further, such increased combustion efficiency can be achieved at higher air pressures and temperatures when compared with a gap spark igniter. It is understood throughout this disclosure that where reference is made to "RF" or to microwaves, in alternate implementations, other wavelengths of electromagnetic waves outside of the RF range can be used alternatively or in addition to RF electromagnetic waves.

As described above, RF ignition systems can excite plasma. Plasma is one of the four fundamental states of matter (in addition to solid, liquid, and gas). Further, plasmas are mixtures of positively charged gas ions and negatively charged electrons. Because plasmas are mixtures of charged particles, plasmas have associated intrinsic electric fields. In addition, when the charged particles in the mixture move, plasmas also produce magnetic fields (for example, according to Ampere's law). Given the electromagnetic nature of plasmas, plasmas interact with, and can be manipulated by, external electric and magnetic fields. For example, placing a ferromagnetic material (for example, iron, cobalt, nickel, neodymium, samarium-cobalt, etc.) near a plasma can cause the plasma to be attracted to or repelled from the ferromagnetic material (for example, causing the plasma to move).

Plasmas can be formed in a variety of ways. One way of forming a plasma can include heating gases to a sufficiently high temperature (for example, depending on ambient pressure). Additionally or alternatively, forming a plasma can include exposing gases to a sufficiently strong electromagnetic field. Lightning is an environmental phenomenon involving plasma. One application of plasma can include neon signs. Further, because plasma is responsive to applied electromagnetic fields, plasma can be directed according to specific patterns. Hence, plasmas can also be used in technologies such as plasma televisions or plasma etching.

Plasmas can be characterized according to their temperature and electron density. For example, one type of plasma can be a "microwave-generated plasma" (for example, ranging from 5 eV to 15 eV in energy). Such a plasma can be generated by a QWCCR structure, for example.

III. Example Resonator

An example implementation of a QWCCR structure 100 is illustrated in FIGS. 1B-1D. As illustrated, the QWCCR structure 100 can include an outer conductor 102, an inner conductor 104 with an associated electrode 106, a base conductor 110, and a dielectric 108. Also as illustrated, the QWCCR structure 100 can be shaped as concentric circular cylinders. The inner conductor 104 can have radius 'a', the outer conductor 102 can have inner radius 'b', and the outer conductor 102 can have outer radius 'c', as illustrated in cross-section in FIG. 1D. In alternate implementations, the QWCCR structure 100 can have other shapes (for example, concentric ellipsoidal cylinders or concentric, enclosed, elongated volumes with square or rectangular cross-sections). The inner conductor 104, the outer conductor 102 (or just the inner surface of the outer conductor 102), the electrode 106, and the base conductor 110 can be made of various conductive materials (for example, steel, gold, silver, platinum, nickel, or alloys thereof). Further, in some implementations, the inner conductor 104, the outer conductor 102, and the base conductor 110 can be made of the same conductive materials, while in other implementations, the inner conductor 104, the outer conductor 102, and the base conductor 110 can be made of different conductive materials. Additionally, in some implementations, the inner conductor 104, the outer conductor 102, and/or the base conductor 110 can include a dielectric material coated in a conductor (for example, a metal-plated ceramic). In such implementations, the conductive coating can be thicker than a skin-depth of the conductor at a given excitation frequency of the QWCCR structure 100 such that electricity is conducted throughout the conductive coating.

As illustrated, an electrode 106 can be disposed at a distal end of the inner conductor 104. The electrode 106 can be made of a conductive material as described above (for example, the same conductive material as the inner conductor 104). For example, the electrode 106 can be machined with the inner conductor 104 as a single piece. In some implementations, as illustrated, the base conductor 110, the outer conductor 102, the inner conductor 104, and the electrode can be shorted together. For example, the base conductor 110 can short the outer conductor 102 to the inner conductor 104, in some implementations. When shorted together, these components can be directly electrically coupled to one another such that each of these components is at the same electric potential.

Further, in implementations where the base conductor 110, the outer conductor 102, and the inner conductor 104 (including the electrode 106) are shorted together, the base conductor 110, the outer conductor 102, and the inner conductor 104 (including the electrode 106) can be machined as a single piece. In addition, the electrode 106 can include a concentrator (for example, a tip, a point, or an edge), which can concentrate and enhance the electric field at one or more locations. Such an enhanced electric field can create conditions that promote the excitation of a plasma corona near the concentrator (for example, through a breakdown of a dielectric, such as air, that surrounds the concentrator). The concentrator can be a patterned or shaped portion of the electrode 106, for example. The electrode 106, including the concentrator, can be electromagnetically coupled to the inner conductor 104. In the present disclosure and claims, the electrode 106 and/or the concentrator can be described as being "configured to electromagnetically couple to" the inner conductor 104. This language is to be interpreted broadly as meaning that the electrode 106 and/or the concentrator: are presently electromagnetically coupled to the inner conductor 104, are always electromagnetically coupled to the inner conductor 104, can be selectively electromagnetically coupled to the inner conductor 104 (for example, using a switch), are only electromagnetically coupled to the inner conductor 104 when a power source is connected to the inner conductor 104, and/or are able to be electromagnetically coupled to the inner conductor 104 if one or more components are repositioned relative to one another. For example, the electrode 106 can be "configured to electromagnetically couple to" the inner conductor 104 if the electrode 106 is machined as a single piece with the inner conductor 104, if the electrode 106 is connected to the inner conductor 104 using a wire or other conducting mechanism, or if the electrode 106 is disposed sufficiently close to the inner conductor 104 such that the electrode 106 electromagnetically couples to one or more evanescent waves excited by the inner conductor 104 when the inner conductor 104 is connected to a power source.

As illustrated in FIG. 1C, the electrode 106 and/or a concentrator of the electrode 106 can extend beyond the distal end of the outer conductor 102 and/or the distal end of the dielectric 108. In alternate implementations, the electrode 106 and/or a concentrator of the electrode 106 can be flush with the distal end of the outer conductor 102 and/or the distal end of the dielectric 108. In alternate implementations, the electrode 106 and/or a concentrator of the electrode 106 can be shorter than the outer conductor 102, such that no portion of the electrode 106 and/or concentrator is flush with the distal end of the outer conductor 102 and no portion extends beyond the distal end of the outer conductor 102. The QWCCR structure 100 can be excited at resonance, in some implementations. The resonance can generate a standing voltage quarter-wave within the QWCCR structure 100. If the concentrator, the distal end of the outer conductor 102, and the distal end of the dielectric 108 are each flush with one another, the electromagnetic field can quickly collapse outside of the QWCCR structure 100, thereby concentrating the majority of the electromagnetic energy at the concentrator. In still other implementations, the distal end of the outer conductor 102 and/or the distal end of the dielectric 108 can extend beyond the electrode 106 and/or a concentrator of the electrode 106. The electrode 106 can effectively modify the physical length of the inner conductor 104, which can modify the resonance conditions of the QWCCR structure 100 (for example, can modify the electrical length of the QWCCR structure 100). Various resonance conditions can thus be achieved across a variety of QWCCR structures 100 by varying the geometry of the electrode 106 and/or a concentrator of the electrode 106.

Further, as illustrated in FIG. 1C, the base conductor 110 can be electrically coupled to the outer conductor 102 and the inner conductor 104. In alternate implementations, the inner conductor 104 can be electrically insulated from the outer conductor 102 (rather than shorted together through the base conductor 110).

Plasmas (for example, plasma coronas generated by the QWCCR structure 100) can be used to ignite mixtures of air and fuel (for example, hydrocarbon fuel for use in a combustion process). Plasma-assisted ignition (for example, using a QWCCR structure 100) is fundamentally different from ignition using a gap spark plug. For example, efficient electron-impact excitation, dissociation of molecules, and ionization of atoms, which might not occur in ignition using gap spark plugs, can occur in plasma-assisted ignition. Further, in plasmas, an external electric field can accelerate the electrons and/or ions. Thus, using electric fields, energy within the plasma (for example, thermal energy) can be directed to specific locations (for example, within a combustion chamber).

There are a variety of mechanisms by which plasma can impart the energy necessary to ignite mixtures of air and fuel. For example, electrons can impart energy to molecules during collisions. However, this singular energy exchange might be relatively minor (for example, because an electron's mass is orders of magnitude less than a molecule's mass). So long as the rate at which electrons are imparting energy to the molecules is higher than the rate at which molecules are undergoing relaxation, a population distribution of the molecules (for example, a population distribution that differs from an initial Boltzmann distribution of the molecules) can arise. The molecules having higher energy, along with the dissociation and ionization processes, can emit ultraviolet (UV) radiation (for example, when undergoing relaxation) that affects mixtures of fuel and air. Further, gas heating and an increase in system reactivity can increase the likelihood of ignition and flame propagation. In addition, when the average electron energy within a plasma (for example, within a combustion chamber) exceeds 10 eV, gas ionization can be the predominant mechanism by which plasma is formed (over electron-impact excitation and dissociation of molecules).

Plasma-assisted ignition can have a variety of benefits over ignition using a gap spark plug. For example, in plasma-assisted ignition, a plasma corona that is generated can be physically larger (for example, in length, width, radius, and/or overall volumetric extent) than a typical spark from a gap spark plug. This can allow a more lean fuel mixture (also known as lower fuel-to-air ratio) to be burned once combustion occurs as compared with alternative ignition, for example. Also, because a larger energy can be energized in plasma-assisted ignition, stoichiometric ratio fuels can be combusted more fully, thereby creating fewer regulated pollutants (for example, creating less $NO_x$ to be expelled as exhaust) and/or leaving less unspent fuel.

Dielectric breakdown of air or another dielectric material near the electrode 106 of the QWCCR structure 100 can be a mechanism by which a plasma corona is excited near the concentrator of the QWCCR structure 100. Factors that impact the breakdown of a dielectric, such as dielectric breakdown of air, include free-electron population, electron diffusion, electron drift, electron attachment, and electron recombination. Free electrons in the free-electron population can collide with neutral particles or ions during ionization events. Such collisions can create additional free electrons, thereby increasing the likelihood of dielectric breakdown. Oppositely, electron diffusion and attachment can each be mechanisms by which free electrons recombine and are lost, thereby reducing the likelihood of dielectric breakdown.

As presently described, a plasma corona can be provided "proximate to" a distal end of the QWCCR structure 100, the electrode 106, and/or a concentrator of the QWCCR structure 100. In other words, the plasma corona could be described as being provided "nearby" or "at" a distal end of the QWCCR structure 100, the electrode 106, and/or a concentrator of the QWCCR structure 100. Further, this terminology is not to be viewed as limiting. For example, while the plasma corona is provided "proximate to" the QWCCR structure 100, this does not limit the plasma corona from extending away from the QWCCR structure 100 and/or from being moved to other locations that are farther from the QWCCR structure 100 after being provided "proximate to" the QWCCR structure 100.

When used to describe a relationship between a plasma corona and a distal end of the QWCCR structure 100, a relationship between a plasma corona and the electrode 106, a relationship between a plasma corona and a concentrator of the electrode 106, or similar relationships, the term "proximate" can describe the physical separation between the plasma corona and the other component. In various implementations, the physical separation can include different ranges. For example, a plasma corona provided "proximate to" the concentrator can be separated from the concentrator (in other words, can "stand off from" the concentrator) by less than 1.0 nanometer, by 1.0 nanometer to 10.0 nanometers, by 10.0 nanometers to 100.0 nanometers, by 100.0 nanometers to 1.0 micrometer, by 1.0 micrometer to 10.0 micrometers, by 10.0 micrometers to 100.0 micrometers, or by 100.0 micrometers to 1.0 millimeter. Additionally or alternatively, a plasma corona provided "proximate to" the concentrator can be separated from the concentrator by 0.01 times a width of the plasma corona to 0.1 times a width of the plasma corona, by 0.1 times a width of the plasma corona to 1.0 times the width of the plasma corona, or by 1.0 times a width of the plasma corona to 10.0 times a width of the plasma corona. Even further, a plasma corona provided "proximate to" the concentrator can be separated from the concentrator by 0.01 times a radius of the concentrator to 0.1 times a radius of the concentrator, by 0.1 times a radius of the concentrator to 1.0 times a radius of the concentrator, or by 1.0 times a radius of the concentrator to 10.0 times a radius of the concentrator.

It is understood that in various implementations, the plasma corona can emit light entirely within the visible spectrum, partially within the visible spectrum and partially outside the visible spectrum, or completely outside the visible spectrum. In other words, even if the plasma corona is "invisible" to the human eye and/or to optics that only sense light within the visible spectrum, it is not necessarily the case that the plasma corona is not being provided.

IV. Mathematical Description of Example Resonator

In order for dielectric breakdown to occur, an electric field within the dielectric must be greater than or equal to an electric field breakdown threshold. An electric field generated by an alternating current (AC) source can be described by a root-mean-square (rms) value for electric field ($E_{rms}$). The rms value for electric field ($E_{rms}$) can be calculated according the following equation:

$$E_{rms} = \sqrt{\frac{1}{T_2 - T_1} \int_{T_1}^{T_2} E^2 \, dt}$$

where $T_2-T_1$ represents the period over which the electric field is oscillating (for example, corresponding to the period of the AC source generating the electric field). As described mathematically above, the rms value for electric field ($E_{rms}$) represents the quadratic mean of the electric field. Using the rms value for electric field, an effective electric field ($E_{eff}$) can be calculated that is approximately frequency independent (for example, by removing phase lag effects from the oscillating electric field):

$$E_{eff}^2 = E_{rms}^2 \frac{v_c^2}{\omega^2 + v_c^2}$$

where $\omega$ represents the angular frequency of the electric field (for example, $$\omega = \frac{2\pi}{T_2 - T_1}\Big)$$

and $v_c$ represents the effective momentum collision frequency of the electrons and neutral particles. The angular frequency ($\omega$) of the electric field can correspond to the frequency of an excitation source used to excite the electric field (for example, the QWCCR structure 100). Using this effective electric field ($E_{eff}$), DC breakdown voltages for various gases (and potentially other dielectrics) can be related to AC breakdown values for uniform electric fields. For air, $v_c \approx 5 \cdot 10^9 \times p$, where p represents the pressure (in torr). At atmospheric pressure (for example, around 760 torr) or above and excitation frequencies of below 1 THz, the effective momentum collision frequency of the electrons and neutral particles ($v_c$) will dominate the denominator of the fractional coefficient of $E_{rms}^2$. Therefore, an approximation of the rms breakdown field ($E_b$) can be used. The rms breakdown field ($E_b$), in V/cm, of a uniform microwave field in the collision regime can be given by:

$$E_b = 30 \cdot 297\Big(\frac{p}{T}\Big)$$

where T is the temperature in Kelvin.

An analytical description of the electromagnetics of the QWCCR structure 100 follows.

Figure 1E:
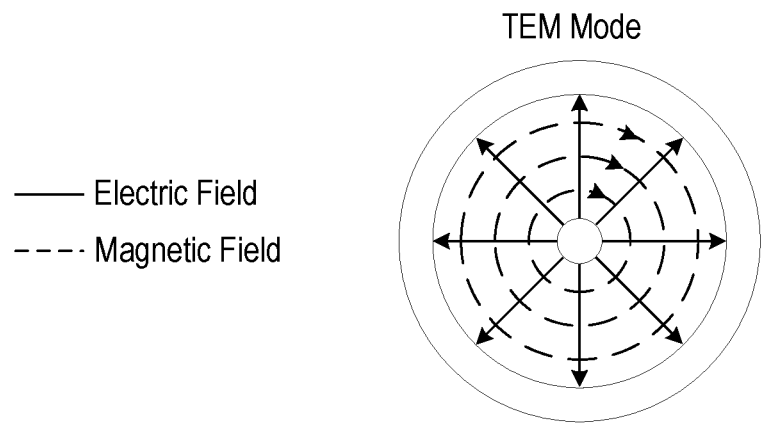
FIG. 1E is a cross-sectional illustration of an electromagnetic mode in a QWCCR structure, according to example implementations.

If fringing electromagnetic fields are assumed to be small, the lowest quarter-wave resonance in a coaxial cavity is a transverse electromagnetic mode (TEM mode) (as opposed to a transverse electric mode (TE mode) or a transverse magnetic mode (TM mode)). The TEM mode is the dominant mode in a coaxial cavity and has no cutoff frequency ($\omega_c$). In the TEM mode (as illustrated in FIG. 1E), because neither the electric field nor the magnetic field have any components in the z-direction (coordinate system illustrated in FIG. 1D), the electric and magnetic fields can be written, respectively, as:

$$H = H_\varphi \hat{a}_\varphi = \frac{I_0}{2\pi r} \cos(\beta z) \hat{a}_\varphi$$

$$E = E_r \hat{a}_r = \frac{V_0}{2\pi r} \sin(\beta z) \hat{a}_r$$

where H is a phasor representing the magnetic field vector, E is a phasor representing the electric field vector, $\hat{a}_\varphi$ represents a unit vector in the $\varphi$ direction (labeled in FIG.

1D), $\hat{a}_r$ represents a unit vector in the r direction (labeled in FIG. 1D), β represents the wave number (canonically defined as $$\beta = \frac{2\pi}{\lambda},$$

where λ is the wavelength), $I_0$ represents the maximum current in the cavity, $V_0$ represents the maximum voltage in the cavity, and z represents a distance along the QWCCR structure 100 in the z direction (labeled in FIG. 1D).

Figure 1F:
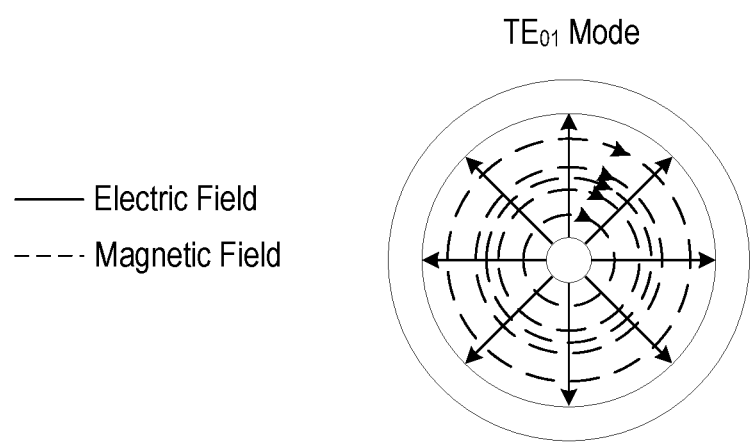
FIG. 1F is a cross-sectional illustration of an electromagnetic mode in a QWCCR structure, according to example implementations.

In various implementations, various electromagnetic modes of the QWCCR structure 100 can be excited in order to achieve various electromagnetic properties. In some implementations, for instance, a single electromagnetic mode can be excited, whereas in alternate implementations, a plurality of electromagnetic modes can be excited. For example, in some implementations, the $TE_{01}$ mode (as illustrated in FIG. 1F) can be excited.

Quality factor (Q) can be defined as:

$$Q = \frac{\omega \cdot U}{P_L} \rightarrow U = \frac{P_L \cdot Q}{\omega}$$

where ω is the angular frequency, U is the time-average energy, and $P_L$ is the time-average power loss. Quality factor (Q) can be used to measure goodness of a resonator cavity. Other formulations of goodness measurement can also be used (for example, based on full-width, half-max (FWHM) or a 3 decibel (dB) bandwidth of cavity resonance). In some implementations, the quality factor (Q) can be maximized when the ratio of the inner radius of the outer conductor 'b' to the radius of the inner conductor 'a' is approximately equal to 4. However, it will be understood that many other ways to adjust and/or maximize quality factor (Q) are possible and contemplated in the present disclosure.

At resonance, the stored energy of the QWCCR structure 100 oscillates between electrical energy ($U_e$) (within the electric field) and magnetic energy ($U_m$) (within the magnetic field). Time-average stored energy in the QWCCR structure 100 can be calculated using the following:

$$U = U_m + U_e = \frac{1}{4}\int_{vol} \mu|H|^2 + \varepsilon|E|^2$$

where μ is magnetic permeability and ε is dielectric permittivity. By inserting the values for electric field and magnetic field from above, and integrating over the entire volume of the QWCCR structure 100, the following expression can be obtained:

$$U = \frac{\ln\left(\frac{b}{a}\right)\cdot\lambda}{64\pi}(\mu\cdot I_0^2 + \varepsilon\cdot V_0^2)$$

where b represents the inner radius of the outer conductor 102 of the QWCCR structure 100 (as illustrated in FIG. 1D), a represents the radius of the inner conductor 104 of the QWCCR structure 100 (as illustrated in FIG. 1D), and λ represents the wavelength of the source (for example, AC source) used to excite the QWCCR structure 100. Because the magnetic energy at maximum is the same as the electric energy at maximum, $\mu\cdot I_0^2$ can be replaced with $\varepsilon\cdot V_0^2$, thus resulting in:

$$U = \frac{\ln\left(\frac{b}{a}\right)\cdot\lambda}{32\pi}(\varepsilon\cdot V_0^2)$$

Now, by equating the two above expressions for U, the following relationship can be expressed:

$$\frac{P_L \cdot Q}{\omega} = \frac{\ln\left(\frac{b}{a}\right)\cdot\lambda}{32\pi}(\varepsilon\cdot V_0^2) \rightarrow V_0 = \sqrt{\frac{32\pi\cdot Q\cdot P_L}{\omega\cdot\varepsilon\cdot\ln\left(\frac{b}{a}\right)\cdot\lambda}}$$

Further, in recognizing that $$\omega = 2\pi f = \frac{2\pi c}{\lambda},$$

where c is the speed of light;

$$c = \sqrt{\frac{1}{\mu\cdot\varepsilon}}\text{; and }\eta = \sqrt{\frac{\mu}{\varepsilon}},$$

where η is the impedance of the dielectric between the inner conductor 104 and the outer conductor 102 of the QWCCR structure 100, the following relationship for the peak potential ($V_0$) can be identified:

$$V_0 = 4\sqrt{\frac{\eta\cdot Q\cdot P_L}{\ln\left(\frac{b}{a}\right)}}$$

Given that electric field decays as the distance from the peak potential ($V_0$) increases, the largest value of electric field corresponding to the peak potential ($V_0$) occurs exactly at the surface of the inner conductor (for example, at radius a, as illustrated in FIG. 1D). Using the above equation for phasor electric field (E), the peak value of electric field ($E_a$) can be expressed as:

$$E_a = \frac{V_0}{2\pi a} = \frac{2}{\pi a}\sqrt{\frac{\eta\cdot Q\cdot P_L}{\ln\left(\frac{b}{a}\right)}}$$

If the above peak value of electric field ($E_a$) meets or exceeds the above-described rms breakdown field ($E_b$), a dielectric breakdown can occur. For example, a dielectric breakdown of the air surrounding the tip of the QWCCR structure 100 can result in a plasma corona being excited. As indicated in the above equation for peak electric field ($E_a$), the smaller the radius a of the inner conductor 104, the smaller the inner radius b of outer conductor 102, the higher the quality factor (Q) of the QWCCR structure 100, and the larger the time-average power loss ($P_L$), the more likely it is that breakdown can occur (for example, because the peak value of electric field ($E_a$) is larger). A larger excitation power can correspond to a larger time-average power loss ($P_L$) in the QWCCR structure 100, for example.

The power loss ($P_L$) can include ohmic losses ($P_\sigma$) on conductive surfaces (for example, the surface of the outer conductor 102, the surface of the inner conductor 104, and/or the surface of the base conductor 110, as illustrated in FIG. 1C), dielectric losses ($P_{\sigma_e}$) in the dielectric 108, and radiation losses ($P_{rad}$) from a radiating end of the QWCCR structure 100 (for example, the distal end of the QWCCR structure 100). Each of the conductors can have a corresponding surface resistance ($R_S$). The surface resistance ($R_S$) can be the same for one or more of the conductors if the corresponding conductors are made of the same conductive materials. The corresponding surface resistance for each conductor can be expresses as $$R_S = \sqrt{\frac{\omega \cdot \mu_c}{2 \cdot \sigma_c}},$$

where $\mu_c$ is the magnetic permeability of the respective conductor and $\sigma_c$ is the conductivity of the respective conductor. The power lost by each conductor can be calculated according to the following:

$$P_\sigma = \frac{1}{2} \int_A R_S |H_{//}|^2$$

where $H_{//}$ is the magnetic field parallel to the surface of the conductor. Thus, the total power loss in all conductors can be represented by:

$$P_\sigma = P_{inner} + P_{outer} + P_{base} = \frac{R_S \cdot I_0^2}{4\pi} \left[ \frac{\lambda}{8 \cdot a} + \frac{\lambda}{8 \cdot b} + \ln\left(\frac{b}{a}\right) \right]$$

Further, if the dielectric 108 is an isotropic, low-loss dielectric, the dielectric 108 can be characterized by its dielectric constant ($\varepsilon$) and its loss tangent ($\tan(\delta_e)$), where the loss tangent ($\tan(\delta_e)$) represents conductivity and alternating molecular dipole losses. Using dielectric constant ($\varepsilon$) and loss tangent ($\tan(\delta_e)$), an effective dielectric conductivity ($\sigma_e$) can be approximately defined as:

$$\sigma_e \approx \omega \cdot \varepsilon \cdot \tan(\delta_e)$$

Based on the above, the power dissipated in the dielectric can be calculated according to the following:

$$P_{\sigma_e} = \frac{1}{2} \int_{vol} \sigma_e |E|^2 = \frac{\sigma_e \cdot \eta \cdot I_0^2}{4\pi} \left( \frac{\ln\left(\frac{b}{a}\right) \cdot \lambda}{8} \right)$$

In order to combine all quality factors of the QWCCR structure 100 into a total internal quality factor ($Q_{int}$), the following relationship can be used:

$$Q_{int} = \frac{1}{(Q_{inner}^{-1} + Q_{outer}^{-1} + Q_{base}^{-1} + Q_{\sigma_e}^{-1})}$$

where $Q_{inner}^{-1}$, $Q_{outer}^{-1}$, $Q_{base}^{-1}$, and $Q_{\sigma_e}^{-1}$ are the quality factors of the inner conductor 104, the outer conductor 102, the base conductor 110, and the dielectric 108, respectively. Using the above expression for quality factor (Q) in terms of time-average power loss ($P_L$), angular frequency ($\omega$), and time-average energy (U), the following expression for internal quality factor ($Q_{int}$) can be determined:

$$Q_{int} = \left\{ \frac{R_S}{2 \cdot \pi \cdot \eta} \left[ \frac{\left(\frac{b}{a} + 1\right)}{\frac{b}{a} \cdot \ln\left(\frac{b}{a}\right)} + 8 \right] + \tan(\delta_e) \right\}^{-1}$$

Based on the definitions of the individual quality factors above, the individual contribution of the outer conductor quality factor ($Q_{outer}$) to the internal quality factor ($Q_{int}$) can be greater than the individual contribution of the inner conductor quality factor ($Q_{inner}$). Thus, to increase the internal quality factor ($Q_{int}$), a material with higher conductivity can be used for the inner conductor 104 than is used for the outer conductor 102. Further, the base conductor 110 quality factor ($Q_{base}$) and the dielectric 108 quality factor ($Q_{\sigma_e}$) can be unaffected by the geometry of the QWCCR structure 100 (both in terms of $$\frac{b}{a}$$

and in terms of $$\frac{b}{\lambda}).$$

The QWCCR structure 100 can also radiate electromagnetic waves (for example, from a distal, non-closed end opposite the base conductor 110). For example, if the QWCCR structure 100 is being excited by an RF power source (for example, a signal generator oscillating at radio frequencies), the QWCCR structure 100 can radiate microwaves from a distal end (for example, from an aperture of the distal end) of the QWCCR structure 100. Such radiation can lead to power losses, which can be approximated using admittance. Assuming that the transverse dimensions of the QWCCR structure 100 are significantly smaller than the wavelength ($\lambda$) being used to excite the QWCCR structure 100 (in other words, $a \ll \lambda$ and $b \ll \lambda$), the real part ($G_r$) and imaginary part ($B_r$) of admittance can be represented by:

$$G_r \approx \frac{4 \cdot \pi^5 \cdot \left[ \left(\left(\frac{b}{\lambda}\right)^2 - \left(\frac{b}{\lambda}\right)^2\right) \right]^2}{3 \cdot \eta \cdot \ln^2\left(\frac{b}{a}\right)}$$

$$B_r \approx \frac{16 \cdot \pi \cdot \left(\left(\frac{b}{\lambda}\right) - \left(\frac{b}{\lambda}\right)\right)}{\eta \cdot \ln^2\left(\frac{b}{a}\right)} \cdot \left[ E\left(\frac{2\sqrt{\frac{b}{a}}}{1 + \frac{b}{a}}\right) - 1 \right]$$

where E(x) is the complete elliptical integral of the second kind. Namely:

$$E(x) = \int_0^{\frac{\pi}{2}} \sqrt{1 - x^2 \cdot \sin^2(\theta)} \cdot d\theta$$

Further, the line integral of the electric field from the inner conductor 104 to the outer conductor 102 can be used to determine the potential difference ($V_{ab}$) across the shunt admittance corresponding to the electromagnetic waves radiated.

$$V_{ab}|_{\beta z = \frac{\pi}{4}} = \int_{a \to b} E_r = \frac{V_0 \ln\left(\frac{b}{a}\right)}{2\pi}$$

Using the potential difference ($V_{ab}$) across the shunt admittance corresponding to the electromagnetic waves radiated, the power going to radiation ($P_{rad}$) can be represented by:

$$P_{rad} = \frac{1}{2} G_r V_{ab}^2 = \frac{V_0 \pi^3 \left(\frac{b}{\lambda}\right)^4 \left[\left(\frac{b}{a}\right)^2 - 1\right]^2}{6\eta \left(\frac{b}{a}\right)^4}$$

In addition, using the potential difference ($V_{ab}$) across the shunt admittance corresponding to the electromagnetic waves radiated, the energy stored during radiation ($U_{rad}$) can be represented by:

$$U_{rad} = \frac{1}{4}\left(\frac{B_r}{\omega}\right) V_{ab}^2 = \frac{\varepsilon V_0^2 \lambda \left(\frac{b}{\lambda}\right)\left[\left(\frac{b}{a}\right)^{-1} + 1\right]}{2\pi^2} \left[E\left(\frac{2\sqrt{\frac{b}{a}}}{1 + \frac{b}{a}}\right) - 1\right]$$

Based on the above, the overall quality factor of the QWCCR structure 100 ($Q_{QWCCR}$) can be described by the following:

$$Q_{QWCCR} = \frac{\omega(U + U_{rad})}{P_{inner} + P_{outer} + P_{base} + P_{\sigma_e} + P_{rad}}$$

If the energy stored during radiation ($U_{rad}$) is small compared with the energy stored in the interior of the QWCCR structure 100 (U), the radiation power ($P_{rad}$) can be treated similarly to the other losses. Further, the energy stored during radiation ($U_{rad}$) can be neglected in the above equation:

$$Q \approx \frac{\omega(U)}{P_{inner} + P_{outer} + P_{base} + P_{\sigma_e} + P_{rad}}$$

Still further, the quality factor of the radiation component ($Q_{rad}$) can be described using the above relationship for quality factors:

$$Q_{rad} = \frac{\omega U}{P_{rad}} = \frac{3\left(\frac{b}{\lambda}\right)^4 \ln\left(\frac{b}{a}\right)}{8\pi^3 \left(\frac{b}{\lambda}\right)^4 \left[\left(\frac{b}{a}\right)^2 - 1\right]^2}$$

Even further, using the above-referenced quality factors, the total quality factor of the QWCCR structure 100 ($Q_{QWCCR}$) can be approximated by:

$$Q_{QWCCR} \approx \left(\frac{8\pi^3 \left(\frac{b}{\lambda}\right)^4 \left[\left(\frac{b}{a}\right)^2 - 1\right]^2}{3\left(\frac{b}{a}\right)^4 \ln\left(\frac{b}{a}\right)} + \frac{R_S}{2\pi\eta}\left[\frac{\left(\left(\frac{b}{a}\right) + 1\right)}{\left(\frac{b}{\lambda}\right) \ln\left(\frac{b}{a}\right)} + 8\right] + \tan(\delta_e)\right)^{-1}$$

Based on the above relationships, it can be shown that one method of minimizing losses due to radiation of electromagnetic waves by the QWCCR structure 100 is to minimize the inner radius b of the outer conductor 102 with respect to the excitation wavelength (λ). Another way of minimizing losses due to radiation of electromagnetic waves is to select an inner radius b of the outer conductor 102 that is close in dimension to the radius a of the inner conductor 104.

Various physical quantities and dimensions of the QWCCR structure 100 can be adjusted to modify performance of the QWCCR structure 100. For example, physical quantities and dimensions can be modified to maximize and/or optimize the total quality factor of the QWCCR structure 100 ($Q_{QWCCR}$). In some implementations, different dielectrics can be inserted into the QWCCR structure 100. In one implementation, the dielectric 108 can include a composite of multiple dielectric materials. For example, a half of the dielectric 108 near a proximal end of the QWCCR structure 100 can include alumina ceramic while a half of the dielectric 108 near a distal end of the QWCCR structure 100 can include air. The resonant frequency can be based on the dimensions and the fabrication materials of the QWCCR structure 100. Hence, modification of the dielectric 108 can modify a resonant frequency of the QWCCR structure 100. In some implementations, the resonant frequency can be 2.45 GHz based on the dimensions of the QWCCR structure 100. In other implementations, the resonant frequency of the QWCCR structure 100 could be within an inclusive range between 1 GHz to 100 GHz. In still other implementations, the resonant frequency of the QWCCR structure 100 could be within an inclusive range of 100 MHz to 1 GHz or an inclusive range of 100 GHz to 300 GHz. However, other resonant frequencies are contemplated within the context of the present disclosure.

An RF power source exciting the QWCCR structure 100 can generate a standing electromagnetic wave within the QWCCR structure 100. In some implementations, the resonant frequency of the QWCCR structure 100 can be designed to match the frequency of an RF power source that is exciting the QWCCR structure 100 (for example, to maximize power transferred to the QWCCR structure 100). For example, if a desired excitation frequency corresponds to a wavelength of $\lambda_0$, dimensions of the QWCCR structure 100 can be modified such that the electrical length of the QWCCR structure 100 is an odd-integer multiple of quarter wavelengths (for example, ¼λ₀, ¾λ₀, 5/4λ₀, 7/4λ₀, 9/4λ₀, 11/4λ₀, 13/4λ₀, etc.). The electrical length is a measure of the length of a resonator in terms of the wavelength of an electromagnetic wave used to excite the resonator. The QWCCR structure 100 can be designed for a given resonant frequency based on the dimensions of the QWCCR structure 100 (for example, adjusting dimensions of the inner conductor 104, the outer conductor 102, or the dielectric 108) or the materials of the QWCCR structure 100 (for example, adjusting materials of the inner conductor 104, the outer conductor 102, or the dielectric 108).

In other implementations, the resonant frequency of the QWCCR structure 100 can be designed or adjusted such that its resonant frequency does not match the frequency of an RF power source that is exciting the QWCCR structure 100 (for example, to reduce power transferred to the QWCCR structure 100). Analogously, the frequency of an RF power source can be de-tuned relative to the resonant frequency of a QWCCR structure 100 that is being excited by the RF power source. Additionally or alternatively, the physical quantities and dimensions of the QWCCR structure 100 can be modified to enhance the amount of energy radiated (for example, from the distal end) in the form of electromagnetic waves (for example, microwaves) from the QWCCR structure 100. As an example, one or more elements of the QWCCR structure 100 could be movable or otherwise adjustable so as to modify the resonant properties of the QWCCR structure 100. Enhancing the amount of energy radiated might be done at the expense of maximizing the electric field at a concentrator of the electrode 106 at the distal end of the inner conductor 104. For example, some implementations can include slots or openings in the outer conductor 102 to increase the amount of radiated energy despite possibly reducing a quality factor of the QWCCR structure 100.

In still other implementations, the physical quantities and dimensions of the QWCCR structure 100 can be designed in such a way so as to enhance the intensity of an electric field at a concentrator of the electrode 106 of the QWCCR structure 100. Enhancing the electric field at a concentrator of the electrode 106 of the QWCCR structure 100 can result in an increase in plasma corona excitation (for example, an increase in dielectric breakdown near the concentrator), when the QWCCR structure 100 is excited with sufficiently high RF power/current. To increase electric field at a concentrator of the electrode 106 of the QWCCR structure 100, a radius of the concentrator can be minimized (for example, configured as a very sharp structure, such as a tip). Additionally or alternatively, to increase the electric field at a tip of the QWCCR structure 100 (for example, thereby increasing the intensity and/or size of an excited plasma corona), the intrinsic impedance (η) of the dielectric 108 can be increased, the power used to excite the QWCCR structure 100 can be increased, and the total quality factor of the QWCCR structure 100 ($Q_{QWCCR}$) can be increased (for example, by increasing the volume energy storage (U) of the cavity or by minimizing the surface and radiation losses).

Further, the shunt capacitance (C) of a circular coaxial cavity (for example, in farads/meter, and neglecting fringing fields) can be expressed as follows:

$$C = \frac{2\pi\varepsilon_0\varepsilon_r}{\ln\left(\frac{b}{a}\right)}$$

where $\varepsilon_0$ represents the permittivity of free space, $\varepsilon_r$ represents the relative dielectric constant of the dielectric 108 between the inner conductor 104 and the outer conductor 102, b is the inner radius of the outer conductor 102, and a is the radius of the inner conductor 104 (as illustrated in FIG. 1D).

Similarly, the shunt inductance (L) of a circular coaxial cavity (for example, in henrys/meter) can be expressed as follows:

$$L = \frac{\mu_0\mu_r}{2\pi}\ln\left(\frac{b}{a}\right)$$

where $\mu_0$ represents the permeability of free space, $\mu_r$ represents the relative permeability of the dielectric 108 between the inner conductor 104 and the outer conductor 102, b is the inner radius of the outer conductor 102, and a is the radius of the inner conductor 104 (as illustrated in FIG. 1D).

Based on the above, the complex impedance (Z) of a circular coaxial cavity (for example, in ohms, Ω) can be expressed as follows:

$$Z = \sqrt{\frac{R + j\omega L}{G + j\omega C}}$$

where G represents the conductance per unit length of the dielectric between the inner conductor and the outer conductor, R represents the resistance per unit length of the QWCCR structure 100, j represents the imaginary unit (for example, $\sqrt{-1}$), ω represents the frequency at which the QWCCR structure 100 is being excited, L represents the shunt inductance of the QWCCR structure 100, and C represents the shunt capacitance of the QWCCR structure 100.

At very high frequencies (for example, GHz frequencies) the complex impedance (Z) can be approximated by:

$$Z_0 = \sqrt{\frac{L}{C}}$$

where $Z_0$ represents the characteristic impedance of the QWCCR structure 100 (in other words, the complex impedance (Z) of the QWCCR structure 100 at high frequencies).

As described above, the shunt inductance (L) and the shunt capacitance (C) of the QWCCR structure 100 depend on the relative permeability ($\mu_r$) and the relative dielectric constant ($\varepsilon_r$), respectively, of the dielectric 108 between the inner conductor 104 and the outer conductor 102. Thus, any modification to either the relative permeability ($\mu_r$) or the relative dielectric constant ($\varepsilon_r$) of the dielectric 108 between the inner conductor 104 and the outer conductor 102 can result in a modification of the characteristic impedance ($Z_0$) of the QWCCR structure 100. Such modifications to impedance can be measured using an impedance measurement device (for example, an oscilloscope, a spectrum analyzer, and/or an AC volt meter).

The above characteristic impedance ($Z_0$) represents an impedance calculated by neglecting fringing fields. In some applications and implementations, the fringing fields can be non-negligible (for example, the fringing fields can significantly impact the impedance of the QWCCR structure 100).

Further, in such implementations, the composition of the materials surrounding the QWCCR structure 100 can affect the characteristic impedance ($Z_O$) of the QWCCR structure 100. Measurements of such changes to characteristic impedance ($Z_O$) can provide information regarding the environment (for example, a combustion chamber) surrounding the QWCCR structure 100 (for example, the temperature, pressure, or atomic composition of the environment). A change in the characteristic impedance ($Z_O$) can coincide with a change in the cutoff frequency, resonant frequency, short-circuit condition, open-circuit condition, lumped-circuit model, mode distribution, etc. of the QWCCR structure 100.

Figure 1G:
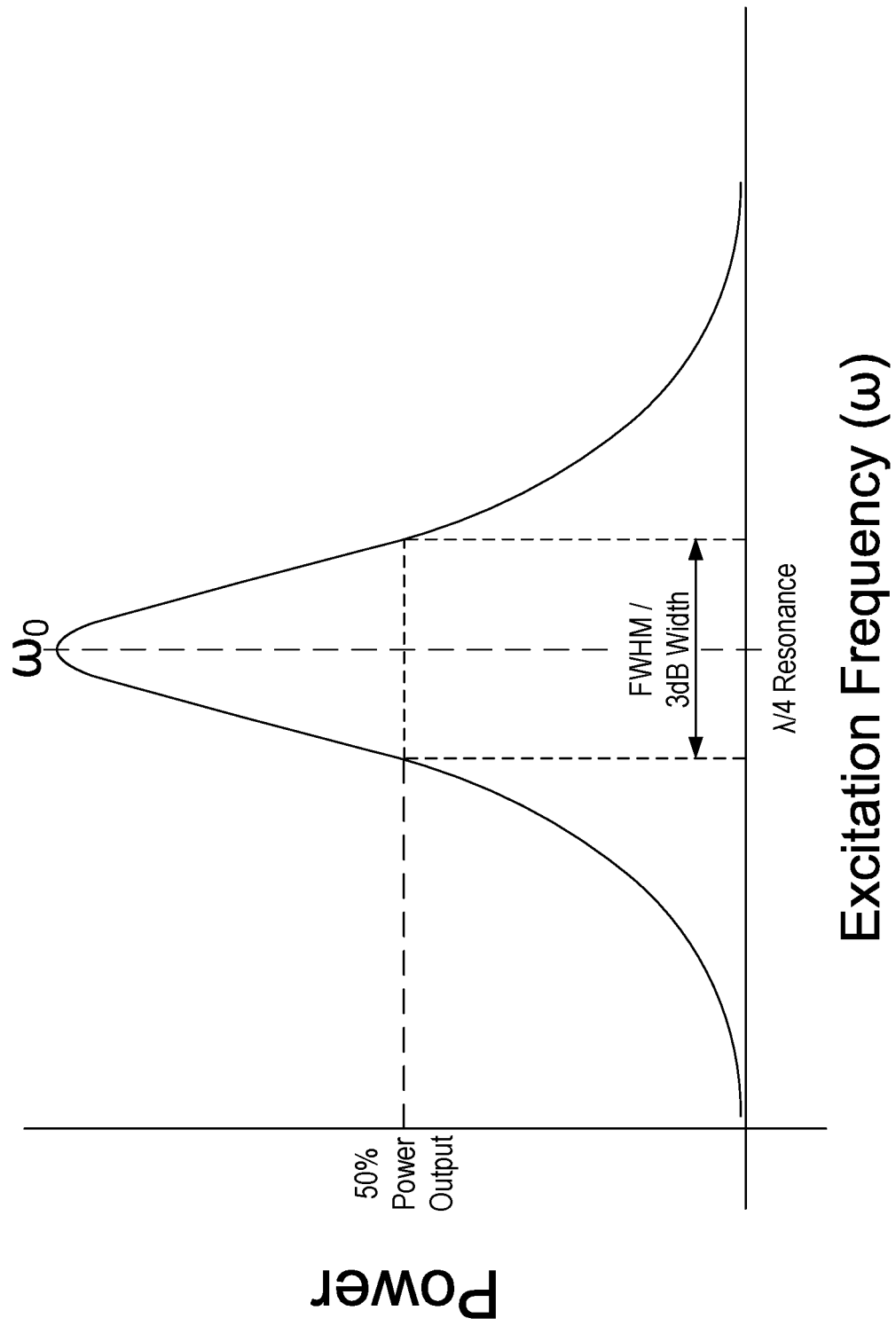
FIG. 1G is a plot of a quarter-wave resonance condition of a QWCCR structure, according to example implementations.

FIG. 1G illustrates a quarter-wave resonance condition of the QWCCR structure 100. The y-axis of the plot corresponds to a power of electromagnetic waves radiated from a distal end of the QWCCR structure 100 and the x-axis corresponds to an excitation frequency ($\omega$) (for example, from a radio-frequency power source that is electromagnetically coupled to the QWCCR structure 100) used to excite the QWCCR structure 100. As illustrated, the shape of the curve can be a Lorentzian.

As illustrated in FIG. 1G, the curve has a maximum power at a quarter-wave ($\lambda/4$) resonance. This resonance can correspond to excitation frequency ($\omega$) that has an associated excitation wavelength that is four times the length of the QWCCR structure 100. In other words, at the resonant frequency ($\omega_0$) the QWCCR structure 100 is being excited by a standing wave, where one-quarter of the length of the standing wave is equal to the length of the QWCCR structure 100. Although not illustrated, it is understood that the QWCCR structure 100 could experience additional resonances (for example, at odd-integer multiples of the resonant wavelength: $3/4\lambda_0$, $5/4\lambda_0$, $7/4\lambda_0$, $9/4\lambda_0$, $11/4\lambda_0$, $13/4\lambda_0$, etc.). Each of the additional resonances could look similar to the resonance illustrated in FIG. 1G (for example, could have a Lorentzian shape).

As illustrated, the power of the electromagnetic waves radiated from the distal end of the QWCCR structure 100 decreases exponentially the further the excitation frequency ($\omega$) is from the resonant frequency ($\omega_0$). However, the power of the electromagnetic waves is not necessarily zero as soon as you move away from resonance. Hence, it is understood that even when excited near the quarter-wave resonance condition (in other words, proximate to the quarter-wave resonance condition), rather than exactly at the resonance condition, the QWCCR structure 100 can still radiate electromagnetic waves with non-zero power and/or provide a plasma corona, depending on arrangement.

When the QWCCR structure 100 is being excited such that it provides a plasma corona proximate to the distal end (for example, at the electrode 106), a plot with a shape similar to that of FIG. 1G could be provided. In such a scenario, a plot of voltage at the electrode 106 versus excitation frequency ($\omega$) could include a Gaussian shape, rather than a Lorentzian shape. In other words, the voltage at the electrode 106 may reach a peak when excited by a resonant frequency. The voltage at the electrode 106 may fall off exponentially according to a Gaussian shape as the excitation frequency moves away from the resonant frequency. It will be understood that the Gaussian and Lorentzian shapes presently described may be based on one or more characteristics of the QWCCR structure 100, such as its shape, quality factor, bias conditions, or other factors.

It is understood that when the term "proximate" is used to describe a relationship between a wavelength of a signal (for example, a signal used to excite the QWCCR structure 100) and a resonant wavelength of a resonator (for example, the QWCCR structure 100), the term "proximate" can describe a difference in length. For example, if the wavelength of the signal is "proximate to an odd-integer multiple of one-quarter of the resonant wavelength," the wavelength of the signal can be equal to, within 0.001% of, within 0.01% of, within 0.1% of, within 1.0% of, within 5.0% of, within 10.0% of, within 15.0% of, within 20.0% of, and/or within 25.0% of one-quarter of the resonant wavelength. Additionally or alternatively, if the wavelength of the signal is "proximate to an odd-integer multiple of one-quarter of the resonant wavelength," the wavelength of the signal can be within 0.1 nm, within 1.0 nm, within 10.0 nm, within 0.1 micrometers, within 1.0 micrometers, within 10.0 micrometers, within 0.1 millimeters, within 1.0 millimeters, and/or within 1.0 centimeters of one-quarter of the resonant wavelength, depending on context (for example, depending on the resonant wavelength). Still further, if the wavelength of the signal is "proximate to an odd-integer multiple of one-quarter of the resonant wavelength," the wavelength of the signal can be a multiple of one-quarter of the resonant wavelength that is an odd number plus or minus 0.5, an odd number plus or minus 0.1, an odd number plus or minus 0.01, an odd number plus or minus 0.001, and/or an odd number plus or minus 0.0001.

The quality factor of the QWCCR structure 100 ($Q_{QWCCR}$), described above, can be used to describe the width and/or the sharpness of the resonance (in other words, how quickly the power drops off as you excite the QWCCR structure 100 further and further from the resonance condition). For example, a square root of the quality factor can correspond to the voltage modification experienced at the electrode 106 of the QWCCR structure 100 when the QWCRR structure 100 is excited at the quarter-wave resonant condition. Additionally, the quality factor may be equal to the resonant frequency ($\omega_0$) divided by full width at half maximum (FWHM). The FWHM is equal to the width of the curve in terms of frequency between the two points on the curve where the power is equal to 50% of the maximum power, as illustrated). The 50% power maximum point can also be referred to as the −3 decibel (dB) point, because it is the point at which the maximum voltage at the distal end of the QWCCR structure 100 decreases by 3 dB (or 29.29% for voltage) and the maximum power radiated by the QWCCR structure 100 decreases by 3 dB (or 50% for power). In various implementations, the FWHM of the QWCCR structure 100 could have various values. For example, the FWHM could be between 5 MHz and 10 MHz, between 10 MHz and 20 MHz, between 20 MHz and 40 MHz, between 40 MHz and 60 MHz, between 60 MHz and 80 MHz, or between 80 MHz and 100 MHz. Other FWHM values are also possible.

Further, the quality factor of the QWCCR structure 100 ($Q_{QWCCR}$) can also take various values in various implementations. For example, the quality factor could be between 25 and 50, between 50 and 75, between 75 and 100, between 100 and 125, between 125 and 150, between 150 and 175, between 175 and 200, between 200 and 300, between 300 and 400, between 400 and 500, between 500 and 600, between 600 and 700, between 700 and 800, between 800 and 900, between 900 and 1000, or between 1000 and 1100. Other quality factor values are also possible.

It is understood that, in alternate implementations, alternate structures (for example, alternate quarter-wave structures) can be used to emit electromagnetic radiation and/or excite plasma coronas (for example, other structures that concentrate electric field at specific locations using points or tips with sufficiently small radii). For example, other quarter-wave resonant structures, such as a coaxial-cavity resonator (sometimes referred to as a "coaxial resonator"), a dielectric resonator, a crystal resonator, a ceramic resonator, a surface-acoustic-wave resonator, a yttrium-iron-garnet resonator, a rectangular-waveguide cavity resonator, a parallel-plate resonator, a gap-coupled microstrip resonator, etc. can be used to excite a plasma corona.

Further, it is understood that wherever in this disclosure the terms "resonator," "QWCCR," "QWCCR structure," and "coaxial resonator," are used, any of the structures enumerated in the preceding paragraph could be used, assuming appropriate modifications are made to a corresponding system. In addition, the terms "resonator," "QWCCR," "QWCCR structure," and "coaxial resonator" are not to be construed as inclusive or all-encompassing, but rather as examples of a particular structure that could be included in a particular implementation. Still further, when a "QWCCR structure" is described, the QWCCR structure can correspond to a coaxial resonator, a coaxial resonator with an additional base conductor, a coaxial resonator excited by a signal with a wavelength that corresponds to an odd-integer multiple of one-quarter (¼) of a length of the coaxial resonator, and other structures, in various implementations.

Additionally, whenever any "QWCCR," "QWCCR structure," "coaxial resonator," "resonator," or any of the specific resonators in this disclosure or in the claims are described as being "configured such that, when the resonator is excited by the radio-frequency power source with a signal having a wavelength proximate to an odd-integer multiple of one-quarter (¼) of the resonant wavelength, the resonator provides at least one of a plasma corona or electromagnetic waves," some or all of the following are contemplated, depending on context. First, the corresponding resonator could be configured to provide a plasma corona when excited by the radio-frequency power source with a signal having a wavelength proximate to an odd-integer multiple of one-quarter (¼) of a resonant wavelength of the resonator. Second, the corresponding resonator could be configured to provide electromagnetic waves when excited by the radio-frequency power source with a signal having a wavelength proximate to an odd-integer multiple of one-quarter (¼) of a resonant wavelength of the resonator. Third, the corresponding resonator could be configured to provide, when excited by the radio-frequency power source with a signal having a wavelength proximate to an odd-integer multiple of one-quarter (¼) of a resonant wavelength of the resonator, both a plasma corona and electromagnetic waves.

V. Example Resonator Systems

In some implementations, the coaxial resonator 201 can be used as an antenna (for example, instead of or in addition to generating a plasma corona). As an antenna, the coaxial resonator 201 can radiate electromagnetic waves. The electromagnetic waves can consequently influence charged particles. As illustrated in the system 200 of FIG. 2, such electromagnetic waves can be radiated when the coaxial resonator 201 is excited by a signal generator 202. For example, the signal generator 202 can be coupled to the coaxial resonator 201 in order to excite the coaxial resonator 201 (for example, to excite a plasma corona and to produce electromagnetic waves). Such a coupling can include inductive coupling (for example, using an induction feed loop), parallel capacitive coupling (for example, using a parallel plate capacitor), or non-parallel capacitive coupling (for example, using an electric field applied opposite a non-zero voltage conductor end). Further, the electrical distance between the signal generator 202 and the coaxial resonator 201 can be optimized (for example, minimized or adjusted based on wavelength of an RF signal) in order to minimize the amount of energy lost to heating and/or to maximize a quality factor. Further, in some implementations, the coaxial resonator 201 can radiate acoustic waves when excited (for example, at resonance). The acoustic waves produced can induce motion in nearby particles, for example.

The signal generator 202 can be a device that produces periodic waveforms (for example, using an oscillator circuit). In various implementations, the signal generator 202 can produce a sinusoidal waveform, a square waveform, a triangular waveform, a pulsed waveform, or a sawtooth waveform. Further, the signal generator 202 can produce waveforms with various frequencies (for example, frequencies between 1 Hz and 1 THz). The electromagnetic waves radiated from the coaxial resonator 201 can be based on the waveform produced by the signal generator 202. For example, if the waveforms produced by the signal generator 202 are sinusoidal waves having frequencies between 300 MHz and 300 GHz (for example, between 1 GHz and 100 GHz), the electromagnetic waves radiated by coaxial resonator 201 can be microwaves. In various implementations, the signal generator 202 can, itself, be powered by an AC power source or a DC power source.

Depending on the signal used by the signal generator 202 to excite the coaxial resonator 201, the coaxial resonator 201 can additionally excite one or more plasma coronas. For example, if a large enough voltage is used to excite the coaxial resonator 201, a plasma corona can be excited at the distal end of the electrode 106 (for example, at a concentrator of the electrode 106). In some implementations, a voltage step-up device can be electrically coupled between the signal generator 202 and the coaxial resonator 201. In such scenarios, the voltage step-up device can be operable to increase an amplitude of the AC voltage used to excite the coaxial resonator 201.

In some implementations, the signal generator 202 can include one or more of the following: an internal power supply; an oscillator (for example, an RF oscillator, a surface acoustic wave resonator, or a yttrium-iron-garnet resonator); and an amplifier. The oscillator can generate a time-varying current and/or voltage (for example, using an oscillator circuit). The internal power supply can provide power to the oscillator. In some implementations, the internal power supply can include, for example, a DC battery (for example, a marine battery, an automotive battery, an aircraft battery, etc.), an alternator, a generator, a solar cell, and/or a fuel cell. In other implementations, the internal power supply can include a rectified AC power supply (for example, an electrical connection to a wall socket passed through a rectifier). The amplifier can magnify the power that is output by the oscillator (for example, to provide sufficient power to the coaxial resonator 201 to excite plasma coronas). For example, the amplifier can multiply the current and/or the voltage output by the oscillator. Additionally, in some implementations, the signal generator 202 can include a dedicated controller that executes instructions to control the signal generator 202.

Figure 3A:
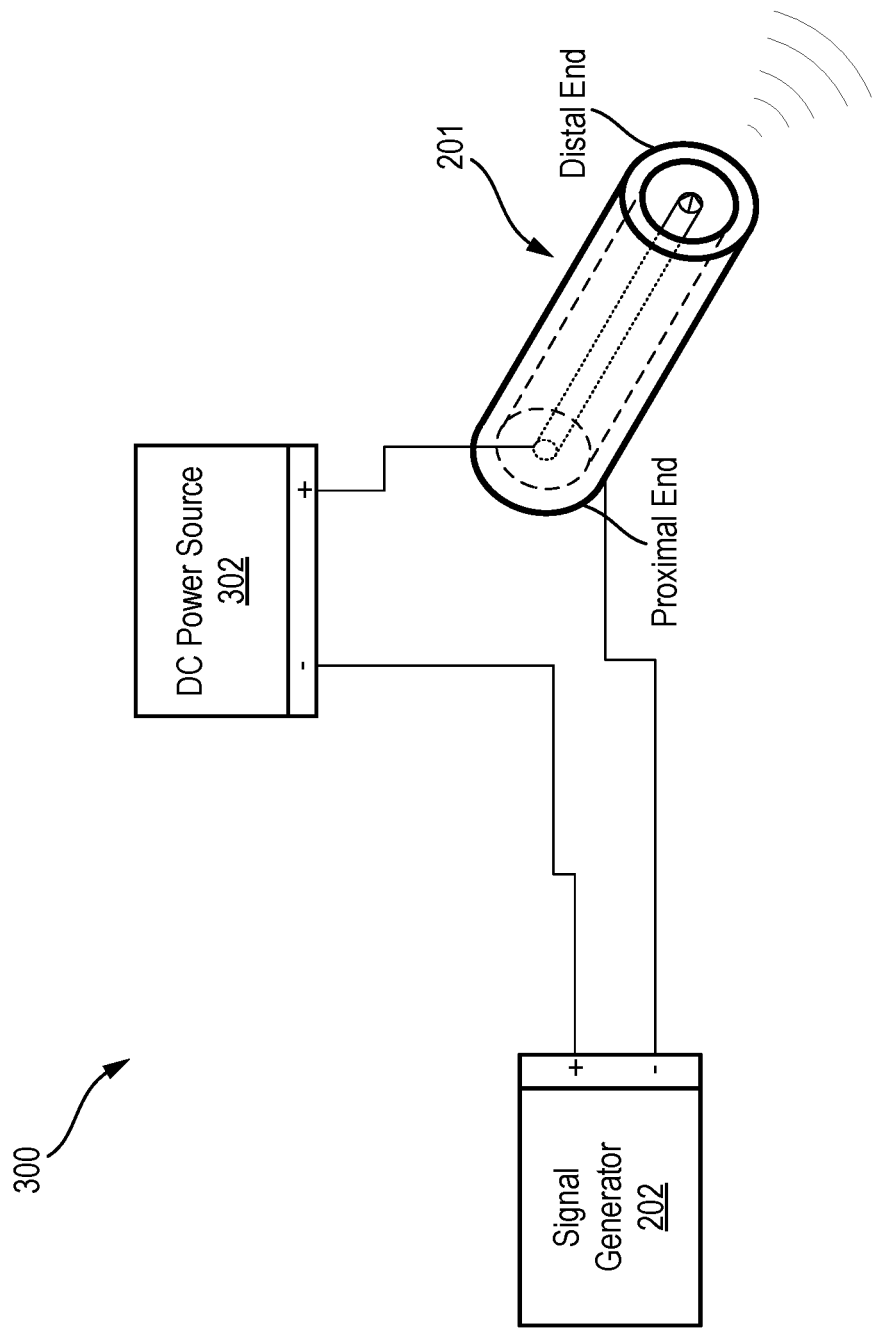
FIG. 3A illustrates a system that includes a coaxial resonator, according to example implementations.

Additionally or alternatively, as illustrated in the system 300 of FIG. 3A, the coaxial resonator 201 can be electrically coupled (for example, using a wired connection or wirelessly) to a DC power source 302. Further, in some implementations, an RF cancellation resonator (not shown) can prevent RF power (for example, from the signal generator 202) from reaching, and potentially interfering with, the DC power source 302. The RF cancellation resonator can include resistive elements, lumped-element inductors, and/or a frequency cancellation circuit.

In some implementations, the DC power source 302 can include a dedicated controller that executes instructions to control the DC power source 302. The DC power source 302 can provide a bias signal (for example, corresponding to a DC bias condition) for the coaxial resonator 201. For example, a DC voltage difference between the inner conductor 104 and the outer conductor 102 of the coaxial resonator 201 in FIG. 3A can be established by the DC power source 302 by increasing the DC voltage of the inner conductor 104 and/or decreasing the DC voltage of the outer conductor 102 (given the orientation of the positive terminal and negative terminal of the DC power source 302). In other implementations, a DC voltage difference between the inner conductor 104 and the outer conductor 102 can be established by the DC power source 302 by decreasing the DC voltage of the inner conductor 104 and/or increasing the DC voltage of the outer conductor 102 (if the orientation of the positive terminal and negative terminal of the DC power source 302 in FIG. 3A were reversed). The bias signal (for example, the voltage of the bias signal and/or the current of the bias signal) output by the DC power source 302 can be adjustable.

By providing the coaxial resonator 201 with a bias signal, an increased voltage can be presented at a concentrator of the electrode 106, thereby yielding an increased electric field at the concentrator of the electrode 106. The total electric field at the concentrator can thus be a sum of the electric field from the bias signal of the DC power source 302 and the electric field from the signal generator 202 exciting the coaxial resonator 201 at a resonance condition (for example, exciting the coaxial resonator 201 at a quarter-wave resonance condition so the electric field of the signal from the signal generator 202 reaches a maximum at the distal end of the coaxial resonator 201). Because of this increased total electric field, an excitation of a plasma corona near the concentrator can be more probable.

As an alternative, rather than using a bias signal, the signal generator 202 can simply excite the coaxial resonator 201 using a higher voltage. However, this might use considerably more power than providing a bias signal and augmenting that bias signal with an AC voltage oscillation.

In some implementations, the DC power source 302 can be switchable (for example, can generate the bias signal when switched on and not generate the bias signal when switched off). As such, the DC power source 302 can be switched on when a plasma corona output is desired from coaxial resonator 201 and can be switched off when a plasma corona output is not desired from coaxial resonator 201. For example, the DC power source 302 can be switched on during an ignition sequence (for example, a sequence where fuel is being ignited within a combustion chamber to begin combustion), but switched off during a reforming sequence (for example, a sequence in which electromagnetic radiation is being used to chemically modify fuel). Further, in some implementations, the electric field at the concentrator of the electrode 106 used to initiate the plasma corona can be larger than the electric field at the concentrator used to sustain the plasma corona. Hence, in some implementations, the DC power source 302 can be switched on in order to excite the plasma corona, but switched off while the plasma corona is maintained by the signal from the signal generator 202.

Figure 2:
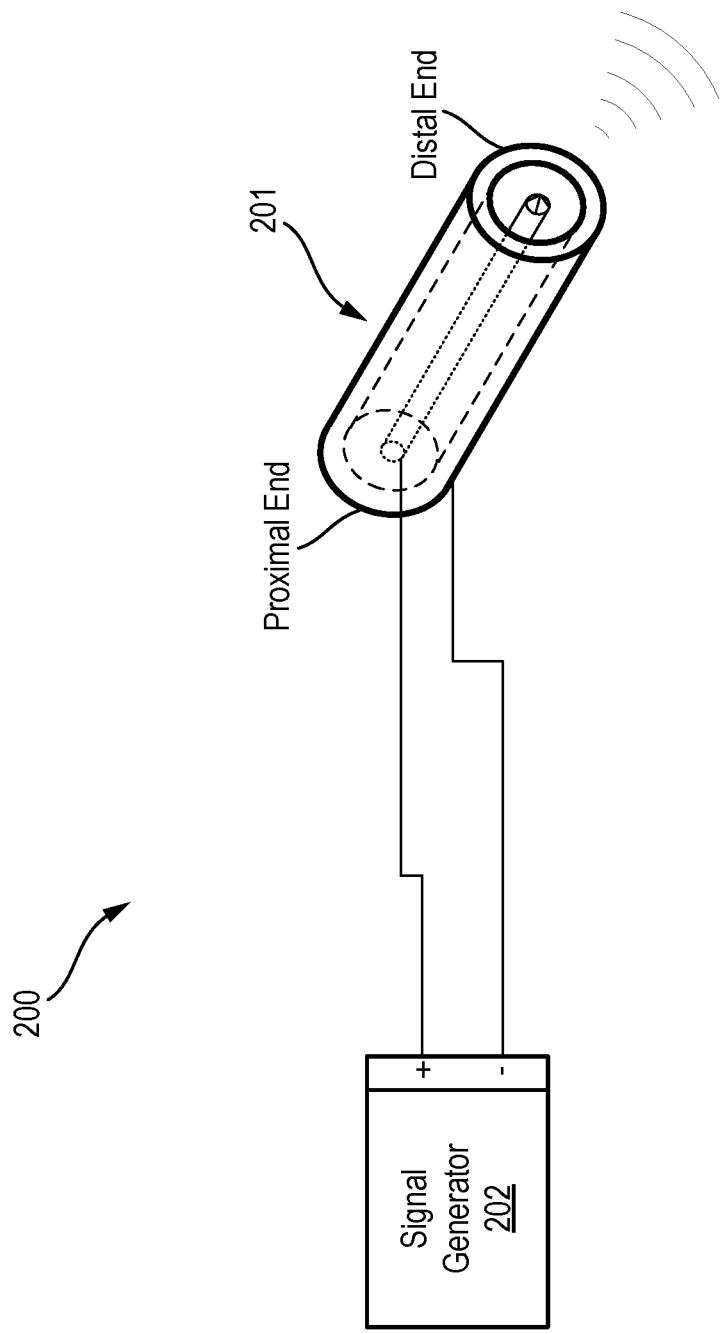
FIG. 2 illustrates a system that includes a coaxial resonator, according to example implementations.

In alternate implementations, the system 200 of FIG. 2 and/or the system 300 of FIG. 3A can include a plurality of coaxial resonators 201. If the system 200 of FIG. 2 includes a plurality of coaxial resonators 201, the plurality of coaxial resonators 201 can each be electrically coupled to the same signal generator (for example, such that each of the plurality of coaxial resonators 201 is excited by the same signal), can each be electrically coupled to a respective signal generator (for example, such that each of the plurality of coaxial resonators 201 is independently excited, thereby allowing for unique excitation frequency, power, etc. for each of the plurality of coaxial resonators 201), or one set of the plurality of coaxial resonators 201 can be connected to a common signal generator and another set of the plurality of coaxial resonators 201 can be connected to one or more other signal generators, which could be similar or different from signal generator 202. In implementations of the system 300 that include a plurality of coaxial resonators 201, each of the coaxial resonators 201 can be attached to a respective DC power source (for example, multiple instances of DC power source 302) and a common signal generator (for example, such that a bias signal can be independently switchable and/or adjustable for each coaxial resonator 201, while maintaining a common excitation waveform across all coaxial resonators 201 in the system 300), different signal generators and a common DC power source (for example, such that a bias signal can be jointly switchable across all coaxial resonators 201 in the system 300, while maintaining an independent excitation waveform for each coaxial resonator 201), or different DC power sources and different signal generators (for example, such that the bias signal is independently switchable for each coaxial resonator 201, while maintaining an independent excitation waveform for each coaxial resonator 201).

Figure 3B:
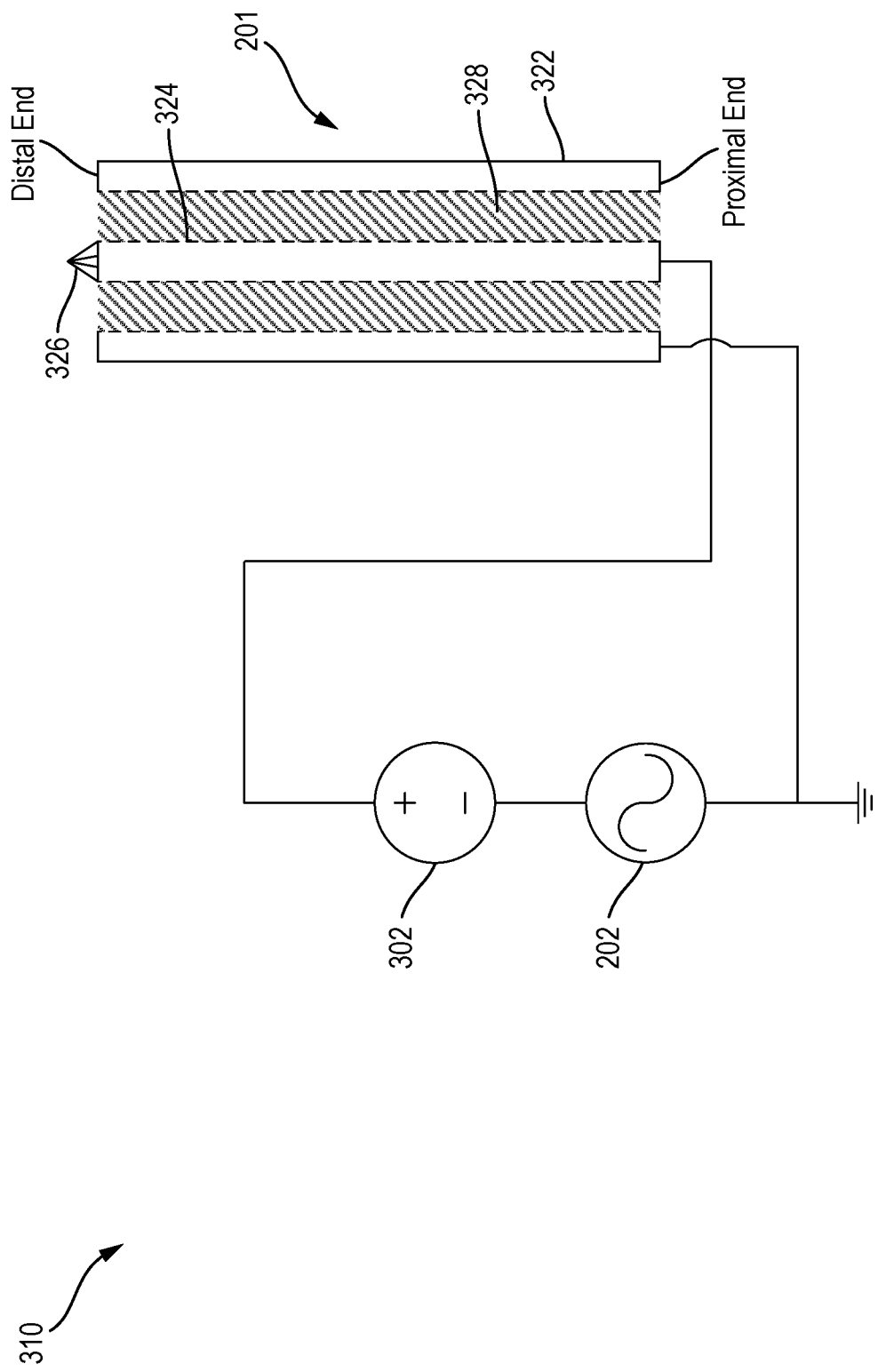
FIG. 3B illustrates a system that includes a coaxial resonator, according to example implementations.

FIG. 3B illustrates a circuit diagram of the system 300 of FIG. 3A, which includes the signal generator 202, the DC power source 302, and the coaxial resonator 201 (illustrated in vertical cross-section). As illustrated, similar to the QWCCR structure 100, the coaxial resonator 201 includes an outer conductor 322, an inner conductor 324 (including an electrode 326), and a dielectric 328. In addition, when the DC power source 302 is switched off, the circuit illustrated in FIG. 3B may not be an open-circuit. Instead, the signal generator 202 can simply be shorted to the inner conductor 324 when the DC power source 302 is switched off. As illustrated, the outer conductor 322 can be electrically coupled to ground. Further, the signal generator 202 and the DC power source 302 can be connected in series, with their negative terminals connected to ground. The positive terminals of the signal generator 202 and the DC power source 302 can be electrically coupled to the inner conductor 324. Consequently, the electrode 326 can also be electrically coupled to the positive terminals through an electrical coupling between the inner conductor 324 and the electrode 326.

In alternate implementations, the negative terminals of the signal generator 202 and the DC power source 302 can instead be connected to the inner conductor 324 and the positive terminals can be connected to the outer conductor 322. In this way, the signal generator 202 and the DC power source 302 can instead apply a negative voltage (relative to ground) to the electrode 326 and/or inner conductor 324, rather than a positive voltage (relative to ground). Further, in some implementations, the negative terminals of the DC power source 302 and the signal generator 202 and/or the inner conductor 324 might not be grounded.

As stated above, the DC power source 302 can be switchable. In this way a positive bias signal or a negative bias signal can be selectively applied to the inner conductor 324 and/or the electrode 326 relative to the outer conductor 322. When the DC power source 302 is switched on, a bias condition can be present, and when the DC power source 302 is switched off, a bias condition might not be present. A bias signal provided by the DC power source 302 can increase the electric potential, and thus the electric field, at the electrode 326 (for example, at a concentrator of the electrode 106, such as a tip, edge, or blade). By increasing the electric field at the electrode 326, dielectric breakdown and potentially plasma excitation can be more prevalent. Thus, by switching on the DC power source 302, the amount of plasma excited at a plasma corona can be enhanced.

In some implementations, the voltage of the DC power source 302 can range from +1 kV to +100 kV. Alternatively, the voltage of the DC power source 302 can range from −1 kV to −100 kV. Even further, the voltage of the DC power source 302 can be adjustable in some implementations. Furthermore, the voltage of the DC power source 302 can be pulsed, ramped, etc. For example, the voltage can be adjusted by a controller connected to the DC power source 302. In such implementations, the voltage of the DC power source 302 can be adjusted by the controller according to sensor data (for example, sensor data corresponding to temperature, pressure, fuel composition, etc.).

Figure 4A:
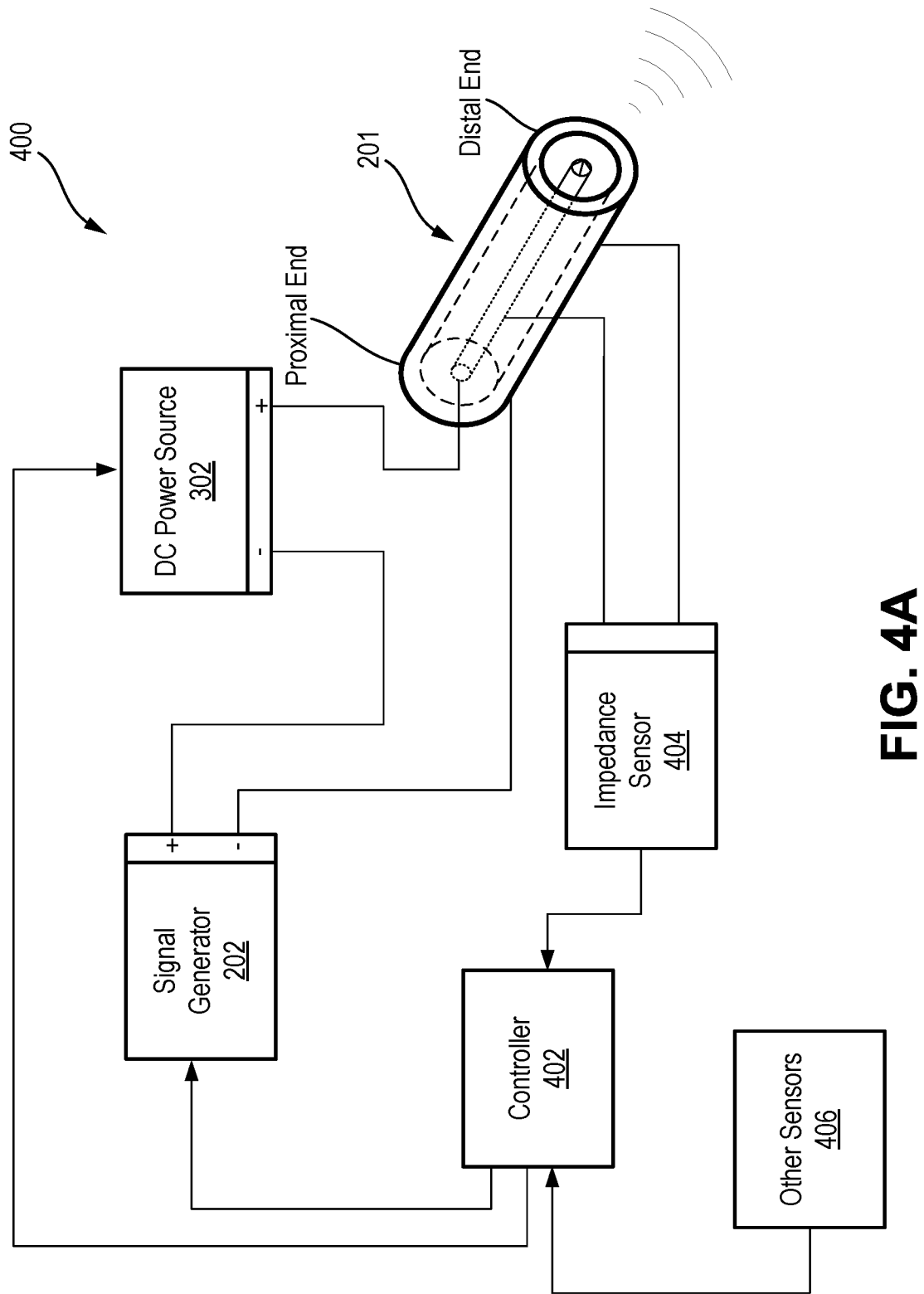
FIG. 4A illustrates a system that includes a coaxial resonator, according to example implementations.

As illustrated in FIG. 4A, an example system 400 can include a controller 402. In various implementations, the controller 402 can include a variety of components. For example, the controller 402 can include a desktop computing device, a laptop computing device, a server computing device (for example, a cloud server), a mobile computing device, a microcontroller (for example, embedded within a control system of a power-generation turbine, an automobile, or an aircraft), and/or a microprocessor. As illustrated, the controller 402 can be communicatively coupled to the signal generator 202, the DC power source 302, an impedance sensor 404, and one or more other sensors 406. Through the communicative couplings, the controller 402 can receive signals/data from various components of the system 400 and control/provide data to various components of the system 400. For example, the controller 402 can switch the DC power source 302 in order to provide a time-modulated bias signal to the coaxial resonator 201 (for example, during an ignition sequence within a combustion chamber adjacent to, coupled to, or surrounding the coaxial resonator 201).

Further, a "communicative coupling," as presently disclosed, is understood to cover a broad variety of connections between components, based on context. "Communicative couplings" can include direct and/or indirect couplings between components in various implementations. In some implementations, for example, a "communicative coupling" can include an electrical coupling between two (or more) components (for example, a physical connection between the two (or more) components that allows for electrical interaction, such as a direct wired connection used to read a sensor value from a sensor). Additionally or alternatively, a "communicative coupling" can include an electromagnetic coupling between two (or more) components (for example, a connection between the two (or more) components that allows for electromagnetic interaction, such as a wireless interaction based on optical coupling, inductive coupling, capacitive coupling, or coupling though evanescent electric and/or magnetic fields). In addition, a "communicative coupling" can include a connection (for example, over the public internet) in which one or more of the coupled components can transmit signals/data to and/or receive signals/data from one or more of the other coupled components. In various implementations, the "communicative coupling" can be unidirectional (in other words, one component sends signals and another component receives the signals) or bidirectional (in other words, both components send and receive signals). Other directionality combinations are also possible for communicative couplings involving more than two components. One example of a communicative coupling could be the controller 402 communicatively coupled to the coaxial resonator 201, where the controller 402 reads a voltage and/or current value from the resonator directly. Another example of a communicative coupling could be the controller 402 communicating with a remote server over the public Internet to access a look-up table. Additional communicative couplings are also contemplated in the present disclosure.

In some implementations, the controller 402 can control one or more settings of the signal generator 202 (for example, waveform shape, output frequency, output power amplitude, output current amplitude, or output voltage amplitude) or the DC power source 302 (for example, switching on or off or adjusting the level of the bias signal). For example, the controller 402 can control the bias signal of the DC power source 302 (for example, a voltage of the bias signal) based on a calculated voltage used to excite a plasma corona (for example, based on conditions within a combustion chamber). The calculated voltage can account for the voltage amplitude being output by the signal generator 202, in some implementations. The calculated voltage can ensure, for example, that the bias signal has a small effect on any standing electromagnetic wave formed within the coaxial resonator 201 based on an output of the signal generator 202.

The controller 402 can be located nearby the signal generator 202, the DC power source 302, the impedance sensor 404, and/or the one or more other sensors 406. For example, the controller 402 may be connected by a wire connection to the signal generator 202, the DC power source 302, the impedance sensor 404, and/or the one or more other sensors 406. Alternatively, the controller 402 can be remotely located relative to the signal generator 202, the DC power source 302, the impedance sensor 404, and/or the one or more other sensors 406. For example, the controller 402 can communicate with the signal generator 202, the DC power source 302, the impedance sensor 404, and/or the one or more other sensors 406 over BLUETOOTH®, over BLUETOOTH LOW ENERGY (BLE)®, over the public Internet, over WIFI® (IEEE 802.11 standards), over a wireless wide area network (WWAN), etc.

In some implementations, the controller 402 can be communicatively coupled to fewer components within the system 400 (for example, only communicatively coupled to the DC power source 302). Further, in implementations that include fewer components than illustrated in the system 400 (for example, in implementations, having only the coaxial resonator 201, the signal generator 202, and the controller 402), the controller 402 can interact with fewer components of the system 400. For instance, the controller can interact only with the signal generator 202.

The impedance sensor 404 can be connected to the coaxial resonator 201 (for example, one lead to the inner conductor 324 of the coaxial resonator 201 and one lead to the outer conductor 322 of the coaxial resonator 201) to measure an impedance of the coaxial resonator 201. In some implementations, the impedance sensor 404 can include an oscilloscope, a spectrum analyzer, and/or an AC volt meter. The impedance measured by the impedance sensor 404 can be transmitted to the controller 402 (for example, as a digital signal or an analog signal). In some implementations, the impedance sensor 404 can be integrated with the controller 402 or connected to the controller 402 through a printed circuit board (PCB) or other mechanism. The impedance data can be used by the controller 402 to perform calculations and to adjust control of the signal generator 202 and/or the DC power source 302.

Similarly, the other sensors 406 can also transmit data to the controller 402. Analogous to the impedance sensor 404, in some implementations, the other sensors 406 can be integrated with the controller 402 or connected to the controller 402 through a PCB or other mechanism. The other sensors 406 can include a variety of sensors, such as one or more of: a fuel gauge, a tachometer (for example, to measure revolutions per minute (RPM)), an altimeter, a barometer, a thermometer, a sensor that measures fuel composition, a gas chromatograph, a sensor measuring fuel-to-air ratio in a given fuel/air mixture, an anemometer, a torque sensor, a vibrometer, an accelerometer, or a load cell.

In some implementations, the controller 402 can be powered by the DC power source 302. In other implementations, the controller 402 can be independently powered by a separate DC power source or an AC power source (for example, rectified within the controller 402).

Figure 4B:
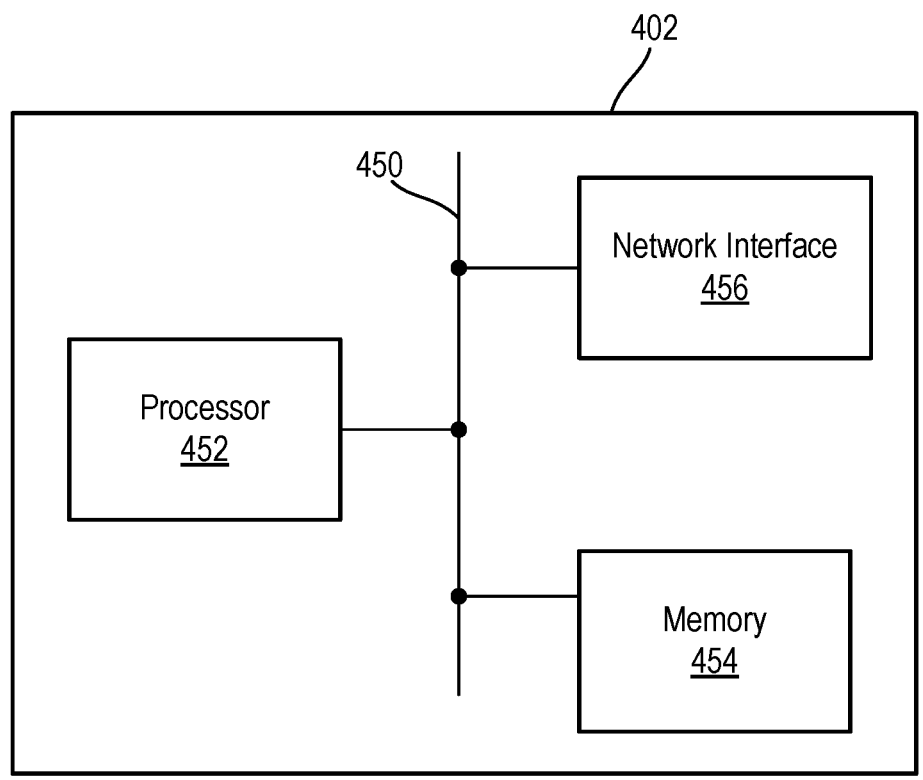
FIG. 4B illustrates a controller, according to example implementations.

As an example, a possible implementation of the controller 402 is illustrated in FIG. 4B. As illustrated, the controller 402 can include a processor 452, a memory 454, and a network interface 456. The processor 452, the memory 454, and the network interface 456 can be communicatively coupled over a system bus 450. The system bus 450, in some implementations, can be defined within a PCB.

The processor 452 can include one or more central processing units (CPUs), such as one or more general purpose processors and/or one or more dedicated processors (for example, application-specific integrated circuits (ASICs), digital signal processors (DSPs), or network processors). The processor 452 can be configured to execute instructions (for example, instructions stored within the memory 454) to perform various actions. Rather than a processor 452, some implementations can include hardware logic (for example, one or more resistor-inductor-capacitor (RLC) circuits, flip-flops, latches, etc.) that performs actions (for example, based on the inputs from the impedance sensor 404 or the other sensors 406).

The memory 454 can store instructions that are executable by the processor 452 to carry out the various methods, processes, or operations presently disclosed. Alternatively, the method, processes, or operations can be defined by hardware, firmware, or any combination of hardware, firmware, or software. Further, the memory 454 can store data related to the signal generator 202 (for example, control signals), the DC power source 302 (for example, switching signals), the impedance sensor 404 (for example, look-up tables related to changes in impedance and/or a characteristic impedance of the coaxial resonator 201 based on certain environmental factors), and/or the other sensors 406 (for example, a look-up table of typical wind speeds based on elevation).

The memory 454 can include non-volatile memory. For example, the memory 454 can include a read-only memory (ROM), electrically erasable programmable read-only memory (EEPROM), a hard drive (for example, hard disk), and/or a solid-state drive (SSD). Additionally or alternatively, the memory 454 can include volatile memory. For example, the memory 454 can include a random-access memory (RAM), flash memory, dynamic random-access memory (DRAM), and/or static random-access memory (SRAM). In some implementations, the memory 454 can be partially or wholly integrated with the processor 452.

The network interface 456 can enable the controller 402 to communicate with the other components of the system 400 and/or with outside computing device(s). The network interface 456 can include one or more ports (for example, serial ports) and/or an independent network interface controller (for example, an Ethernet controller). In some implementations, the network interface 456 can be communicatively coupled to the impedance sensor 404 or one or more of the other sensors 406. Additionally or alternatively, the network interface 456 can be communicatively coupled to the signal generator 202, the DC power source 302, or an outside computing device (for example, a user device). Communicative couplings between the network interface 456 and other components can be wireless (for example, over WIFI®, BLUETOOTH®, BLUETOOTH LOW ENERGY (BLE)®, or a WWAN) or wireline (for example, over token ring, t-carrier connection, Ethernet, a trace in a PCB, or a wire connection).

In some implementations, the controller 402 can also include a user-input device (not shown). For example, the user-input device can include a keyboard, a mouse, a touch screen, etc. Further, in some implementations, the controller 402 can include a display or other user-feedback device (for example, one or more status lights, a speaker, a printer, etc.) (not shown). That status of the controller 402 can alternatively be provided to a user device through the network interface 456. For example, a user device such as a personal computer or a mobile computing device can communicate with the controller 402 through the network interface 456 to retrieve the values of one or more of the other sensors 406 (for example, to be displayed on a display of the user device).

VI. Resonators with Fuel Injection

Figure 5:
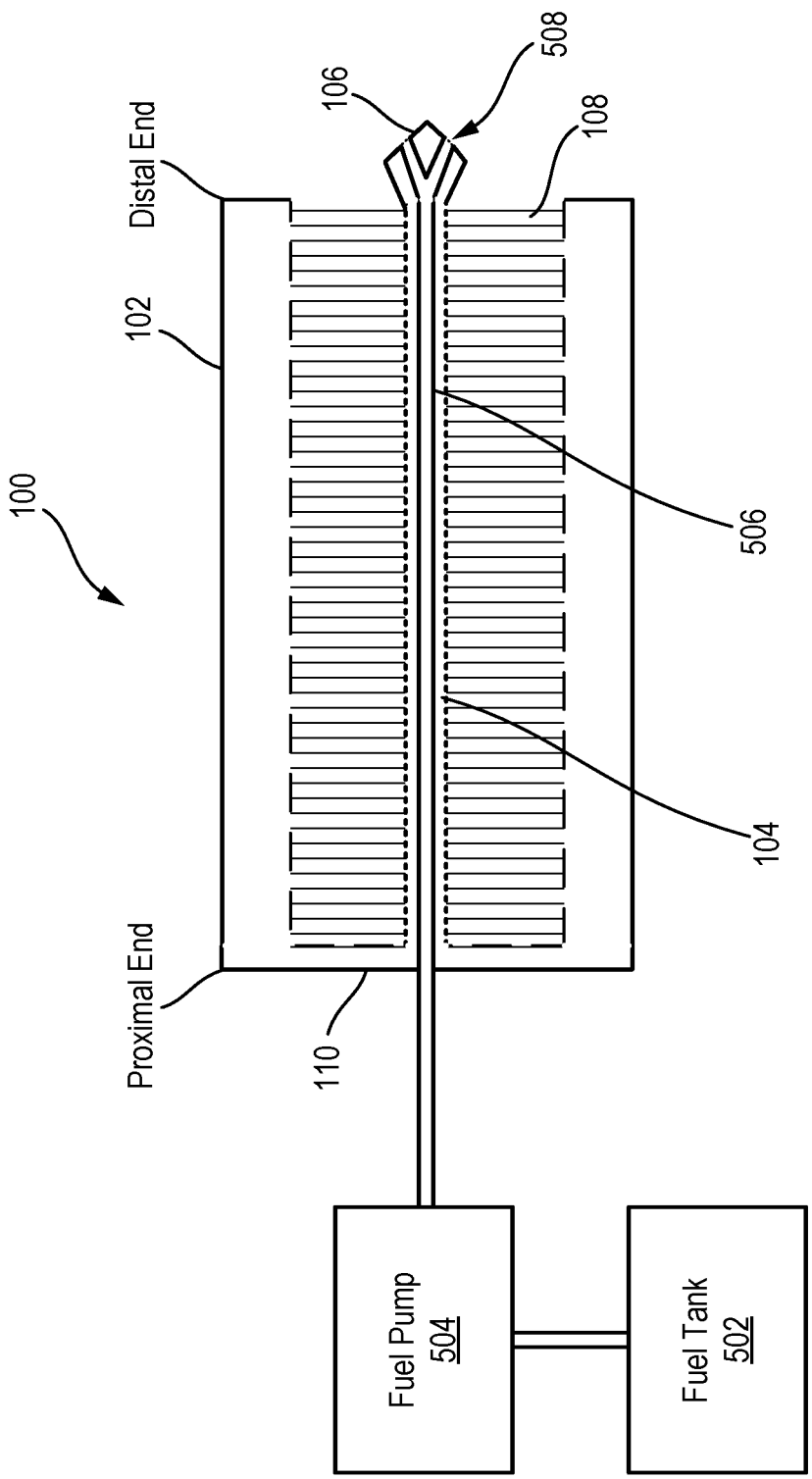
FIG. 5 illustrates a cutaway side view of a QWCCR structure connected to a fuel pump and a fuel tank, according to example implementations.

As illustrated in FIG. 5, in some implementations, the QWCCR structure 100 (or the coaxial resonator 201) can be attached to a fuel tank 502. The fuel tank 502 can provide a fuel source for a combustion chamber or other environment, for example. The fuel tank 502 can contain or be connected to a fuel pump 504 through a fuel-supply line (for example, a hose or a pipe). The fuel pump 504 can transfer fuel from the fuel tank 502 into the fuel-supply line and propel the fuel through a fuel conduit 506 defined by or disposed within the inner conductor 104 of the QWCCR structure 100. For example, the fuel pump 504 can include a mechanical pump (for example, gear pump, rotary vane pump, diaphragm pump, screw pump, peristaltic pump) or an electrical pump. In some implementations, the fuel tank 502 can include various sensors (for example, a pressure sensor, a temperature sensor, or a fuel-level sensor). Such sensors can be electrically connected to the controller 402 in order to provide data regarding the status of the fuel tank 502 to the controller 402, for example. Additionally or alternatively, the fuel pump 504 can be connected to the controller 402. Through such a connection, the controller 402 could control the fuel pump 504 (for example, to switch the fuel pump on and off, set a fuel injection rate, etc.).

In some implementations, the fuel conduit 506 can inject fuel (for example, into a combustion chamber) at one or more outlets 508 defined within the electrode 106 (for example, within a concentrator of the electrode 106). By conveying fuel through the fuel conduit 506 and out one or more outlets 508, fuel can be introduced proximate to a source of ignition energy (for example, proximate to a plasma corona generated near a concentrator of the electrode 106), which can allow for efficient combustion and ignition. In alternate implementations, one or more outlets can be defined with other locations of the fuel conduit 506 (for example, so as not to interfere with the electric field at the concentrator of the electrode 106).

In some implementations, the fuel conduit 506 can act, at least in part, as a Faraday cage (for example, by encapsulating the fuel within a conductor that makes up the fuel conduit 506) to prevent electromagnetic radiation in the QWCCR structure 100 from interacting with the fuel while the fuel is transiting the fuel conduit 506. In other structures, the fuel conduit 506 can allow electromagnetic radiation to interact with (for example, reform) the fuel within the fuel conduit 506.

In some implementations, the QWCCR structure 100 can include multiple fuel conduits 506 (for example, multiple fuel conduits running from the proximal end of the QWCCR structure 100 to the distal end of the QWCCR structure 100). Additionally or alternatively, one or more fuel conduits 506 can be positioned within the dielectric 108 or within the outer conductor 102. As described above, the outlet(s) 508 of the fuel conduit(s) 506 can be oriented in such as a way as to expel fuel toward concentrators (for example, tips, edges, or points) of one or more electrodes 106 (for example, toward regions where plasma coronas are likely to be excited).

VII. Additional Resonator Implementations

Figure 6:
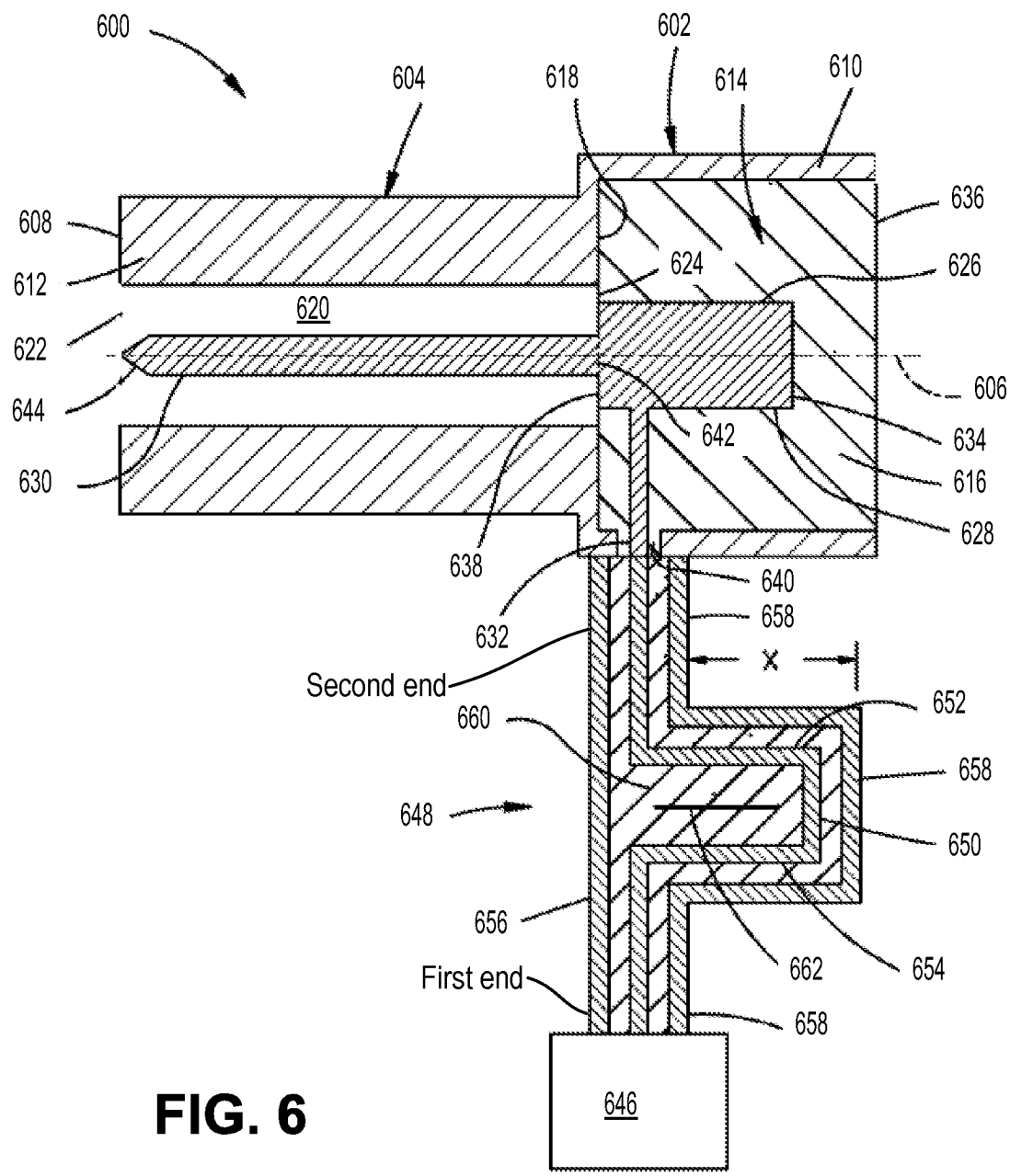
FIG. 6 illustrates a cross-sectional view of an example coaxial resonator connected to a direct-current (DC) power source through an additional resonator assembly acting as a radio-frequency (RF) attenuator, according to example implementations.

FIG. 6 illustrates a cross-sectional view of an example alternative coaxial resonator 600 connected to a DC power source through an additional resonator assembly acting as an RF attenuator, in accordance with example implementations. The coaxial resonator 600 is an assembly of two quarter-wave coaxial cavity resonators that are coupled together. More specifically, the coaxial resonator 600 includes a first resonator 602 and a second resonator 604 electrically coupled in a series arrangement along a longitudinal axis 606. In some implementations, the coaxial resonator 600 includes a DC bias condition established at a node of the voltage standing wave (for example, between quarter-wave segments). In such implementations, there may be no impedance mismatch. Because there is no impedance mismatch, the diameters of the inner conductor and the outer conductor of the first resonator 602 can be different than the diameters of the inner conductor and the outer conductor of the second resonator 604, respectively, without impacting the quality factor (Q). In such a way, the DC bias condition might not affect or interact with the AC signal coming from a signal generator.

The first resonator 602 and the second resonator 604 are defined by a common outer conductor wall structure 608. The outer conductor wall structure 608 includes a first cylindrical wall 610 and a second cylindrical wall 612 centered on the longitudinal axis 606. The first cylindrical wall 610 is constructed of a conducting material and surrounds a first cylindrical cavity 614 centered on the longitudinal axis 606. The first cylindrical cavity 614 is filled with a dielectric 616 having a relative dielectric constant approximately equal to four ($\varepsilon_r \approx 4$), for example.

In the example implementation of FIG. 6, the first resonator 602 and the second resonator 604 adjoin one another in a connection plane 618 that is perpendicular to the longitudinal axis 606. In other examples, the connection plane 618 might not be perpendicular to the longitudinal axis 606, and can instead be designed with a different configuration that maintains constant impedance between the first resonator 602 and the second resonator 604.

The second cylindrical wall 612 is constructed of a conducting material and surrounds a second cylindrical cavity 620 that is also centered on the longitudinal axis 606. The second cylindrical cavity 620 is coaxial with the first cylindrical cavity 614, but can have a greater physical length. The second cylindrical wall 612 provides the second cylindrical cavity 620 with a distal end 622 spaced along the longitudinal axis 606 from a proximal end 624 of the second cylindrical cavity 620.

A center conductor structure 626 is supported within the conductor wall structure 608 of the coaxial resonator 600 by the dielectric 616. The center conductor structure 626 includes a first center conductor 628, a second center conductor 630, and a radial conductor 632.

The first center conductor 628 reaches within the first cylindrical cavity 614 along the longitudinal axis 606. In the example implementation shown in FIG. 6, the first center conductor 628 has a proximal end 634 adjacent a proximal end 636 of the first cylindrical cavity 614, and has a distal end 638 adjacent the distal end 624 of the first cylindrical cavity 614. The radial conductor 632 projects radially from a location adjacent the distal end 638 of the first center conductor 628, across the first cylindrical cavity 614, and outward through an aperture 640.

The second center conductor 630 has a proximal end 642 at the distal end 638 of the first center conductor 628. The second center conductor 630 projects along the longitudinal axis 606 to a distal end 644 configured as an electrode tip located at or in close proximity to the distal end 622 of the second cylindrical cavity 620.

To reduce any mismatch in impedances between the first resonator 602 and the second resonator 604, the relative radial thicknesses between both the cylindrical walls 610, 612 and the respective center conductors 628, 630 are defined in relation to the relative dielectric constant of the dielectric 616 and the dielectric constant of the air or gas that fills the second cylindrical cavity 620. In the example implementation of FIG. 6, the physical length of the second center conductor 630 along the longitudinal axis 606 is approximately twice the physical length of the first center conductor 628 along the longitudinal axis 606. However, based at least in part on the dielectric 616 having a relative dielectric constant approximately equal to four, the electrical lengths of the two center conductors 628 and 630 are approximately equal.

In example implementations, any gaps between any of the center conductors 628, 630 and any outer conductor could be filled with a dielectric and/or the gap (for example, the second cylindrical cavity 620) could be large enough to reduce arcing (in other words, large enough such that the electric field is not of sufficient intensity to result in a dielectric breakdown of air or the intervening dielectric). As further shown in FIG. 6, the dielectric 616 fills the first cylindrical cavity 614 around the first center conductor 628 and the radial conductor 632.

In the illustrated example, a DC power source 646 is connected to the center conductor structure 626 through the radial conductor 632 connected adjacent to a virtual short-circuit point of the DC power source 646.

An RF control component, specifically, an RF frequency cancellation resonator assembly 648 is disposed between the radial conductor 632 and the DC power source 646 to restrict RF power from reaching the DC power source 646. The RF frequency cancellation resonator assembly 648 is an additional resonator assembly having a center conductor 650.

The center conductor 650 has a first portion 652 and a second portion 654, each of which has the same electrical length "X" illustrated in FIG. 6 (and the same electrical length as the first center conductor 628 and the second center conductor 630).

In an example implementation, the electrical length "X" depicted in FIG. 6 can be sized such that the center conductor 650 is an odd-integer multiple of half wavelengths (for example, $1/2\lambda_0$, $3/2\lambda_0$, $5/2\lambda_0$, $7/2\lambda_0$, $9/2\lambda_0$, $11/2\lambda_0$, $13/2\lambda_0$, etc.) out of phase (in other words, 180° out of phase) with the outer conducting wall 656 and the outer conducting wall 658, simultaneously, where $\lambda_0$ is the resonant wavelength, and where the resonant wavelength $\lambda_0$ is inversely related to the frequency of the RF power. In alternative implementations, a similar "folded" structure to the electrical length "X" could be located within the cylindrical cavity 614 to achieve a similar phase shift between the inner conductor and the outer conductor.

The RF frequency cancellation resonator assembly 648 also has a short outer conducting wall 656 and a long outer conducting wall 658. The short outer conducting wall 656 has first and second ends on opposite ends of the RF frequency cancellation resonator assembly 648. The long outer conducting wall 658 also has first and second ends on opposite ends of the RF frequency cancellation resonator assembly 648. The first and second ends of the short outer conducting wall 656 are each on the opposite side of the RF frequency cancellation resonator assembly 648 from the corresponding first and second ends of the long outer conducting wall 658.

In an example implementation, the difference in electrical length between the short outer conducting wall 656 and the long outer conducting wall 658 is substantially equal to the combined electrical length of the first portion 652 and the second portion 654. In this example, the combined electrical length of the first portion 652 and the second portion 654 is substantially equal to twice the electrical length of the first center conductor 628.

In an example implementation, the short outer conducting wall 656 and the long outer conducting wall 658 surround a cavity 660 filled with a dielectric. In operation, with this example implementation, electric current running along the outer conductor of the RF frequency cancellation resonator assembly 648 primarily follows the shortest path and run along the short outer conducting wall 656. Accordingly, electric current on the outer conductor of the RF frequency cancellation resonator assembly 648 travels two fewer quarter-wavelengths than current running along the center conductor 650 of the RF frequency cancellation resonator assembly 648.

In examples, the RF frequency cancellation resonator assembly 648 can also have an internal conducting ground plane 662 disposed within the cavity 660 and between the first portion 652 and the second portion 654 of the center conductor 650. Based on the geometry of the cancellation resonator assembly 648, this configuration provides a frequency cancellation circuit connected between the DC power source 646 and the radial conductor 632.

Further, in examples, the RF frequency cancellation resonator assembly 648 is configured to shift a voltage supply of RF energy 180 degrees out of phase relative to the ground plane 662 of the coaxial resonator 600 due to the difference in electrical length between the short outer conducting wall 656 and the center conductor 650 of the RF frequency cancellation resonator assembly 648.

Figure 7:
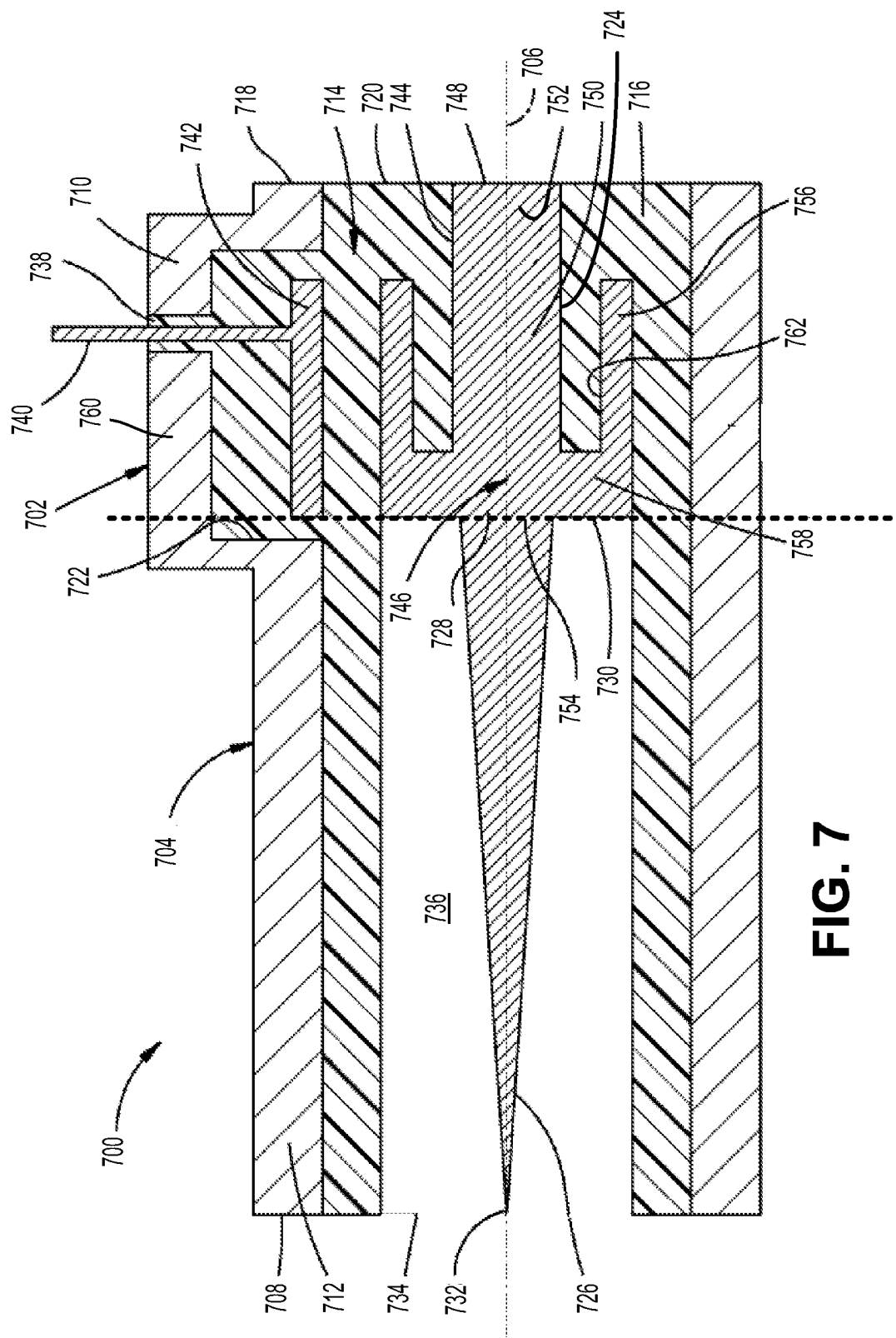
FIG. 7 illustrates a cross-sectional view of an example coaxial resonator connected to a DC power source through an additional resonator assembly acting as an RF attenuator, according to example implementations.

FIG. 7 illustrates a cross-sectional view of another example alternative coaxial resonator 700 connected to a DC power source through an additional resonator assembly acting as an RF attenuator, in accordance with an example implementation. The coaxial resonator 700 includes a first resonator portion 702 and a second resonator portion 704 electrically coupled in a series arrangement along a longitudinal axis 706.

As depicted in FIG. 7, the first resonator portion 702 and the second resonator portion 704 are defined by a common outer conductor wall structure 708. The wall structure 708 includes a first cylindrical wall portion 710 and a second cylindrical wall portion 712 centered on the longitudinal axis 706. The first cylindrical wall portion 710 is constructed of a conducting material and surrounds a first cylindrical cavity 714 centered on the longitudinal axis 706. In this example implementation, the first cylindrical cavity 714 is filled with a dielectric 716.

An annular edge 718 of the first cylindrical wall portion 710 defines a proximal end 720 of the first cylindrical cavity 714. A proximal end of the second cylindrical wall portion 712 adjoins a distal end 722 of the first cylindrical cavity 714.

The coaxial resonator 700 further includes a first center conductor portion 724 and a second center conductor portion 726 (the center conductor portions 724, 726 represented by the densest cross-hatching in FIG. 7). For illustration, the first center conductor portion 724 and the second center conductor portion 726 are separated by the vertical dashed line in FIG. 7. In some implementations, both the first center conductor portion 724 and the second center conductor portion 726 can correspond to an odd-integer multiple of quarter wavelengths based on the frequency of an RF power source used to excite the coaxial resonator 700. The second center conductor portion 726 has a proximal end 728 adjoining a distal end 730 of the first center conductor portion 724. The second center conductor portion 726 projects along the longitudinal axis 706 to a distal end configured as a concentrator 732 (for example, a tip) of an electrode located at or in close proximity to a distal end 734 of a second cylindrical cavity 736.

The coaxial resonator 700 has an aperture 738 that reaches radially outward through the first cylindrical wall portion 710. A radial conductor 740 extends out through the aperture 738 from the longitudinal axis 706 to be connected to an RF power source (for example, the signal generator 202) by an RF power input line. The end of the radial conductor 740 that is closer to the longitudinal axis 706 connects to a parallel plate capacitor 742 that is in a coupling arrangement to a center conductor structure 744. The parallel plate capacitor 742 is also in a coupling arrangement to an inline folded RF attenuator 746. The spacing between the parallel plate capacitor 742 and the center conductor structure 744 can depend on the materials used for fabrication (for example, the materials used to fabricate the parallel plate capacitor 742, the center conductor structure 744, and/or the dielectric 716).

In an example, the DC power source 646 described above is connected to the center conductor structure 744 at a proximal end 748 of the center conductor structure 744 with a DC power input line. The inline folded RF attenuator 746 is disposed between the second resonator portion 704 and the DC power source 646 to restrict RF power from reaching the DC power source 646.

The inline folded RF attenuator 746 includes an interior center conductor portion 750 having a proximal end 752 and a distal end 754. The inline folded RF attenuator 746 also includes an exterior center conductor portion 756 and a transition center conductor portion 758 that connects or couples the interior center conductor portion 750 and the exterior center conductor portion 756.

The exterior center conductor portion 756 has a proximal end largely in the same plane as the proximal end 752, and a distal end largely in the same plane as the distal end 754. For example, in the cross-sectional illustration of FIG. 7, the plane of the proximal end 752 and the plane of the proximal end of the exterior center conductor portion 756 can be the plane of the cross-section that is illustrated. In this example implementation, the transition center conductor portion 758 is located proximal to the distal end 754. The exterior center conductor portion 756 surrounds the interior center conductor portion 750.

In this example, the exterior center conductor portion 756 resembles a cylindrical portion of conducting material surrounding the rest of the interior center conductor portion 750. The longitudinal lengths of the interior center conductor portion 750 and the exterior center conductor portion 756 are substantially equal to the longitudinal length of the parallel plate capacitor 742 with which they are in a coupling arrangement. The electrical length between the proximal end 752 to the distal end 754, for both the interior center conductor portion 750 and the exterior center conductor portion 756, is substantially equal to one quarter-wavelength. The second center conductor portion 726 and the second cylindrical wall portion 712 are both configured to have an electrical length of one quarter-wavelength.

The wall structure 708 includes a short outer conducting portion 760 which has a proximal end largely in the same plane as the proximal end 752, and a distal end largely in the same plane as the distal end 754. An outer conducting path runs from the distal end of the wall structure 708 (that is substantially coplanar with the distal end 734 of the second cylindrical cavity 736), along the short outer conducting portion 760, and stops at the proximal end 720 of the first cylindrical wall portion 710. In this example, the outer conducting path has an electrical length of two quarter-wavelengths.

An inner conducting path runs from the concentrator 732 to the proximal end 728 of the second center conductor portion 726, along the outside of the transition center conductor portion 758, then along the outside from the distal end to the proximal end of the exterior center conductor portion 756, then along an interior wall 762 of the exterior center conductor portion 756 from its proximal end to its distal end, then along the interior center conductor portion 750 from its distal end to its proximal end. In this example, the electrical length of this inner conducting path is four quarter-wavelengths, or two half wavelengths. The difference in electrical lengths between the inner conducting path and the outer conducting path is one half wavelength.

With this configuration, the inline folded RF attenuator 746 operates as a radio-frequency control component connected between the DC power source 646 and the voltage supply of RF energy. The inline folded RF attenuator 746 is configured to shift a voltage supply of RF energy 180 degrees out of phase relative to the ground plane of the coaxial resonator 700.

The particular arrangement depicted in FIG. 7 is not limiting with respect to the orientation of the inline folded RF attenuator 746. In other examples, the entire arrangement depicted in FIG. 7 can be "stretched," with the inline folded RF attenuator 746 being disposed further away from the concentrator 732 and not directly coupled to the parallel plate capacitor 742. For example, the inline folded RF attenuator 746 could be separated by one quarter-wavelength from the portion of the center conductor that would remain in direct coupling arrangement with the parallel plate capacitor 742. The coaxial resonator 700 can achieve a maximize efficiency when (i) the inline folded RF attenuator 746 is an odd-integer multiple of quarter wavelengths from the concentrator 732; and (ii) the inline folded RF attenuator 746 is an odd-integer multiple of quarter wavelengths in electrical length.

In another example, the arrangement depicted in FIG. 7 could be more compressed, with the exterior center conductor portions 756 of the inline folded RF attenuator 746 extending longitudinally as far as the parallel plate capacitor 742 and also surrounding the portion of center conductor exposed for plasma creation. This can be implemented by arranging the center conductor structure 744 in the middle so that the exterior center conductor portions 756 extends in either direction longitudinally. Any particular geometry of this arrangement can involve adjusting the various parameters of dielectrics to ensure impedance matching and full 180 degree phase cancellation.

In one example, the arrangements described with respect to FIGS. 6 and 7 and the particular combination of components that provide the RF signal to the coaxial resonators are contained in a body dimensioned approximately the size of a gap spark igniter and adapted to mate with a combustor (for example, of an internal combustion engine). As an example for illustration, a microwave amplifier could be disposed at the resonator, and the resonator could be used as the frequency determining element in an oscillator amplifier arrangement. The amplifier/oscillator could be attached at the top or back of an igniter, and could have the high voltage supply also integrated in the module with diagnostics. This example permits the use of a single, low-voltage DC power supply for feeding the module along with a timing signal.

VIII. Jet Engines

The above coaxial resonators could be usefully employed in the context of a gas turbine such as a jet turbine configured to power an aircraft. For example, a coaxial cavity resonator similar to the coaxial resonator 201 illustrated in FIG. 2 could be used in a gas turbine. While reference is made to "QWCCR," "QWCCR structure," and "coaxial resonator" elsewhere in the description, it will be understood that other types of resonators are possible and contemplated.

An example gas turbine includes a compressor coupled to a turbine through a shaft, and the gas turbine also includes a combustion chamber or area, called a combustor. In operation, atmospheric air flows through a compressor that brings the air to higher pressure. Energy is then added by spraying fuel into the air and igniting it so the combustion generates a high-temperature, high-pressure gas flow. The high-temperature, high-pressure gas enters a turbine, where it expands down to an exhaust pressure, producing a shaft work output at the shaft coupled to the turbine in the process.

The shaft work output is used to drive the compressor and other devices (for example, an electric generator) that can be coupled to the shaft. The energy that is not used for shaft work comes out in the exhaust gases that can include a high temperature and/or a high velocity. Gas turbines can be utilized to power aircraft, trains, ships, electrical generators, pumps, gas compressors, and tanks, among other machines.

Figure 8:
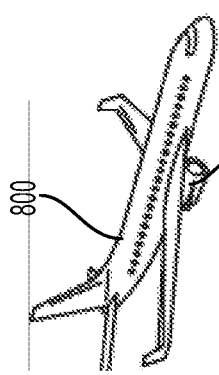
FIG. 8 illustrates an aircraft having a jet engine, according to example implementations.

FIG. 8 illustrates an aircraft 800 having a jet engine 802, according to example implementations. To help propel the aircraft 800 through the air, the aircraft 800 includes a propulsion system operable to generate thrust. The jet engine 802 is a gas turbine engine that is part of the propulsion system of the aircraft 800. The aircraft 800 can include several jet engines (for example, 2 or 4) similar to the jet engine 802 coupled to wings of the aircraft 800, for example. The jet engine 802 includes several components of a gas turbine such as the compressor, the combustor, and the turbine.

Figure 9:
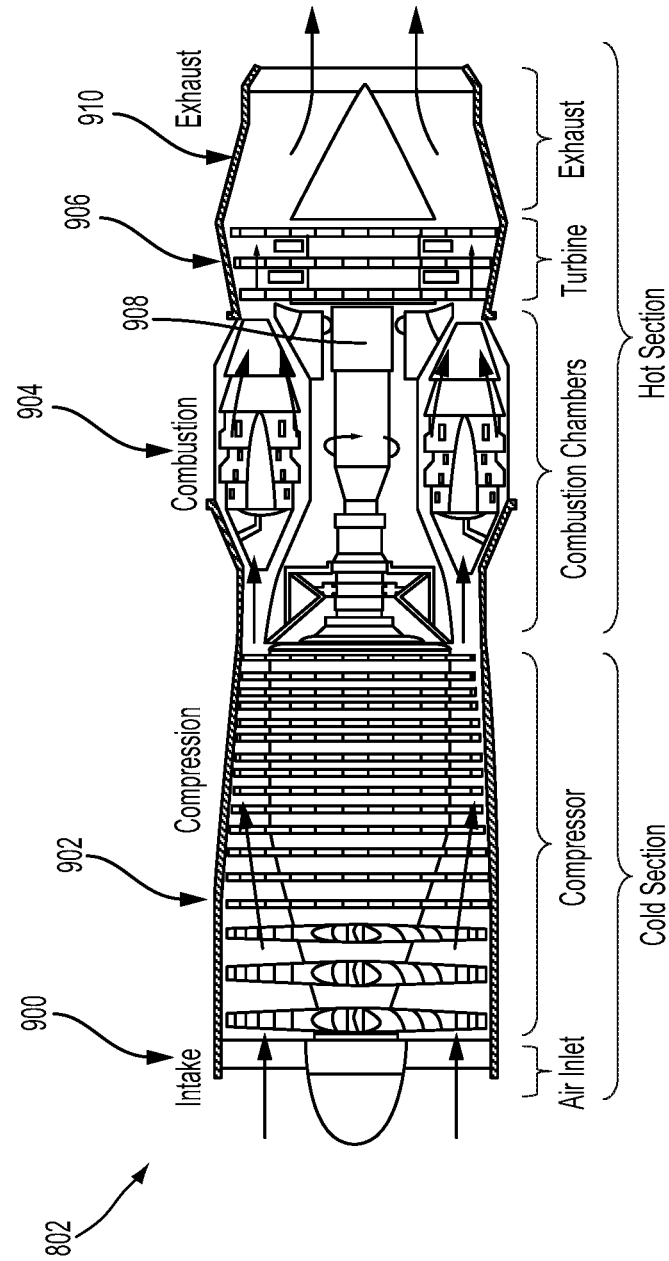
FIG. 9 illustrates a jet engine, according to example implementations.

FIG. 9 illustrates several components of the jet engine 802, according to an example implementation. As illustrated, the jet engine 802 is configured as a gas turbine engine. Large amounts of surrounding air (free stream) are continuously brought into an inlet or intake 900. At the rear of the intake 900, the air enters a compressor 902 (axial, centrifugal, or both). The compressor 902 operates as many rows of airfoils, with each row producing an increase in pressure. At the exit of the compressor 902, the air is at a much higher pressure than free stream at the intake 900.

Fuel is mixed with the compressed air exiting the compressor 902, and the fuel-compressed air mixture is burned in a combustor 904, generating a flow of hot, high pressure gas. The hot, high pressure gas exiting the combustor 904 then passes through a turbine 906, which extracts energy from the flow of gas by making turbine blades spin in the flow. The energy extracted by the turbine 906 is then used to turn the compressor 902 by coupling the compressor 902 and the turbine 906 by a central shaft 908.

The turbine 906 transforms or converts some energy of the hot gas to drive the compressor 902, but there is enough energy left over to provide thrust to the jet engine 802 by increasing velocity of the flow of gas through a nozzle 910 disposed adjacent the turbine 906. Because the exit velocity is greater than the free stream velocity, thrust is created and the aircraft 800 is propelled.

Several variations could be made to the jet engine 802. For instance, the jet engine 802 could be configured as a turbofan engine or a turboprop engine where additional components are added to the several components illustrated in FIG. 9.

The combustor 904, which can also be referred to as a burner, combustion chamber, or flame holder, comprises the area of the jet engine 802 where combustion takes place. The combustor 904 is configured to contain and maintain stable combustion despite high air flow rates. As such, in examples, the combustor 904 is configured to mix the air and fuel, ignite the air-fuel mixture, and then mix in more air to complete the combustion process.

Figure 10E:
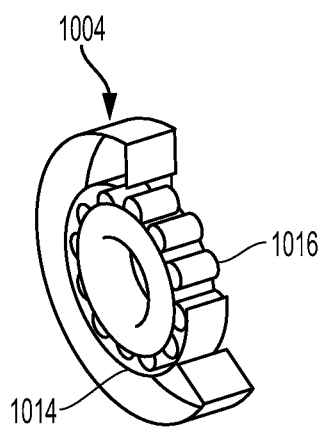
FIG. 10E illustrates a combustor, according to example implementations.
Figure 10F:
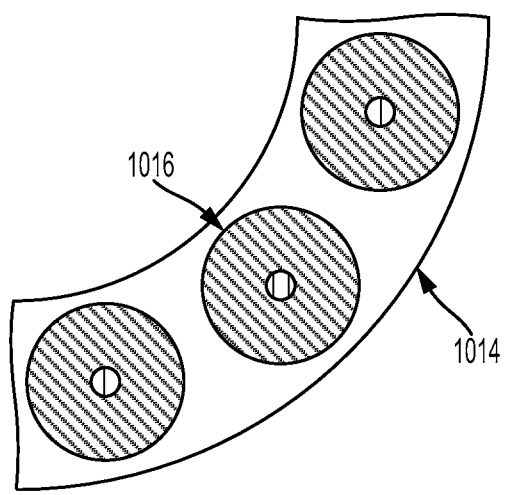
FIG. 10F illustrates a combustor, according to example implementations.

FIGS. 10A, 10B, 10C, 10D, 10E, 10F illustrate example types of combustors, according to example implementations. In particular, FIG. 10A illustrates a partial perspective view of an annular combustor 1000, and FIG. 10B illustrates a partial frontal view of the annular combustor 1000. FIG. 10C illustrates a partial perspective view of a tubular or can combustor 1002, and FIG. 10D illustrates a partial frontal view of the can combustor 1002. FIG. 10E illustrates a partial perspective view of a can-annular combustor 1004, and FIG. 10F illustrates a partial frontal view of the can-annular combustor 1004.

The annular combustor 1000 shown in FIGS. 10A-10B has an annular cross section and has a liner sitting inside an outer casing, which has been peeled open in FIG. 10A for illustration. The annular combustor 1000 does not define separate combustion zones, but rather has a continuous liner and casing forming a ring 1006 (the annulus).

The can combustor 1002 shown in FIGS. 10C and 10D includes multiple combustion cans such as combustion cans 1008, 1010, and 1012 arranged in a radial array about a central shaft. Each combustion can is a self-contained cylindrical combustion chamber that has both a liner and a casing. Each combustion can has its own fuel injector, igniter, liner, and casing. The primary air from the compressor 902 is guided into each individual combustion can, where it is decelerated, mixed with fuel, and then ignited. Secondary air also comes from the compressor 902, where it is fed outside of the liner. The secondary air is then fed, for example, through slits in the liner, into the combustion zone to cool the liner using thin film cooling.

In example implementations, multiple combustion cans are arranged around the jet engine 802, and their shared exhaust is fed to the turbine 906. However, the can combustor 1002 can weigh more than other combustor configurations and can be characterized by higher pressure drop across the combustion cans than other combustor configurations.

The can-annular combustor 1004 shown in FIGS. 10E-10F includes an annular casing 1014 and can-shaped liners, such as liner 1016. The can-annular combustor 1004 has discrete combustion zones contained in separate liners with their own fuel injectors. Unlike the can combustor 1002, the combustion zones of the can-annular combustor 1004 share a common ring (annulus) casing (for example, annular casing 1014). Each combustion zone of the can-annular combustor 1004 does not operate as a separate pressure vessel; rather, the combustion zones "communicate" with each other through liner holes or connecting tubes that allow some air to flow circumferentially between the combustion zones. Further, rather than having separate igniters for each combustion can, once combustion takes place in one or two combustion cans of the can-annular combustor 1004 cans, combustion could spread to and ignite the other combustion cans due to communication between the combustion zones through the liner holes or connecting tubes.

Regardless of the type of combustor, the combustion process inside the combustor 904 can determine, at least partially, many of the operating characteristics of the jet engine 802, such as fuel efficiency, levels of emissions, and transient response (the response to changing conditions such a fuel flow and air speed). Further, also regardless of the type of combustor, the combustor 904 has several components that can be used, and these several components are described below.

Figure 11:
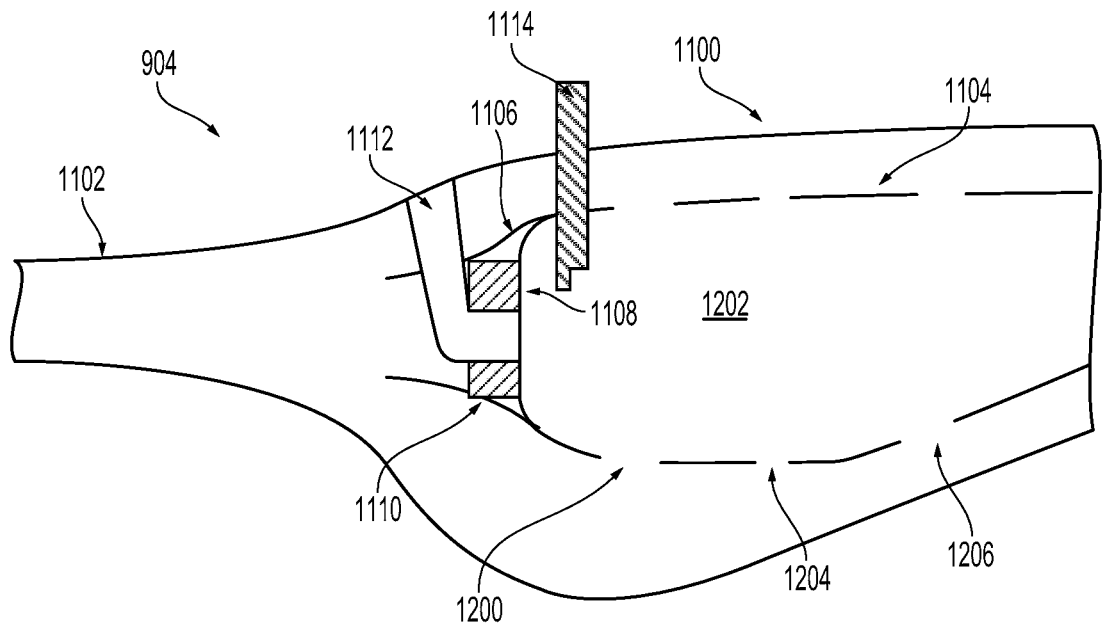
FIG. 11 illustrates a partial view of a combustor, according to example implementations.

FIG. 11 illustrates a schematic diagram of a partial view of the combustor 904, according to an example implementation. The combustor 904 includes a casing 1100 that is configured as an outer shell of the combustor 904. The casing 1100 can be protected from thermal loads by the air flowing in it, and can operate as a pressure vessel that withstands the difference between the high pressures inside the combustor 904 and the lower pressure outside the combustor 904.

The combustor 904 also includes a diffuser 1102 that is configured to slow the high speed, highly compressed air from the compressor 902 to a velocity optimal for the combustor 904. Reducing the velocity results in a loss in total pressure, and the diffuser 1102 is configured to limit such loss of pressure. The diffuser 1102 is also configured to limit flow distortion by avoiding flow effects like boundary layer separation.

The combustor 904 further includes a liner 1104 that contains the combustion process and is configured to withstand extended high temperature cycles, and therefore can be made from superalloys. Furthermore, the liner 1104 is cooled with air flow. In some example implementations, in addition to air cooling, the combustor 904 can include thermal barrier coatings to further cool the liner 1104.

Figure 12:
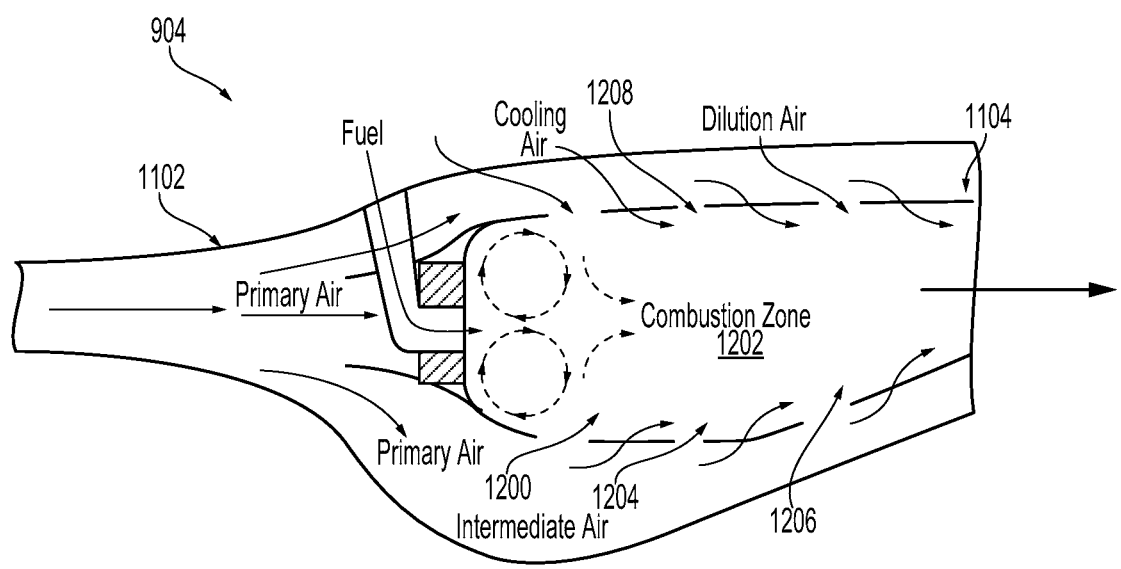
FIG. 12 illustrates air flow paths through a combustor, according to example implementations.

FIG. 12 illustrates air flow paths through the combustor 904, according to an example implementation. Primary air is the main combustion air and is highly compressed air from the compressor 902. The primary air can be decelerated using the diffuser 1102 and is fed through primary air holes 1200. This air is mixed with fuel, and then combusted in a combustion zone 1202.

Intermediate air is the air injected into the combustion zone 1202 through intermediate air holes 1204. The air injected through the intermediate air holes 1204 completes the combustion processes, cooling the air down and diluting concentrations of carbon monoxide (CO) and hydrogen ($H_2$).

Dilution air is air injected through dilution air holes 1206 in the liner 1104 at the end of the combustion zone 1202 to help cool the air to before it reaches the turbine 906. The dilution air can be used to produce the uniform temperature profile desired in the combustor 904.

Cooling air is air that is injected through cooling air holes 1208 in the liner 1104 to generate a layer (film) of cool air to protect the liner 1104 from the high combustion temperatures. The combustor 904 is configured such that the cooling air does not directly interact with the combustion air and combustion process.

Referring back to FIG. 11, the combustor 904 further includes a snout 1106, which is an extension of a dome 1108. The snout 1106 operates as an air splitter, separating the primary air from the secondary air flows (intermediate, dilution, and cooling air).

The dome 1108 and a swirler 1110 are the components of the combustor 904 through which the primary air flows as it enters the combustion zone 1202. The dome 1108 and the swirler 1110 are configured to generate turbulence in the flow to rapidly mix the air with fuel. The swirler 1110 establishes a local low pressure zone that forces some of the combustion products to recirculate, creating high turbulence. However, the higher the turbulence, the higher the pressure loss is for the combustor 904, so the dome 1108 and the swirler 1110 are configured to not generate more turbulence than is sufficient to mix the fuel and air. In some examples, with the resonators disclosed in the present disclosure, the combustor 904 can be configured without the dome 1108 and the swirler 1110. In other examples, the dome 1108 and the swirler 1110 can be made smaller when the combustor resonators disclosed in the present disclosure are used because the flame front propagation can be faster than when a conventional igniter is used.

The combustor 904 further includes a fuel injector 1112 configured to introduce fuel to the combustion zone 1202 and, along with the swirler 1110, is configured to mix the fuel and air. The fuel injector 1112 can be configured as any of several types of fuel injectors including: pressure-atomizing, air blast, vaporizing, and premix/prevaporizing injectors.

Pressure atomizing fuel injectors rely on high fuel pressures (as much as 1200 pounds per square inch (psi)) to atomize the fuel. When using this type of fuel injector, the fuel system is configured to be sufficiently robust to withstand such high pressures. The fuel tends to be heterogeneously atomized, resulting in incomplete or uneven combustion, which generates pollutants and smoke.

The air-blast injector "blasts" fuel with a stream of air, atomizing the fuel into homogeneous droplets, and can cause the combustor 904 to be smokeless. This air blast injector can operate at lower fuel pressures than the pressure atomizing fuel injector.

The vaporizing fuel injector is similar to the air-blast injector in that the primary air is mixed with the fuel as it is injected into the combustion zone 1202. However, with the vaporizing fuel injector the fuel-air mixture travels through a tube within the combustion zone 1202. Heat from the combustion zone 1202 is transferred to the fuel-air mixture, vaporizing some of the fuel to enhance the mixing before the mixture is combusted. This way, the fuel is combusted with low thermal radiation, which helps protect the liner 1104. However, the vaporizer tube can have low durability because of the low fuel flow rate within it causing the tube to be less protected from the combustion heat.

The premixing/prevaporizing injector is configured to mix or vaporize the fuel before it reaches the combustion zone 1202. This way, the fuel is uniformly mixed with the air, and emissions from the jet engine 802 can be reduced. However, fuel can auto-ignite or otherwise combust before the fuel-air mixture reaches the combustion zone 1202, and the combustor 904 can thus be damaged.

In some example implementations, a resonator could be configured with fuel passages disposed within the resonator, such that the resonator integrates operations of the fuel injector 1112 with operations of an igniter described below. In these examples, the resonator could be configured to perform the atomization and vaporization of the fuel in addition to mixing and preparing the fuel for combustion. The fuel would then be passed through a formed plasma to ensure ignition. Further, the presence of electromagnetic waves radiated by the resonator could be used to energize the air-fuel mixture and stimulate combustion.

The combustor 904 also includes an igniter 1114 configured to ignite air-fuel mixture to cause combustion. In examples, the igniter 1114 can be configured as an electrical spark igniter, similar to an automotive spark plug. However, there are several disadvantages to such configuration as described below. The igniter 1114 is disposed proximate to the combustion zone 1202 where the fuel and air are already mixed, but is located upstream from the combustion location so that it is not damaged by the combustion itself. In example implementations, once combustion is initially started by the igniter 1114, the combustion is self-sustaining and the igniter 1114 is no longer used. In the annular combustor 1000 and the can-annular combustor 1004, the flame can propagate from one combustion zone to another, so igniters might not be used at each combustion zone.

However, in some examples, combustion can stop due to operating conditions that are not favorable to sustaining combustion. For example, the aircraft 800 can operate at high altitude with low air density, which might affect combustion. In another example, a speed of the aircraft 800 can be sufficiently low to stop the combustion process. Other operating conditions could cause the combustion to stop. In these examples, the igniter 1114 could also be used to restart combustion.

In some systems, ignition-assisting techniques can be used to restart combustion. One such method is oxygen injection, where oxygen is fed to the ignition area, helping the fuel to easily combust. This is particularly useful in some aircraft applications where the jet engine 802 may have to restart at high altitude. Further, described in the present disclosure are igniters and systems that could lower the probability of stopping and having to restart combustion. Particularly, the igniter 1114 could be configured as any of the resonators described in the present disclosure to enhance combustion. In some examples, if the igniter 1114 is configured as a coaxial resonator, the coaxial resonator could be used as a sensor to obtain real-time measurements of the conditions inside the combustor 904 and could be used to predict when combustion would stop (for example, when a flameout would occur). Once such a prediction is made, flameout can be precluded (or its likelihood reduced) by proactively performing operations such as adding more fuel, providing additional plasma, and/or increasing compression using the compressor 902, among other possible operations.

In some example implementations of the jet engine 802, combustion can take place in locations within the jet engine 802 other than the combustor 904. For example, in order for an aircraft to fly faster than the speed of sound, the aircraft needs to generate a high thrust to overcome a sharp rise in drag near the speed of sound. To achieve such high thrust, an afterburner can be added to the jet engine. The afterburner can be considered another type of combustor.

Figure 13:
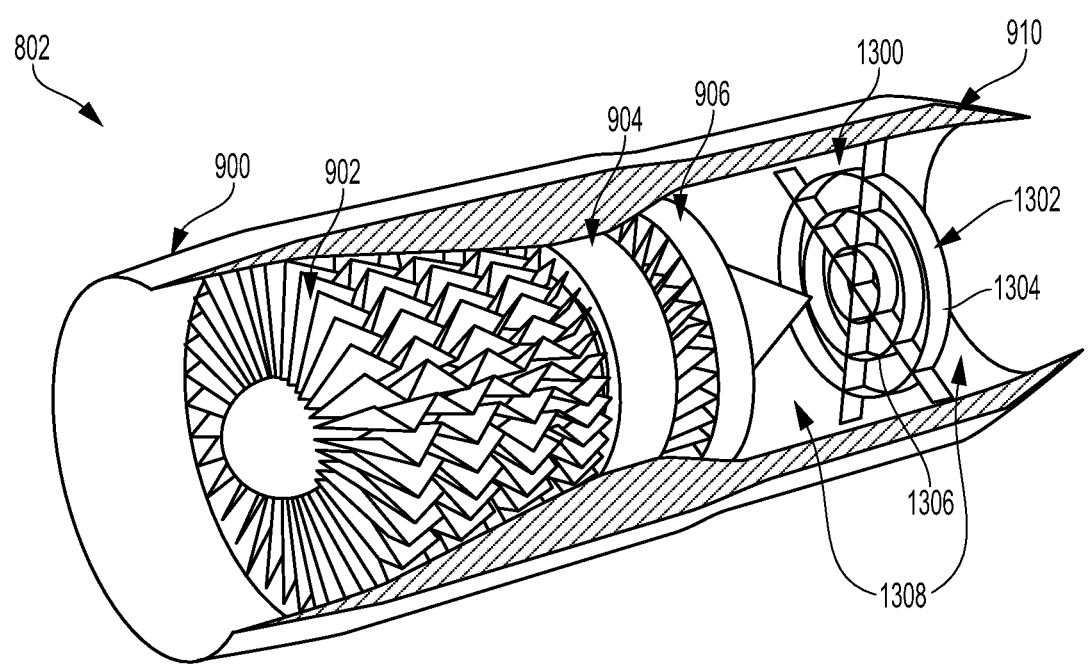
FIG. 13 illustrates a jet engine including an afterburner, according to example implementations.

FIG. 13 illustrates the jet engine 802 including an afterburner 1300 downstream of the turbine 906, in accordance with an example implementation. As described above with respect to FIG. 9, some of the energy of the exhaust gas from the combustor 904 is used to turn the turbine 906. The afterburner 1300 is used to add energy to generate more thrust by injecting fuel directly into the hot exhaust gas exiting the turbine 906.

The nozzle 910 of the jet engine 802, as illustrated in FIG. 13, is extended or moved downstream in the jet engine 802 to enable placing flame holders 1302 between the turbine 906 and the exit of the jet engine 802. As shown in FIG. 13, the flame holders 1302 can include multiple hoops, such as hoops 1304, 1306. In another arrangement, the flame holders 1302 can include multiple parallel gutters that extend across an afterburner channel 1308 and perpendicular to the engine axis. In yet another arrangement, the flame holders 1302 can include multiple gutters extending radially from the internal surface of the afterburner channel 1308 in a star pattern with respect to the engine axis. The gutters of the flame holders 1302 can be configured with a u- or v-shaped cross section that is open on a downstream side of the gutter. The flame holders 1302 provide a zone of low velocity air so as to retain gases during their combustion in the afterburner channel 1308.

In some examples, when the afterburner 1300 is turned on, additional fuel is injected through, between, or around the flame holders 1302 and into the gas exiting the turbine 906. In other examples, fuel is injected in the afterburner 1300 upstream of the flame holders 1302. The fuel burns and produces additional thrust.

After passing the turbine 906, the gas from the turbine 906 expands, thus losing temperature. The gas from the turbine 906 is an input gas to the afterburner 1300. Fuel is injected into the input gas from the turbine 906 to produce a fuel-air mixture within an afterburner channel 1308. Combustion of the fuel within the fuel-air mixture within the afterburner channel 1308 results in an exhaust gas from the afterburner 1300 having a temperature and pressure greater than a temperature and pressure, respectively, of the gas from the turbine 906. The exhaust gas resulting from combustion within the afterburner channel 1308 passes through the nozzle 910 at a higher velocity, thereby generating additional thrust.

In some examples, ignition within the afterburner 1300 may be hard to achieve. In particular, because velocities and temperatures do not substantially change at the inlet of the afterburner 1300, ignition in the afterburner 1300 may be difficult to achieve when the aircraft 800 is flying at high altitudes. The difficulty is associated with the low pressure in the afterburner 1300 that affects ignition directly. Therefore, it can be desirable to have a system that better prepares the fuel for easier ignition in the afterburner 1300 at higher altitude.

Further, the exhaust gas from the turbine 906 that enters the afterburner 1300 has reduced oxygen and is not highly compressed due to previous combustion at the combustor 904. Therefore, combustion in the afterburner 1300 is generally fuel-inefficient compared with combustion in the combustor 904. Thus, the afterburner 1300 increases thrust at the cost of increased fuel inefficiency, thereby limiting its practical use to short bursts or intermittent operation. As such, the afterburner 1300 is turned on selectively when the extra thrust is used, but is otherwise turned off. It can thus be desirable to have an afterburner that is more efficient to enable using the afterburner more often and more efficiently to enable persistent, as opposed to intermittent operation.

The combustion taking place at the combustor 904 and the combustion taking place in the afterburner 1300 of the jet engine 802 can affect many of the operating characteristics of the jet engine 802. As examples, combustion determines fuel efficiency, thrust levels, and levels of emissions and transient response (the response to changing conditions such a fuel flow and air speed). It can thus be desirable to have an ignition system that prepares the fuel for efficient and thorough combustion, facilitates starting and restarting ignition when desired regardless of altitude, and enables combustion of a lean fuel mixture at high compression ratios to increase efficiency.

IX. Example Plasma-Assisted Combustion

As discussed above, it may be desirable to use any of the resonators described in the present disclosure to enhance or assist combustion in a jet engine. Doing so can yield more efficient, leaner, cleaner combustion and provide other advantages.

One manner of accomplishing this can be providing a resonator within a combustion chamber of a jet engine and using the resonator as an ignition source. In one implementation, a combustion chamber of a jet engine may include a liner defining a combustion zone. In line with the discussion above, the combustion chamber can be arranged as an annular combustor, a can combustor, or a can-annular combustor. Hence, the liner can be configured as a continuous liner or a can-shaped liner. The combustion chamber can also include a fuel inlet configured to introduce fuel into the combustion zone for combustion, and can include an outer casing.

The resonator can be configured according to any of the resonators described in the present disclosure. As such, for instance, the resonator can include a center conductor, an outer conductor, a dielectric between the center conductor and the outer conductor, and an electrode magnetically coupled to the center conductor. To use the resonator as an ignition source, the resonator can be positioned such that it extends through the outer casing, through the liner, and into the combustion zone of the combustion chamber. A distal end of the resonator can thus extend through the liner such that a distal end of the electrode is positioned in the combustion zone.

In some implementations, the fuel inlet can be oriented so as to direct at least a portion of the fuel towards the electrode of the resonator. For example, a fuel injector can be configured to inject fuel through the fuel inlet in a fuel spray pattern, and the distal end of the electrode can be positioned within the fuel spray pattern. In this manner, when a controller excites the resonator so as to provide a plasma corona proximate to the distal end of the electrode, the plasma corona can ignite the fuel.

Further, in some implementations, the electrode can be positioned downstream of the fuel inlet, such that the fuel that is input through the fuel inlet flows by the electrode and is ignited by the plasma corona. For instance, the combustion chamber may have a proximal end facing a compressor of the jet engine and a distal end through which exhaust exits the combustion chamber. Further, there may be a longitudinal axis running from the proximal end of the combustion chamber to the distal end of the combustion chamber. With this arrangement, the fuel inlet can be positioned at a first axial position along the longitudinal axis of the combustion chamber, and the electrode can be positioned at a second axial position along the longitudinal axis of the combustion chamber, with the second axial position being closer to the distal end of the combustion chamber than the first axial position is. In addition, with this configuration, the fuel inlet can be positioned at a same or different angular position as the electrode.

Moreover, the orientation of the resonator with respect to a longitudinal axis of the combustion chamber may vary, depending on the desired implementation. In an example, a longitudinal axis of the center conductor of the resonator can be oblique to a longitudinal axis of the combustion chamber, with a distal end of the center conductor being disposed towards a distal end of the combustion chamber. Orienting the resonator in this manner can help to prevent fuel that is input into the combustion chamber from blowing out the plasma corona. Alternatively, the resonator can be oriented such that a longitudinal axis of the center conductor is perpendicular to a longitudinal axis of the combustion chamber. Other examples are possible as well.

In line with the discussion above, to ignite the fuel within the combustion zone, a controller can cause a radio-frequency power source to excite the resonator with a signal having a wavelength proximate to an odd-integer multiple of one quarter (¼) of a resonant wavelength of the resonator, so as to provide a plasma corona. In some implementations, igniting the fuel may also involve the controller causing a direct-current power source to provide a bias signal between the inner conductor and the outer conductor.

Figure 14:
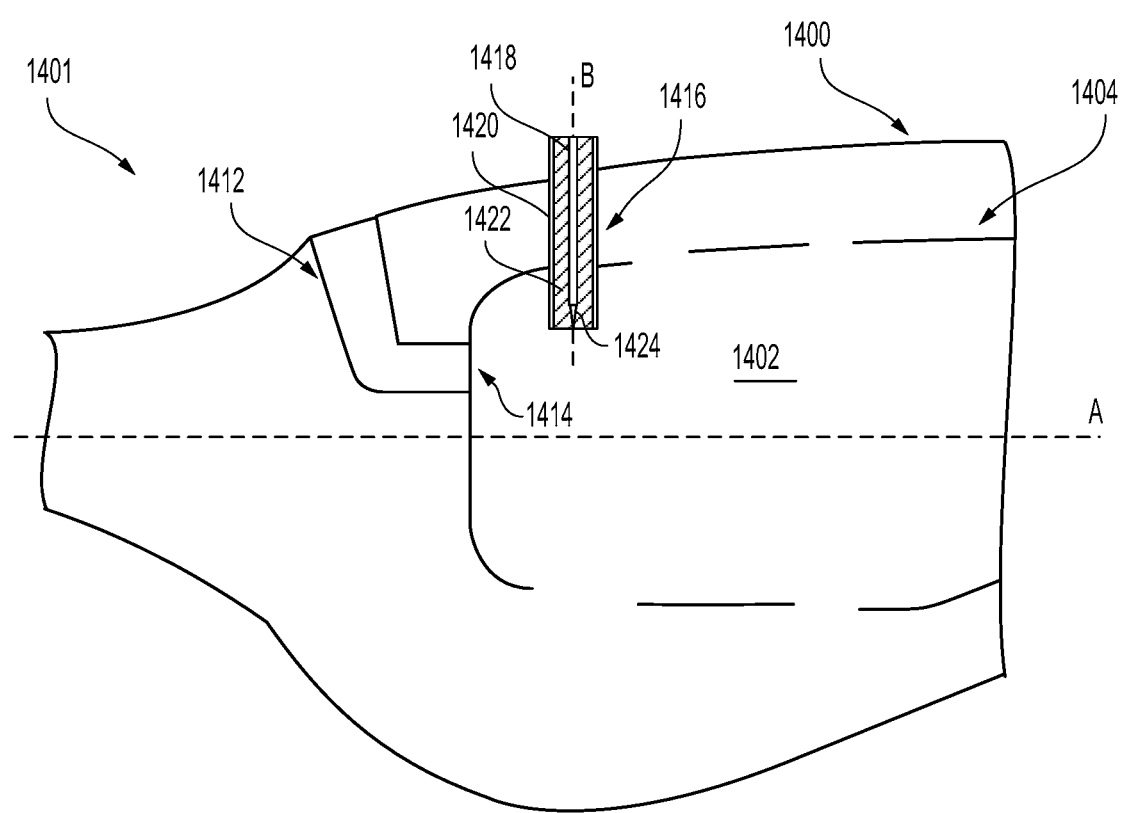
FIG. 14 illustrates a cutaway side view of a combustor, according to example implementations.

FIG. 14 illustrates a cutaway side view of an example combustor 1401 of a jet engine. As depicted in FIG. 14, the combustor 1401 includes an outer casing 1400 and a liner 1404. In line with the discussion above, the liner 1404 defines a combustion zone 1402, meaning that the liner outlines or otherwise describes the region where combustion occurs. The liner 1404 can be a superalloy or other material that is shaped so as to confine the combustion process to a desired region.

The combustor 1401 also includes a fuel injector 1412 configured to input fuel through a fuel inlet 1414 and into the combustion zone 1402.

Further, the combustor 1401 includes a resonator 1416. The resonator 1416 can be a coaxial-cavity resonator, similar to the coaxial resonator 201 illustrated in FIG. 2, for example. Although 14 depicts the resonator 1416 as a coaxial resonator by way of example, those of ordinary skill in the art will readily appreciate, however, that other types of resonators can be used well, with modifications where appropriate. For instance, the resonator 1416 could be a dielectric resonator, a crystal resonator, a ceramic resonator, a surface-acoustic-wave resonator, a yttrium-iron-garnet resonator, a rectangular-waveguide cavity resonator, a parallel-plate resonator, or a gap-coupled microstrip resonator.

The resonator 1416 includes a center conductor 1418, an outer conductor 1420, a dielectric 1422 between the center conductor 1418 and the outer conductor 1420, and an electrode 1424 electromagnetically coupled to the center conductor 1418. The configuration of the resonator 1416 depicted in FIG. 14 is not meant to be limiting. The resonator 1416 can be arranged in accordance with any of the resonators discussed above, for example.

As shown in FIG. 14, the resonator 1416 extends through the outer casing 1400, through the liner 1404, and into the combustion zone 1402. Further, a longitudinal axis B of the center conductor 1418 is perpendicular to a longitudinal axis A of the combustor 1401. With this arrangement, the fuel inlet is oriented so as to direct at least a portion of the fuel towards the electrode 1424.

Figure 15:
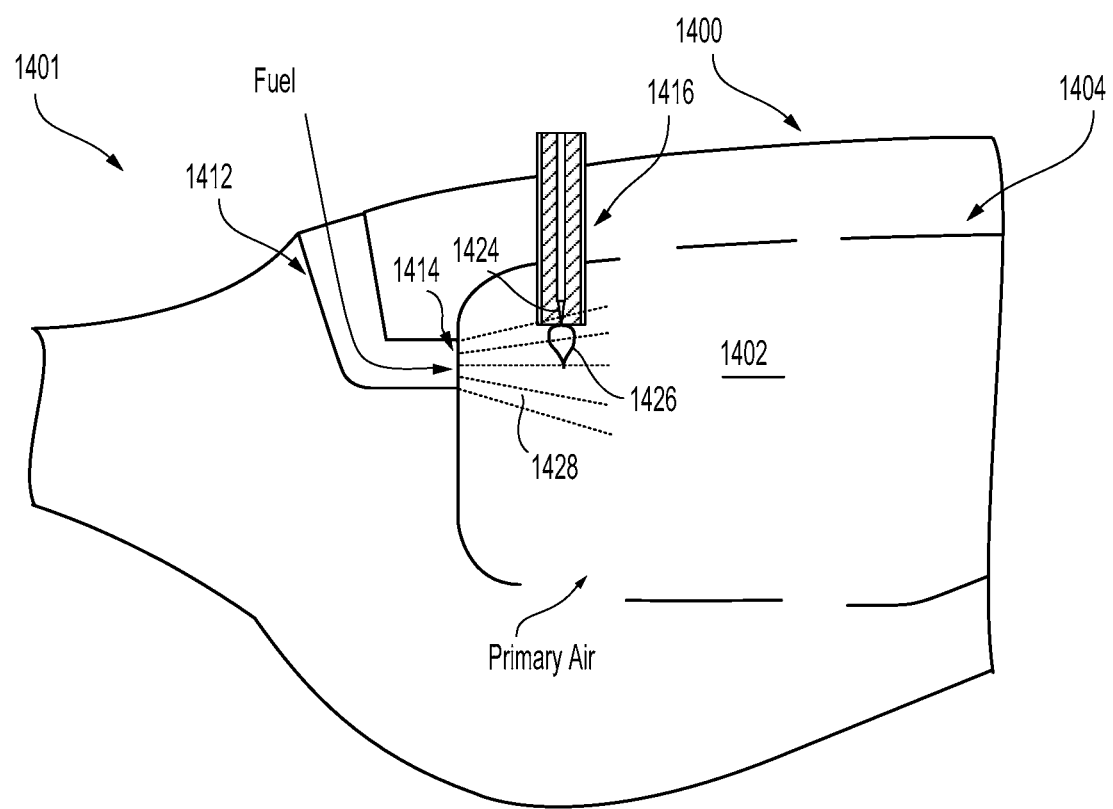
FIG. 15 illustrates fluid paths through a combustor, according to example implementations.

FIG. 15 illustrates fluid paths through the combustor 1401. In particular, FIG. 15 depicts a fuel flow path and a primary air flow path. As depicted in FIG. 15, fuel enters into the combustion zone 1402 by way of the fuel inlet 1414. Whereas, primary air enters into the combustion zone 1402 by way of one or more holes in the liner 1404.

As further depicted in FIG. 15, the fuel inlet 1414 is oriented so as to direct at least a portion of the fuel towards the electrode 1424. Specifically, the fuel inlet 1414 is oriented so as to direct at least a portion of the fuel towards a distal end of the electrode 1424, the distal end being the end proximate to where the resonator 1416 provides a plasma corona 1426. In an example implementation, a fuel injector can inject fuel through the fuel inlet 1414 in a fuel spray pattern 1428. The distal end of the electrode 1424 can be positioned within the fuel spray pattern 1428. In this manner, fuel input through the fuel inlet 1414 is provided proximate to the plasma corona 1428 provided by the resonator 1416 (particularly, toward/through the plasma corona 1428), which can improve the resulting combustion.

Figure 16:
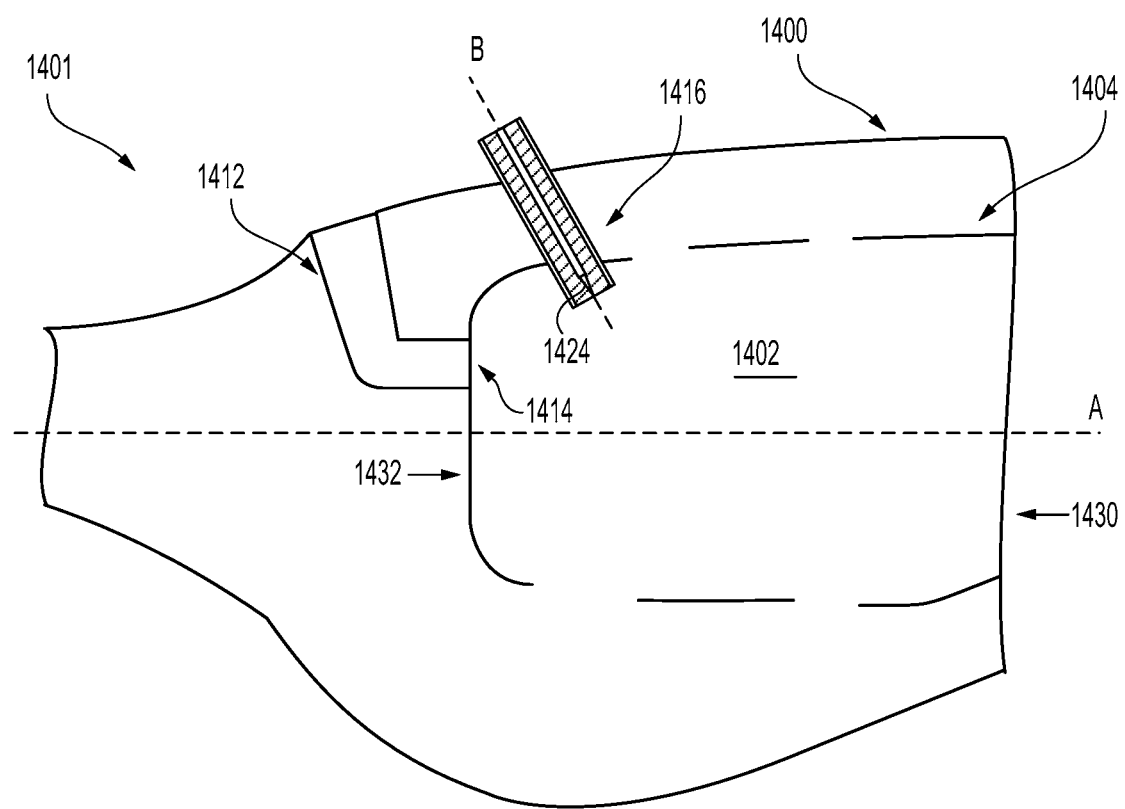
FIG. 16 illustrates a cutaway side view of a combustor, according to example implementations.

FIG. 16 illustrates a cutaway side view of the combustor 1401, with the resonator 1416 arranged in a different manner than how the resonator is arranged in FIGS. 14 and 15. Specifically, as with the arrangement depicted in FIGS. 14 and 15, FIG. 16 shows the resonator 1416 extending through the outer casing 1400, through the liner 1404, and into the combustion zone 1402. However, unlike the arrangements shown in FIGS. 14 and 16, in the arrangement of FIG. 16, the longitudinal axis B of the center conductor 1418 is oblique to the longitudinal axis A of the combustor 1401, with the distal end of the electrode 1424 disposed towards a distal end 1430 of the combustor 1401. As noted above, orienting the resonator 1416 in this manner may help to prevent fuel that is input through the fuel inlet 1414 from blowing out a plasma corona provided by the resonator 1416.

In the arrangements shown in FIGS. 14, 15, and 16, the fuel inlet 1414 is positioned at a proximal end 1432 of the liner 1404, such that fuel enters the combustion zone from the proximal end of the liner 1404. In other implementations, a fuel inlet can be located at a different position, such as between a proximal end and a distal end of the liner 1404.

Figure 17A:
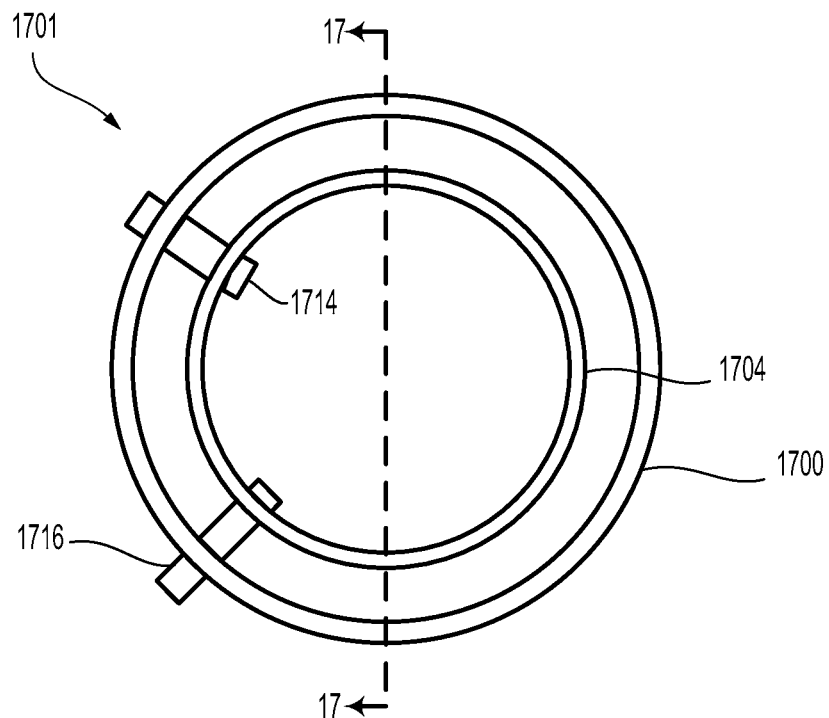
FIG. 17A illustrates an end view of a portion of a combustor, according to example implementations.
Figure 17B:
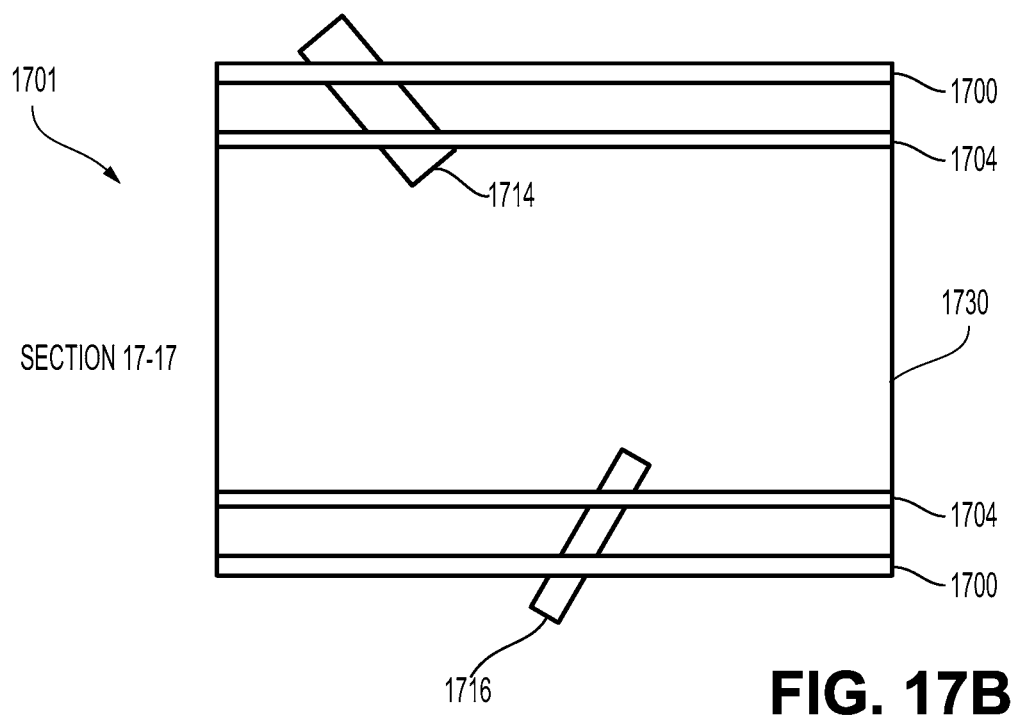
FIG. 17B illustrates a cross-sectional view of the portion of FIG. 17A, shown along line 17 of FIG. 17A.

FIG. 17A illustrates an end view of a portion of an example combustor 1701. Further, FIG. 17B illustrates a cross-sectional view of the portion of FIG. 17A, shown along line 17 of FIG. 17A. As depicted in FIGS. 17A and 17B, the combustor 1701 includes an outer casing 1700 and a liner 1704. Further, a fuel inlet 1714 is positioned at a first angular position around the liner 1704, and a resonator 1716 is positioned at a second angular position around the liner 1704 that is different from the first angular position. In the arrangement shown in FIGS. 17A and 17B, the fuel inlet 1714 and the resonator 1716 are on a same half of the combustor 1701. Specifically, with reference to FIG. 17A, the fuel inlet 1714 and the resonator 1716 are both on a left side of the line 17. In other implementations, a fuel inlet and a resonator can be located on opposite halves of a combustor. For instance, a fuel inlet can be located on a left side of the line 17 and a resonator can be located on a right side of the line 17.

As further shown in FIGS. 17A and 17B, the fuel inlet 1714 is positioned at a first longitudinal position along a longitudinal length of the liner 1704. Further, the resonator 1716 extends through the outer casing 1700 and the liner 1704 at a second longitudinal position, with the second longitudinal position being closer to the distal end 1730 of the combustor 1701 than the first longitudinal position is. With this arrangement, the resonator 1716 is positioned downstream of the fuel inlet 1714, such that at least a portion of fuel input through the fuel inlet 1714 flows downstream towards and/or through a plasma corona provided by the resonator 1716.

In an alternative implementation, the fuel inlet 1714 and the resonator 1716 may be position at a same angular position, with the fuel inlet 1714 pointed downstream, and the resonator 1716 positioned at a longitudinal position along the combustion 1701 that is downstream from a longitudinal position of the fuel inlet 1714.

X. Example Methods

Figure 18:
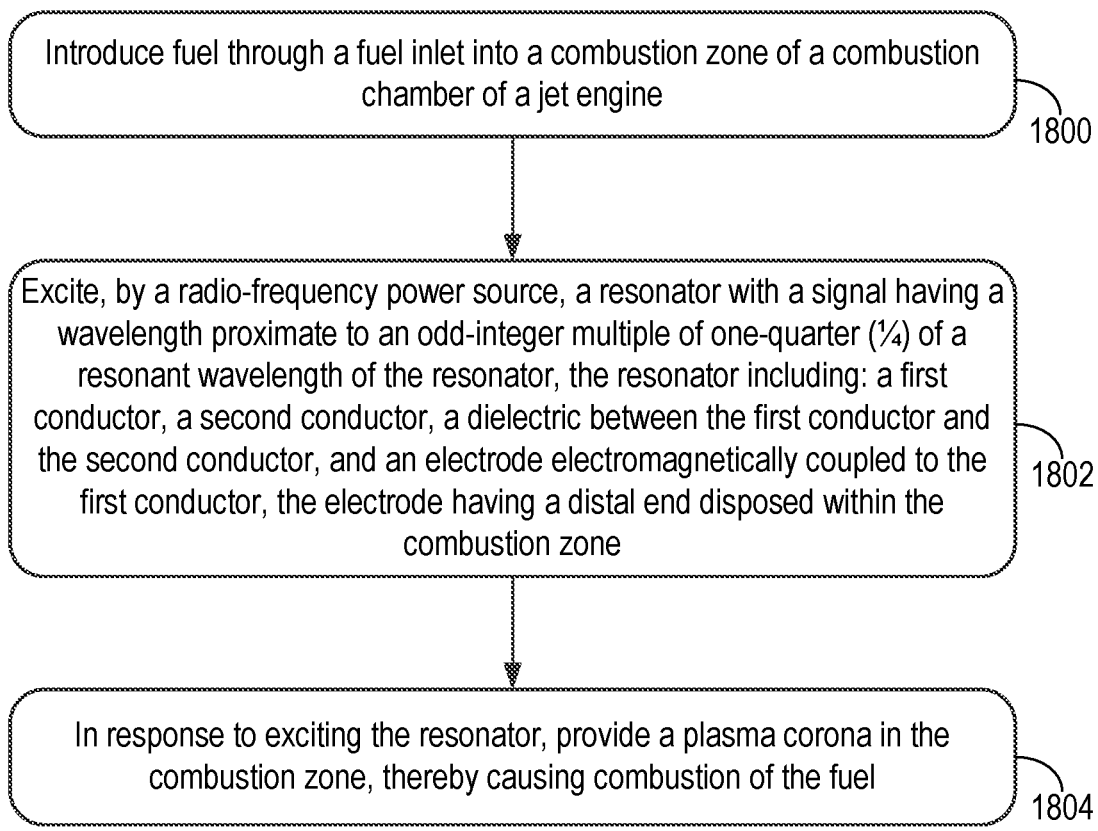
FIG. 18 is a flow chart depicting operations of a representative method, according to example implementations.

FIG. 18 is a flow chart depicting operations of a representative method for combusting fuel in a jet engine.

At block 1800, the method includes introducing fuel through a fuel inlet into a combustion zone of a combustion chamber of a jet engine.

At block 1802, the method includes exciting, by a radio-frequency power source, a resonator with a signal have a wavelength proximate to an odd-integer multiple of one-quarter (¼) of a resonant wavelength of the resonator, the resonator including a first conductor, a second conductor, a dielectric between the first conductor and the second conductor, and an electrode electromagnetically coupled to the first conductor, the electrode having a distal end disposed within the combustion zone. In line with the discussion above, the resonator can include a coaxial cavity resonator, a dielectric resonator, a rectangular waveguide cavity resonator, or a gap-coupled microstrip resonator.

At block 1804, the method includes, in response to exciting the resonator, providing a plasma corona in the combustion zone, thereby causing combustion of the fuel.

In some implementations, inputting the fuel can include directing a portion of the fuel towards the electrode. By way of example, inputting the fuel can include injecting the fuel in a fuel spray pattern using a fuel injector, with the distal end of the electrode positioned within the fuel spray pattern. The electrode can be positioned downstream of the fuel inlet in the combustion zone. Further, a longitudinal axis of the center conductor can be oblique to a longitudinal axis of the combustion chamber, with a distal end of the center conductor disposed towards a distal end of the combustion chamber. Alternatively, a longitudinal axis of the center conductor can be perpendicular to a longitudinal axis of the combustion chamber.

In some implementations, the resonator can assume a dual role. For instance, the method can also include exciting the resonator prior to formation of the plasma corona, such that the given resonator provides electromagnetic waves for pre-treating fuel that is input to the combustion zone. Similarly, in some implementations, after combustion occurs, rather than providing a plasma corona, the resonator could instead enhance an already present combustion process by providing electromagnetic waves that can reform fuel that is being input to the combustion zone and/or already in the combustion zone.

In some implementations, the method can also include compressing air using a compressor of the jet engine, thereby causing compressed air to enter the combustion zone.

In some implementations, the method can also include causing a direct current power source to provide a bias signal between the first conductor and the second conductor.

The particular arrangements shown in the Figures should not be viewed as limiting. It should be understood that other implementations can include more or less of each element shown in a given Figure. Further, some of the illustrated elements can be combined or omitted. Yet further, an illustrative implementation can include elements that are not illustrated in the Figures.

A step or block that represents a processing of information can correspond to circuitry that can be configured to perform the specific logical functions of a method or technique as presently disclosed. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk, hard drive, or other storage medium.

The computer-readable medium can also include non-transitory computer-readable media such as computer-readable media that store data for short periods of time like register memory, processor cache, and random access memory (RAM). The computer-readable media can also include non-transitory computer-readable media that store program code and/or data for longer periods of time. Thus, the computer-readable media can include secondary or persistent long term storage, like read only memory (ROM), optical or magnetic disks, compact-disc read only memory (CD-ROM), for example. The computer-readable media can also be any other volatile or non-volatile storage systems. A computer-readable medium can be considered a computer-readable storage medium, for example, or a tangible storage device.

While various examples and implementations have been disclosed, other examples and implementations will be apparent to those skilled in the art. The various disclosed examples and implementations are for purposes of illustration and are not intended to be limiting, with the true scope being indicated by the following claims.

What is claimed is:

1. A system, comprising:
   a combustion chamber of a jet engine, the combustion chamber including a liner defining a combustion zone;
   a radio-frequency power source;
   a coaxial resonator electromagnetically coupled to the radio-frequency power source and having a resonant wavelength, the coaxial resonator including (i) a first conductor, (ii) a second conductor, (iii) a base conductor at a proximal end of the coaxial resonator, (iv) a dielectric between the first conductor and the second conductor, and (vi) an electrode electromagnetically coupled to the first conductor, the electrode having a distal end disposed in the combustion zone, the electrode having at least one outlet, wherein the coaxial resonator is configured such that, when the coaxial resonator is excited by the radio-frequency power source with a signal having a wavelength proximate to an odd-integer multiple of one-quarter (¼) of the resonant wavelength, the coaxial resonator provides a plasma corona in the combustion zone;

an impedance sensor that measures an impedance of the coaxial resonator and provides an impedance measurement, the impedance sensor being electrically coupled to the first conductor and the second conductor of the coaxial resonator; and a controller that receives the impedance measurement and which is configured to cause the radio-frequency power source to excite the coaxial resonator with the signal so as to provide the plasma corona and cause combustion of fuel, the controller being configured to: determine at least one parameter of the combustion chamber from the impedance measurement, the at least one parameter comprising at least one of a temperature within the combustion chamber, a pressure within the combustion chamber, and a chemical composition within the combustion chamber; and to adjust the radio-frequency power source and the plasma corona generated in the combustion chamber based at least in part on the at least one determined parameter.

2. The system of claim 1, further comprising a fuel conduit oriented so as to direct at least a portion of the fuel toward the electrode.

3. The system of claim 2, further comprising a fuel tank configured to supply the fuel to the fuel conduit.

4. The system of claim 3, further comprising a fuel pump that transfers the fuel from the fuel tank to the fuel conduit.

5. The system of claim 4, wherein a longitudinal axis of the first conductor is oblique to a longitudinal axis of the combustion chamber, with a distal end of the first conductor disposed towards a distal end of the combustion chamber.

6. The system of claim 4, wherein a longitudinal axis of the first conductor is perpendicular to a longitudinal axis of the combustion chamber.

7. The system of claim 1, wherein the combustion chamber includes an outer casing through which the coaxial resonator extends.

8. The system of claim 1, wherein the combustion chamber comprises a combustor selected from the group consisting of an annular combustor, a can combustor, and a can-annular combustor.

9. The system of claim 1, further comprising a direct-current power source configured to provide a bias signal between the first conductor and the second conductor.

10. The system of claim 1, wherein the impedance sensor is integrated into the controller.

11. The system of claim 1, further comprising a fuel conduit that is defined within the first conductor, and the distal end of the electrode extending beyond an end of the coaxial resonator.

12. A method comprising:
introducing fuel through a fuel conduit of a coaxial resonator into a combustion zone of a combustion chamber of a jet engine;

exciting, by a radio-frequency power source, the coaxial resonator with a signal having a wavelength proximate to an odd-integer multiple of one-quarter (¼) of a resonant wavelength of the coaxial resonator, the coaxial resonator including (i) a first conductor, (ii) a second conductor, (iii) a base conductor at a proximal end of the coaxial resonator, (iv) a dielectric between the first conductor and the second conductor, and (v) an electrode electromagnetically coupled to the first conductor, the electrode having a distal end disposed within the combustion zone;

in response to exciting the coaxial resonator, providing a plasma corona in the combustion zone thereby causing combustion of the fuel; and measuring an impedance of the coaxial resonator with an impedance sensor that is electrically coupled to the coaxial resonator determining at least one parameter of the combustion chamber from the impedance, the at least one parameter comprising at least one of a temperature within the combustion chamber, a pressure within the combustion chamber, and a chemical composition within the combustion chamber adjusting the radio-frequency power source based at least in part on the at least one parameter, wherein the adjustment of the radio-frequency power source modifies the plasma corona generated in the combustion zone.

13. The method of claim 12, wherein introducing the fuel comprises directing a portion of the fuel towards the electrode.

14. The method of claim 13, wherein introducing the fuel comprises using a fuel pump to transfer the fuel from a fuel tank to the fuel conduit.

15. The method of claim 12, wherein a longitudinal axis of the first conductor is oblique to a longitudinal axis of the combustion chamber, with a distal end of the first conductor being disposed towards a distal end of the combustion chamber.

16. The method of claim 12, wherein a longitudinal axis of the first conductor is perpendicular to a longitudinal axis of the combustion chamber.

17. The method of claim 12, further comprising compressing air using a compressor of the jet engine, thereby causing compressed air to enter the combustion zone.

18. The method of claim 12, further comprising causing a direct current power source to provide a bias signal between the first conductor and the second conductor.

19. The method of claim 12, wherein the fuel conduit is defined within the first conductor, and the distal end of the electrode extending beyond an end of the coaxial resonator, wherein the fuel conduits shields the fuel from interacting with electromagnetic radiation in the coaxial resonator.

* * * * *